United States Patent
Abdelmonem et al.

(10) Patent No.: US 10,575,260 B2
(45) Date of Patent: *Feb. 25, 2020

(54) METHOD AND APPARATUS FOR INCREASING PERFORMANCE OF COMMUNICATION LINKS OF COOPERATIVE COMMUNICATION NODES

(71) Applicant: ISCO International, LLC, Schaumburg, IL (US)

(72) Inventors: Amr Abdelmonem, Northbrook, IL (US); Jorge Seoane, Algonquin, IL (US); Mikhail Galeev, Palatine, IL (US); Krishna Komoravolu, Aurora, IL (US); Zhigang Wang, Batavia, IL (US); Gordon Reichard, Jr., Inverness, IL (US)

(73) Assignee: ISCO International, LLC, Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/242,665

(22) Filed: Jan. 8, 2019

(65) Prior Publication Data

US 2019/0141641 A1 May 9, 2019

Related U.S. Application Data

(63) Continuation of application No. 16/020,076, filed on Jun. 27, 2018, now Pat. No. 10,231,190, which is a
(Continued)

(51) Int. Cl.
H04W 52/24 (2009.01)
H04W 72/08 (2009.01)
(Continued)

(52) U.S. Cl.
CPC ......... H04W 52/241 (2013.01); H04J 11/005 (2013.01); H04J 11/0066 (2013.01);
(Continued)

(58) Field of Classification Search
CPC . H04W 24/02; H04W 72/085; H04W 52/243; H04L 5/006; H04L 5/0023; H04L 5/0073
See application file for complete search history.

(56) References Cited

U.S. PATENT DOCUMENTS 3,732,500 A 5/1973 Dishal
3,781,705 A 12/1973 Dishal
(Continued)

FOREIGN PATENT DOCUMENTS

CA 2260653 1/2000
CA 2288633 4/2000
(Continued)

OTHER PUBLICATIONS

"Excel Average Formula/Function without including Zeros", Ozgrid.com, Aug. 8, 2011, 3 pages.
(Continued)

Primary Examiner — Gbemileke J Onamuti
(74) Attorney, Agent, or Firm — Guntin & Gust, PLC; Jay H. Anderson

(57) ABSTRACT

A system that incorporates aspects of the subject disclosure may perform operations including, for example, monitoring performance parameters in a communications network, identifying a degradation in performance of one or more nodes of the communications network according to the monitored performance parameters, and initiating corrective action to mitigate the degradation in performance of the one or more nodes of the communications network. Other embodiments are disclosed.

20 Claims, 27 Drawing Sheets

Related U.S. Application Data continuation of application No. 15/688,010, filed on Aug. 28, 2017, now Pat. No. 10,039,061, which is a continuation of application No. 14/690,765, filed on Apr. 20, 2015, now Pat. No. 9,775,116.

(60) Provisional application No. 61/988,712, filed on May 5, 2014, provisional application No. 62/010,305, filed on Jun. 10, 2014, provisional application No. 62/091,033, filed on Dec. 12, 2014.

(51) Int. Cl.
| | |
|---|---|
| *H04W 24/10* | (2009.01) |
| *H04W 24/02* | (2009.01) |
| *H04L 5/00* | (2006.01) |
| *H04J 11/00* | (2006.01) |
| *H04W 24/08* | (2009.01) |
| *H04W 88/08* | (2009.01) |

(52) U.S. Cl.
CPC ............ *H04L 5/006* (2013.01); *H04L 5/0021* (2013.01); *H04L 5/0023* (2013.01); *H04L 5/0073* (2013.01); *H04W 24/02* (2013.01); *H04W 24/08* (2013.01); *H04W 24/10* (2013.01); *H04W 52/243* (2013.01); *H04W 72/082* (2013.01); *H04W 72/085* (2013.01); *H04W 88/08* (2013.01)

(56) References Cited

U.S. PATENT DOCUMENTS

| | | |
|---|---|---|
| 3,783,397 A | 1/1974 | Dishal |
| 3,887,222 A | 6/1975 | Hammond |
| 3,911,366 A | 10/1975 | Baghdady |
| 4,027,264 A | 5/1977 | Gutleber |
| 4,328,591 A | 5/1982 | Baghdady |
| 4,513,249 A | 4/1985 | Baghdady |
| 4,712,235 A | 12/1987 | Jones |
| 4,761,829 A | 8/1988 | Lynk et al. |
| 4,859,958 A | 8/1989 | Myers |
| 4,992,747 A | 2/1991 | Myers |
| 5,038,115 A | 8/1991 | Myers |
| 5,038,145 A | 8/1991 | DeCesare et al. |
| 5,048,015 A | 9/1991 | Zilberfarb |
| 5,168,508 A | 12/1992 | Iwasaki |
| 5,185,762 A | 2/1993 | Schilling |
| 5,226,057 A | 7/1993 | Boren |
| 5,263,048 A | 11/1993 | Wade |
| 5,282,023 A | 1/1994 | Scarpa |
| 5,301,197 A | 4/1994 | Yamada et al. |
| 5,303,413 A | 4/1994 | Braegas |
| 5,307,517 A | 4/1994 | Rich |
| 5,325,204 A | 6/1994 | Scarpa |
| 5,343,496 A | 8/1994 | Honig |
| 5,381,150 A | 1/1995 | Hawkins et al. |
| 5,475,868 A | 12/1995 | Duque-Anton et al. |
| 5,497,505 A | 3/1996 | Koohgoli et al. |
| 5,500,872 A | 3/1996 | Kinney |
| 5,541,959 A | 7/1996 | Myers |
| 5,570,350 A | 10/1996 | Myer |
| 5,596,600 A | 1/1997 | Dimos |
| 5,640,146 A | 6/1997 | Campana |
| 5,640,385 A | 6/1997 | Long |
| RE35,650 E | 11/1997 | Partyka |
| 5,703,874 A | 12/1997 | Schilling |
| 5,721,733 A | 2/1998 | Wang et al. |
| 5,758,275 A | 5/1998 | Cox |
| 5,822,373 A | 10/1998 | Addy |
| 5,838,742 A | 11/1998 | Abu-Dayya |
| 5,852,630 A | 12/1998 | Langberg |
| 5,857,143 A | 1/1999 | Kataoka |
| 5,926,761 A | 7/1999 | Reed et al. |
| 5,947,505 A | 9/1999 | Martin |
| 5,949,368 A | 9/1999 | DeCesare |
| 5,960,329 A | 9/1999 | Ganesh et al. |
| 5,966,657 A | 10/1999 | Sporre |
| 5,970,105 A | 10/1999 | Dacus |
| 5,974,101 A | 10/1999 | Nago |
| 5,978,362 A | 11/1999 | Lee |
| 5,991,273 A | 11/1999 | Abu-Dayya et al. |
| 5,999,574 A | 12/1999 | Sun et al. |
| 6,005,899 A | 12/1999 | Khayrallah |
| 6,009,129 A | 12/1999 | Kenney et al. |
| 6,020,783 A | 2/2000 | Coppola |
| 6,035,213 A | 3/2000 | Tokuda |
| 6,038,250 A | 3/2000 | Shou et al. |
| 6,047,175 A | 4/2000 | Trompower |
| 6,052,158 A | 4/2000 | Nielsen |
| 6,104,934 A | 8/2000 | Patton |
| 6,115,409 A | 9/2000 | Upadhyay |
| 6,115,580 A | 9/2000 | Chuprun et al. |
| 6,118,805 A | 9/2000 | Bergstrom et al. |
| 6,122,309 A | 9/2000 | Bergstrom et al. |
| 6,125,139 A | 9/2000 | Hendrickson et al. |
| 6,127,962 A | 10/2000 | Martinson |
| 6,130,907 A | 10/2000 | Chen |
| 6,133,942 A | 10/2000 | Lee |
| 6,167,240 A | 12/2000 | Carlsson et al. |
| 6,167,244 A | 12/2000 | Tomoe |
| 6,205,334 B1 | 3/2001 | Dent |
| 6,208,629 B1 | 3/2001 | Jaszewski et al. |
| 6,215,812 B1 | 4/2001 | Young |
| 6,289,004 B1 | 9/2001 | Mesecher et al. |
| 6,313,620 B1 | 11/2001 | Richardson |
| 6,327,245 B1 | 12/2001 | Satyanarayana et al. |
| 6,327,312 B1 | 12/2001 | Jovanovich |
| 6,360,077 B2 | 3/2002 | Mizoguchi |
| 6,377,606 B1 | 4/2002 | Toskala et al. |
| 6,393,284 B1 | 5/2002 | Dent |
| 6,405,043 B1 | 6/2002 | Jensen et al. |
| 6,421,077 B1 | 7/2002 | Reed et al. |
| 6,426,983 B1 | 7/2002 | Rakib et al. |
| 6,430,164 B1 | 8/2002 | Jones |
| 6,490,460 B1 | 12/2002 | Soliman |
| 6,577,670 B1 | 6/2003 | Roberts |
| 6,580,899 B1 | 6/2003 | Dalgleish et al. |
| 6,621,454 B1 | 9/2003 | Reudink et al. |
| 6,631,264 B1 | 10/2003 | Tat et al. |
| 6,631,266 B1 | 10/2003 | Lee et al. |
| 6,671,338 B1 | 12/2003 | Gamal et al. |
| 6,678,520 B1 | 1/2004 | Wang et al. |
| 6,704,378 B2 | 3/2004 | Jagger |
| 6,718,166 B2 | 4/2004 | Cordone |
| 6,791,995 B1 | 9/2004 | Azenkot et al. |
| 6,807,405 B1 | 10/2004 | Jagger |
| 6,843,819 B2 | 1/2005 | Suzuki et al. |
| 6,850,764 B1 | 2/2005 | Patel |
| 6,920,424 B2 | 7/2005 | Padmanabhan |
| 6,959,170 B2 | 10/2005 | Vannatta |
| 6,975,673 B1 | 12/2005 | Rouquette et al. |
| 6,976,044 B1 | 12/2005 | Kilani |
| 7,003,310 B1 | 2/2006 | Youssefmir et al. |
| 7,031,266 B1 | 4/2006 | Patel et al. |
| 7,054,396 B2 | 5/2006 | Shan |
| 7,089,008 B1 | 8/2006 | Bäck et al. |
| 7,103,316 B1 | 9/2006 | Hall |
| 7,317,698 B2 | 1/2008 | Jagger |
| 7,359,691 B2 | 4/2008 | Adachi et al. |
| 7,408,907 B2 | 8/2008 | Diener et al. |
| 7,424,002 B2 | 9/2008 | Barratt et al. |
| 7,424,268 B2 | 9/2008 | Diener et al. |
| 7,457,382 B1 | 11/2008 | Jones et al. |
| 7,477,915 B2 | 1/2009 | Leinonen et al. |
| 7,525,942 B2 | 4/2009 | Cordone |
| 7,929,953 B2 | 4/2011 | Jiang |
| 8,055,191 B2 | 11/2011 | Unger |
| 8,219,105 B2 | 7/2012 | Kronestedt et al. |
| 8,229,368 B1 | 7/2012 | Immendorf et al. |
| 8,238,954 B2 | 8/2012 | Liu et al. |
| 8,412,256 B2 | 4/2013 | Lee et al. |
| 8,422,469 B2 | 4/2013 | Guvenc |
| 8,478,342 B2 | 7/2013 | Vedantham et al. |

(56) References Cited

U.S. PATENT DOCUMENTS

| | | |
|---|---|---|
| 8,503,938 B2 | 8/2013 | Laroia et al. |
| 8,583,170 B2 | 11/2013 | Sundström et al. |
| 8,605,686 B2 | 12/2013 | Lundby et al. |
| 8,718,024 B2 | 5/2014 | Jagger et al. |
| 8,781,044 B2 | 7/2014 | Cordone et al. |
| 8,811,213 B1 | 8/2014 | Rai et al. |
| 8,811,552 B2 | 8/2014 | Bayesteh et al. |
| 8,989,235 B2 | 3/2015 | Myers et al. |
| 9,008,680 B2 | 4/2015 | Abdelmonem |
| 9,042,497 B2 | 5/2015 | Wong et al. |
| 9,071,343 B2 | 6/2015 | Abdelmonem |
| 9,226,303 B2 | 12/2015 | Kronestedt |
| 9,369,909 B2 | 6/2016 | Wong et al. |
| 9,413,677 B1 | 8/2016 | Vargantwar et al. |
| 9,521,603 B2 | 12/2016 | Yamazaki et al. |
| 9,729,301 B2 | 8/2017 | Galeev et al. |
| 9,742,547 B2 | 8/2017 | Wang et al. |
| 2001/0046867 A1 | 11/2001 | Mizoguchi |
| 2002/0057751 A1 | 5/2002 | Jagger |
| 2002/0110206 A1 | 8/2002 | Becker et al. |
| 2002/0155812 A1 | 10/2002 | Takada |
| 2003/0081277 A1 | 5/2003 | Corbeil et al. |
| 2003/0123530 A1 | 7/2003 | Maeda et al. |
| 2003/0142759 A1 | 7/2003 | Anderson et al. |
| 2003/0193366 A1 | 10/2003 | Barksdale |
| 2003/0216122 A1 | 11/2003 | Cordone |
| 2004/0042561 A1 | 3/2004 | Ho et al. |
| 2004/0048574 A1 | 3/2004 | Walker et al. |
| 2004/0088637 A1 | 5/2004 | Wada |
| 2004/0162093 A1 | 8/2004 | Bevan et al. |
| 2004/0202136 A1 | 10/2004 | Attar et al. |
| 2004/0223484 A1 | 11/2004 | Xia et al. |
| 2005/0078734 A1 | 4/2005 | Baker |
| 2005/0117676 A1 | 6/2005 | Liu |
| 2005/0201498 A1 | 9/2005 | Nakai |
| 2006/0025127 A1 | 2/2006 | Cromer et al. |
| 2006/0068849 A1 | 3/2006 | Bernhard et al. |
| 2006/0094372 A1 | 5/2006 | Ahn et al. |
| 2006/0105769 A1 | 5/2006 | Flondro et al. |
| 2006/0153283 A1 | 7/2006 | Scharf et al. |
| 2006/0246938 A1 | 11/2006 | Hulkkonen et al. |
| 2007/0014254 A1 | 1/2007 | Chung et al. |
| 2007/0025455 A1 | 2/2007 | Greenwood et al. |
| 2007/0047494 A1 | 3/2007 | Cordone |
| 2007/0091896 A1 | 4/2007 | Liu |
| 2007/0105520 A1 | 5/2007 | Van Houtum |
| 2007/0115878 A1 | 5/2007 | Ashish et al. |
| 2007/0129071 A1 | 6/2007 | Shapira et al. |
| 2007/0173252 A1 | 7/2007 | Jiang |
| 2007/0183483 A1 | 8/2007 | Narayan |
| 2007/0274279 A1 | 11/2007 | Wood |
| 2008/0043612 A1 | 2/2008 | Geile |
| 2008/0043657 A1 | 2/2008 | Ishii et al. |
| 2008/0081655 A1 | 4/2008 | Shin et al. |
| 2008/0089296 A1 | 4/2008 | Kazmi et al. |
| 2008/0166976 A1 | 7/2008 | Rao et al. |
| 2008/0176519 A1 | 7/2008 | Kwak et al. |
| 2009/0086841 A1 | 4/2009 | Guo et al. |
| 2009/0131067 A1 | 5/2009 | Aaron et al. |
| 2009/0161614 A1 | 6/2009 | Grandblaise |
| 2009/0233544 A1 | 9/2009 | Oyman et al. |
| 2009/0233568 A1 | 9/2009 | Zhang |
| 2009/0247107 A1 | 10/2009 | Roy et al. |
| 2009/0325509 A1 | 12/2009 | Mattisson et al. |
| 2010/0002575 A1 | 1/2010 | Eichinger et al. |
| 2010/0029289 A1 | 2/2010 | Love et al. |
| 2010/0046374 A1 | 2/2010 | Ludwig et al. |
| 2010/0054373 A1 | 3/2010 | Reial et al. |
| 2010/0061244 A1 | 3/2010 | Meier et al. |
| 2010/0099415 A1 | 4/2010 | Li et al. |
| 2010/0118921 A1 | 5/2010 | Abdelmonem et al. |
| 2010/0157934 A1 | 6/2010 | Tanno et al. |
| 2010/0159858 A1 | 6/2010 | Dent et al. |
| 2010/0167778 A1 | 7/2010 | Raghothaman et al. |
| 2010/0202400 A1 | 8/2010 | Richardson |
| 2010/0220670 A1 | 9/2010 | Teo et al. |
| 2010/0227613 A1 | 9/2010 | Kim et al. |
| 2010/0246503 A1 | 9/2010 | Fox et al. |
| 2010/0248736 A1 | 9/2010 | Hulkkonen et al. |
| 2010/0254292 A1 | 10/2010 | Kim et al. |
| 2010/0255868 A1 | 10/2010 | Lee et al. |
| 2010/0279724 A1 | 11/2010 | Li et al. |
| 2010/0309864 A1 | 12/2010 | Tamaki et al. |
| 2010/0310026 A1 | 12/2010 | Sikri et al. |
| 2010/0315970 A1 | 12/2010 | Ramamurthi et al. |
| 2010/0330919 A1 | 12/2010 | Gurney et al. |
| 2011/0014938 A1 | 1/2011 | Shekalim |
| 2011/0096703 A1 | 4/2011 | Nentwig et al. |
| 2011/0117967 A1 | 5/2011 | Vedantham et al. |
| 2011/0136497 A1 | 6/2011 | Youtz et al. |
| 2011/0149764 A1 | 6/2011 | Wietfeldt et al. |
| 2011/0164659 A1 | 7/2011 | Kawamura et al. |
| 2011/0183679 A1 | 7/2011 | Moon et al. |
| 2011/0188544 A1 | 8/2011 | Ponnuswamy et al. |
| 2011/0200126 A1 | 8/2011 | Bontu et al. |
| 2011/0222591 A1 | 9/2011 | Furudate et al. |
| 2011/0258678 A1 | 10/2011 | Cowling et al. |
| 2011/0275399 A1 | 11/2011 | Englund et al. |
| 2011/0305306 A1 | 12/2011 | Hu et al. |
| 2011/0310747 A1 | 12/2011 | Seo et al. |
| 2012/0021753 A1 | 1/2012 | Damnjanovic et al. |
| 2012/0028663 A1 | 2/2012 | Nejatian et al. |
| 2012/0032854 A1 | 2/2012 | Bull et al. |
| 2012/0051315 A1 | 3/2012 | Wang et al. |
| 2012/0069806 A1 | 3/2012 | Norlén et al. |
| 2012/0082050 A1 | 4/2012 | Lysejko et al. |
| 2012/0134280 A1 | 5/2012 | Rotvold et al. |
| 2012/0163223 A1 | 6/2012 | Lo et al. |
| 2012/0164950 A1 | 6/2012 | Nentwig et al. |
| 2012/0182930 A1 | 7/2012 | Sawai et al. |
| 2012/0195216 A1 | 8/2012 | Wu et al. |
| 2012/0207038 A1 | 8/2012 | Choi et al. |
| 2012/0213116 A1 | 8/2012 | Koo et al. |
| 2012/0236731 A1 | 9/2012 | Beaudin |
| 2012/0276937 A1 | 11/2012 | Astely et al. |
| 2012/0282889 A1 | 11/2012 | Tanaka et al. |
| 2012/0282943 A1 | 11/2012 | Hsiao et al. |
| 2012/0307770 A1 | 12/2012 | Kubota |
| 2012/0322453 A1 | 12/2012 | Weng et al. |
| 2013/0012134 A1 | 1/2013 | Jin et al. |
| 2013/0029658 A1 | 1/2013 | Jagger et al. |
| 2013/0058300 A1 | 3/2013 | Perets et al. |
| 2013/0071112 A1 | 3/2013 | Melester et al. |
| 2013/0077670 A1 | 3/2013 | Wang et al. |
| 2013/0090125 A1 | 4/2013 | Clifton et al. |
| 2013/0107737 A1 | 5/2013 | Lee et al. |
| 2013/0115988 A1 | 5/2013 | Sun et al. |
| 2013/0115999 A1 | 5/2013 | Sirotkin et al. |
| 2013/0142136 A1 | 6/2013 | Pi et al. |
| 2013/0143592 A1 | 6/2013 | Brisebois et al. |
| 2013/0150106 A1 | 6/2013 | Bucknell et al. |
| 2013/0163570 A1 | 6/2013 | Zhang et al. |
| 2013/0170829 A1 | 7/2013 | Khatana |
| 2013/0194982 A1 | 8/2013 | Fwu et al. |
| 2013/0242791 A1 | 9/2013 | Lim et al. |
| 2013/0242939 A1 | 9/2013 | Wagner |
| 2013/0287077 A1 | 10/2013 | Fernando et al. |
| 2013/0316710 A1 | 11/2013 | Maaref et al. |
| 2014/0029524 A1 | 1/2014 | Dimou et al. |
| 2014/0086191 A1 | 3/2014 | Berntsen et al. |
| 2014/0105136 A1 | 4/2014 | Tellado et al. |
| 2014/0105262 A1 | 4/2014 | Alloin et al. |
| 2014/0153433 A1 | 6/2014 | Zhou |
| 2014/0160955 A1 | 6/2014 | Lum et al. |
| 2014/0169279 A1 | 6/2014 | Song et al. |
| 2014/0206339 A1 | 7/2014 | Lindoff et al. |
| 2014/0256322 A1 | 9/2014 | Zhou et al. |
| 2014/0269318 A1 | 9/2014 | Hasarchi et al. |
| 2014/0274100 A1 | 9/2014 | Galeev et al. |
| 2014/0315593 A1 | 10/2014 | Vrzic et al. |
| 2014/0378077 A1 | 12/2014 | Din et al. |
| 2015/0092621 A1 | 4/2015 | Jalloul |
| 2015/0099527 A1 | 4/2015 | Zhuang |
| 2015/0244413 A1 | 8/2015 | Baudin et al. |

(56) References Cited

U.S. PATENT DOCUMENTS

| | | |
|---|---|---|
| 2015/0257165 A1 | 9/2015 | Gale et al. |
| 2015/0263844 A1 | 9/2015 | Kinnunen |
| 2015/0295695 A1 | 10/2015 | Davydov et al. |
| 2015/0318944 A1 | 11/2015 | Wigren et al. |
| 2015/0318945 A1 | 11/2015 | Abdelmonem et al. |
| 2016/0050031 A1 | 2/2016 | Hwang et al. |
| 2016/0135061 A1 | 5/2016 | Abdelmonem |
| 2016/0192362 A1 | 6/2016 | Galeev et al. |
| 2016/0198353 A1 | 7/2016 | Abdelmonem |
| 2016/0249364 A1 | 8/2016 | Siomina |
| 2016/0249367 A1 | 8/2016 | Abdelmonem |
| 2016/0254840 A1 | 9/2016 | Abdelmonem et al. |
| 2016/0323086 A1 | 11/2016 | Abdelmonem et al. |
| 2016/0353455 A1 | 12/2016 | Jagger |
| 2017/0188374 A1 | 6/2017 | Galeev |
| 2017/0207816 A1 | 7/2017 | Abdelmonem et al. |
| 2017/0230128 A1 | 8/2017 | Abdelmonem et al. |
| 2017/0230983 A1 | 8/2017 | Abdelmonem et al. |
| 2017/0280464 A1 | 9/2017 | Jagger |
| 2017/0302332 A1 | 10/2017 | Abdelmonem et al. |
| 2017/0310450 A1 | 10/2017 | Galeev |
| 2017/0317807 A1 | 11/2017 | Abdelmonem et al. |
| 2017/0374625 A1 | 12/2017 | Abdelmonem et al. |
| 2017/0374626 A1 | 12/2017 | Abdelmonem et al. |
| 2018/0069682 A1 | 3/2018 | Abdelmonem et al. |
| 2018/0139004 A1 | 5/2018 | Abdelmonem et al. |
| 2018/0167189 A9 | 6/2018 | Abdelmonem et al. |
| 2018/0206240 A1 | 7/2018 | Abdelmonem |
| 2018/0220377 A1 | 8/2018 | Abdelmonem et al. |
| 2018/0254878 A1 | 9/2018 | Abdelmonem et al. |
| 2018/0324710 A1 | 11/2018 | Abdelmonem et al. |
| 2018/0324812 A1 | 11/2018 | Abdelmonem et al. |
| 2018/0332593 A1 | 11/2018 | Galeev et al. |
| 2018/0332594 A1 | 11/2018 | Abdelmonem et al. |
| 2018/0375546 A1 | 12/2018 | Abdelmonem et al. |
| 2018/0376431 A1 | 12/2018 | Abdelmonem et al. |
| 2019/0053247 A1 | 2/2019 | Abdelmonem et al. |
| 2019/0082394 A1 | 3/2019 | Abdelmonem et al. |
| 2019/0116603 A1 | 4/2019 | Abdelmonem et al. |
| 2019/0150099 A1 | 5/2019 | Abdelmonem |
| 2019/0158258 A1 | 5/2019 | Abdelmonem |

FOREIGN PATENT DOCUMENTS

| | | |
|---|---|---|
| CN | 1173101 | 2/1998 |
| EP | 0704986 | 4/1996 |
| EP | 0812069 | 12/1997 |
| EP | 2288061 A1 | 2/2011 |
| EP | 2800412 A1 | 11/2014 |
| GB | 2304000 A | 3/1997 |
| JP | 06-061876 | 3/1994 |
| JP | 09-326713 | 12/1997 |
| WO | 2008033369 A2 | 3/1920 |
| WO | 1998010514 | 3/1998 |
| WO | 2000046929 | 8/2000 |
| WO | 2007063514 | 6/2007 |
| WO | 2009005420 A1 | 1/2009 |
| WO | 2009019074 | 2/2009 |
| WO | 2012116755 | 9/2012 |
| WO | 2012158046 | 11/2012 |
| WO | 2012172476 | 12/2012 |

OTHER PUBLICATIONS

"International Preliminary Report on Patentability", PCT/US2016/026212, dated Nov. 16, 2017, 9 pages.

"International Search Report & Written Opinion", PCT/US01/11351, dated Apr. 2002.

"PCT/US16/26212 International Search Report dated Jun. 7, 2016.", Jun. 7, 2016.

"U.S. Appl. No. 13/956,690, filed Aug. 1, 2013, pp. 4-10".

Berlemann, et al., "Cognitive Radio and Management of Spectrum and Radio Resources in Reconfigurable Networks", Wireless World Research Forum, Working Group 6 White Paper, 2005.

Kim, Kihong, "Interference Mitigation in Wireless Communications", Aug. 23, 2005, 133 pages.

Milstein, "Interference Rejection Techniques in Spread Spectrum Communications", Proceedings of the IEEE, vol. 76, No. 6, Jun. 1988.

Patent Cooperation Treaty, "International Search Report and Written Opinion date Jun. 1, 2010, International Application No. PCT/US2009/064191".

Patent Cooperation Treaty, "International Search Report and Written Opinion dated Jun. 1, 2010, from International Application No. PCT/US2009/064191".

Poor, et al., "Narrowband Interference Suppression in Spread Spectrum COMA", IEEE Personal Communications Magazine, Third Quarter, 1994, pp. 14-27.

Salgado-Galicia, Hector et al., "A Narrowband Approach to Efficient PCS Spectrum Sharing Through Decentralized DCA Access Policies", IEEE Personal Communications, Feb. 1997, 24-34.

Zyren, Jim et al., "Overview of the 3GPP Long Term Evolution Physical Layer", Freescale Semiconductor, Jul. 2007, 27 pages.

900

METHOD AND APPARATUS FOR INCREASING PERFORMANCE OF COMMUNICATION LINKS OF COOPERATIVE COMMUNICATION NODES

CROSS-REFERENCE TO RELATED APPLICATIONS

This application is a continuation of U.S. patent application Ser. No. 16/020,076 filed Jun. 27, 2018, which is a continuation of U.S. patent application Ser. No. 15/688,010 filed Aug. 28, 2017 (now U.S. Pat. No. 10,039,061), which a continuation of U.S. patent application Ser. No. 14/690,765 filed Apr. 20, 2015 (now U.S. Pat. No. 9,775,116), which claims the benefit of U.S. Provisional Application No. 61/988,712 filed May 5, 2014, U.S. Provisional Application No. 62/010,305 filed Jun. 10, 2014, and U.S. Provisional Application No. 62/091,033 filed Dec. 12, 2014. All sections of the aforementioned application(s) and patent(s) are incorporated herein by reference in their entirety.

FIELD OF THE DISCLOSURE

The subject disclosure is related to a method and apparatus for increasing performance of communication links of communication nodes.

BACKGROUND

In most communication environments involving short range or long range wireless communications, interference from unexpected wireless sources can impact the performance of a communication system leading to lower throughput, dropped calls, reduced bandwidth which can cause traffic congestion, or other adverse effects, which are undesirable.

Some service providers of wireless communication systems have addressed interference issues by adding more communication nodes, policing interferers, or utilizing antenna steering techniques to avoid interferers.

BRIEF DESCRIPTION OF THE DRAWINGS

Reference will now be made to the accompanying drawings, which are not necessarily drawn to scale, and wherein.

DETAILED DESCRIPTION

Figure 1:
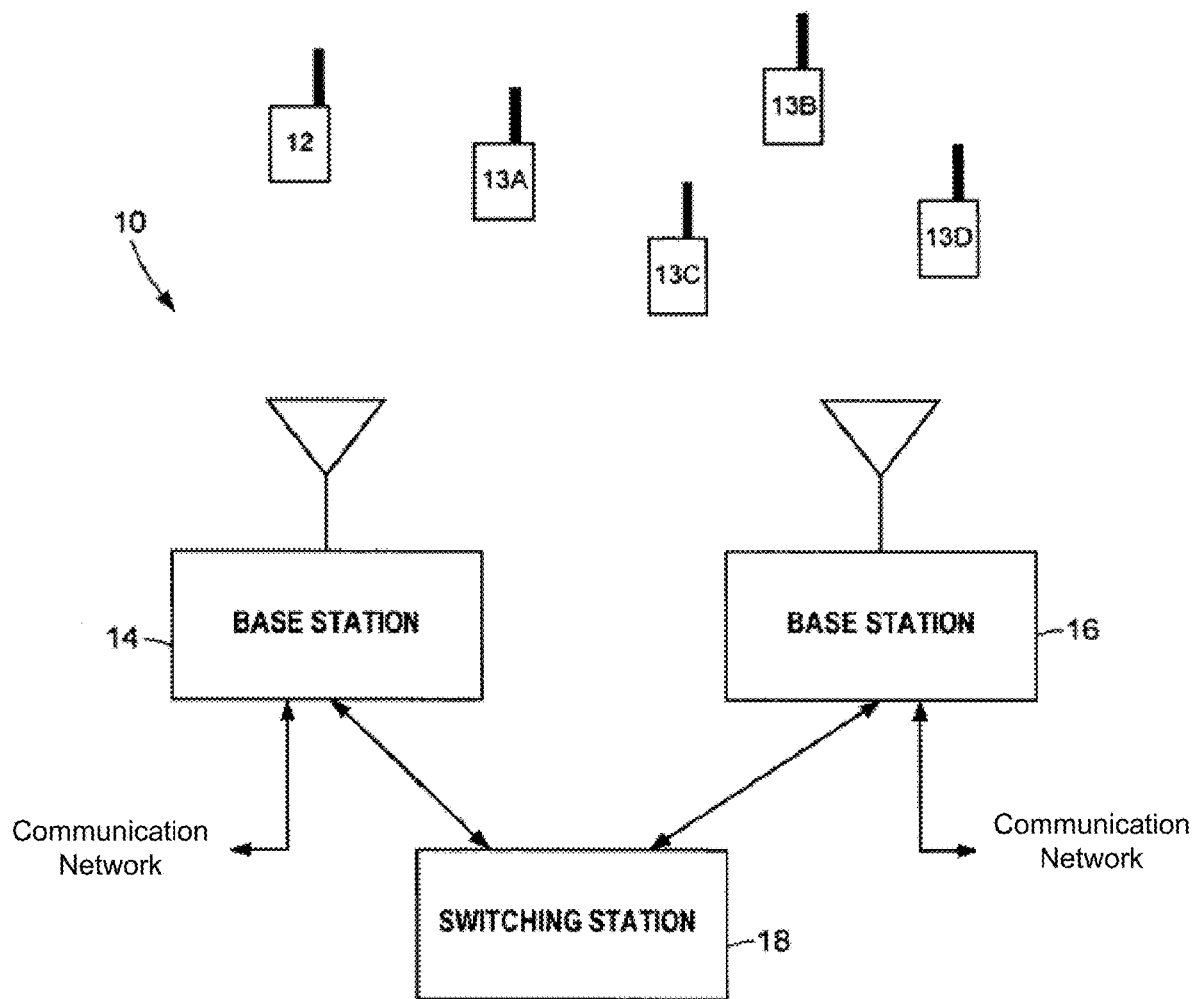
FIG. 1 depicts an illustrative embodiment of a communication system.

The subject disclosure describes, among other things, illustrative embodiments for detecting and mitigating interference signals. Other embodiments are included in the subject disclosure.

One embodiment of the subject disclosure includes a method for determining at least one threshold for detecting signal interference in a first plurality of resource blocks occurring in a first radio frequency spectrum of a first wireless communication system, and detecting signal interference in a first resource block of the first plurality of resource blocks according to the at least one threshold. Responsive to determining that traffic utilization of the first plurality of resource blocks in the first radio frequency spectrum does not cause an inability to redirect at least a portion of the data traffic within the first plurality of resource blocks to avoid the signal interference, initiating a redirection of at least the portion of data traffic to a second resource block of the first plurality of resource blocks. Responsive to determining that traffic utilization of the first plurality of resource blocks in the first radio frequency spectrum causes an inability to redirect at least the portion of the data traffic within the first plurality of resource blocks to avoid the signal interference, determining that a second wireless communication system has a second plurality of resource blocks available to transport at least the portion of the data traffic, and initiating a redirection at least the portion of the data traffic to the second plurality of resource blocks of the second wireless communication system.

One embodiment of the subject disclosure includes a machine-readable storage medium, comprising instructions, which when executed by a processor, cause the processor to perform operations including detecting signal interference in a segment of a first plurality of segments occurring in a first radio frequency spectrum of a first wireless communication system, where the signal interference is intermixed with signals transmitted by a transmitter, and where the signals comprise data traffic. Responsive to determining that traffic utilization of the first plurality of segments in the first radio frequency spectrum does not cause an inability to redirect at least a portion of the data traffic within the first plurality of segments to avoid the signal interference, initiating a redirection of at least the portion of data traffic to a second segment of the first plurality of segments. Responsive to determining that traffic utilization of the first plurality of segments in the first radio frequency spectrum causes an inability to redirect at least the portion of the data traffic within the first plurality of segments to avoid the signal interference, determining that a second wireless communication system operating at a second radio frequency spectrum has a second plurality of segments available to transport at least the portion of the data traffic, wherein the first radio frequency spectrum and the second radio frequency spectrum do not overlap, determining that the second wireless communication system is in a communication range of the transmitter transmitting the signals in the first plurality of segments, and initiating a redirection of at least the portion of the data traffic to the second plurality of segments of the second wireless communication system to avoid the signal interference.

One embodiment of the subject disclosure includes a system having a memory to store instructions, and a processor coupled to the memory. Upon execution of the instructions by the processor, the processor performs operations including receiving signal interference information from a plurality of communication systems that detect signal interference according to at least one threshold, monitoring a location of each of a plurality of communication devices communicatively coupled to the plurality of communication systems, detecting a first communication device of the plurality of communication devices experiencing a degradation in communications with a first communication system of the plurality of communication systems, and facilitating the first communication device to initiate communications with a second communication system of the plurality of communication systems according to the signal interference information and the location of the first communication device, wherein the second communication system is in a communication range of the first communication device, and wherein the second communication system can provide an alternate communication channel to the first communication device with at least less degradation in communications than the first communication system.

As shown in FIG. 1, an exemplary telecommunication system 10 may include mobile units 12, 13A, 13B, 13C, and 13D, a number of base stations, two of which are shown in FIG. 1 at reference numerals 14 and 16, and a switching station 18 to which each of the base stations 14, 16 may be interfaced. The base stations 14, 16 and the switching station 18 may be collectively referred to as network infrastructure.

During operation, the mobile units 12, 13A, 13B, 13C, and 13D exchange voice, data or other information with one of the base stations 14, 16, each of which is connected to a conventional land line communication network. For example, information, such as voice information, transferred from the mobile unit 12 to one of the base stations 14, 16 is coupled from the base station to the communication network to thereby connect the mobile unit 12 with, for example, a land line telephone so that the land line telephone may receive the voice information. Conversely, information, such as voice information may be transferred from a land line communication network to one of the base stations 14, 16, which in turn transfers the information to the mobile unit 12.

The mobile units 12, 13A, 13B, 13C, and 13D and the base stations 14, 16 may exchange information in either narrow band or wide band format. For the purposes of this description, it is assumed that the mobile unit 12 is a narrowband unit and that the mobile units 13A, 13B, 13C, and 13D are wideband units. Additionally, it is assumed that the base station 14 is a narrowband base station that communicates with the mobile unit 12 and that the base station 16 is a wideband digital base station that communicates with the mobile units 13A, 13B, 13C, and 13D.

Narrow band format communication takes place using, for example, narrowband 200 kilohertz (KHz) channels. The Global system for mobile phone systems (GSM) is one example of a narrow band communication system in which the mobile unit 12 communicates with the base station 14 using narrowband channels. Alternatively, the mobile units 13A, 13B, 13C, and 13D communicate with the base stations 16 using a form of digital communications such as, for example, code-division multiple access (CDMA), Universal Mobile Telecommunications System (UMTS), 3GPP Long Term Evolution (LTE), or other next generation wireless access technologies. CDMA digital communication, for instance, takes place using spread spectrum techniques that broadcast signals having wide bandwidths, such as, for example, 1.2288 megahertz (MHz) bandwidths.

The switching station 18 is generally responsible for coordinating the activities of the base stations 14, 16 to ensure that the mobile units 12, 13A, 13B, 13C, and 13D are constantly in communication with the base station 14, 16 or with some other base stations that are geographically dispersed. For example, the switching station 18 may coordinate communication handoffs of the mobile unit 12 between the base stations 14 and another base station as the mobile unit 12 roams between geographical areas that are covered by the two base stations.

One particular problem that may arise in the telecommunication system 10 is when the mobile unit 12 or the base station 14, each of which communicates using narrowband channels, interferes with the ability of the base station 16 to receive and process wideband digital signals from the digital mobile units 13A, 13B, 13C, and 13D. In such a situation, the narrowband signal transmitted from the mobile unit 12 or the base station 14 may interfere with the ability of the base station 16 to properly receive wideband communication signals.

Figure 2:
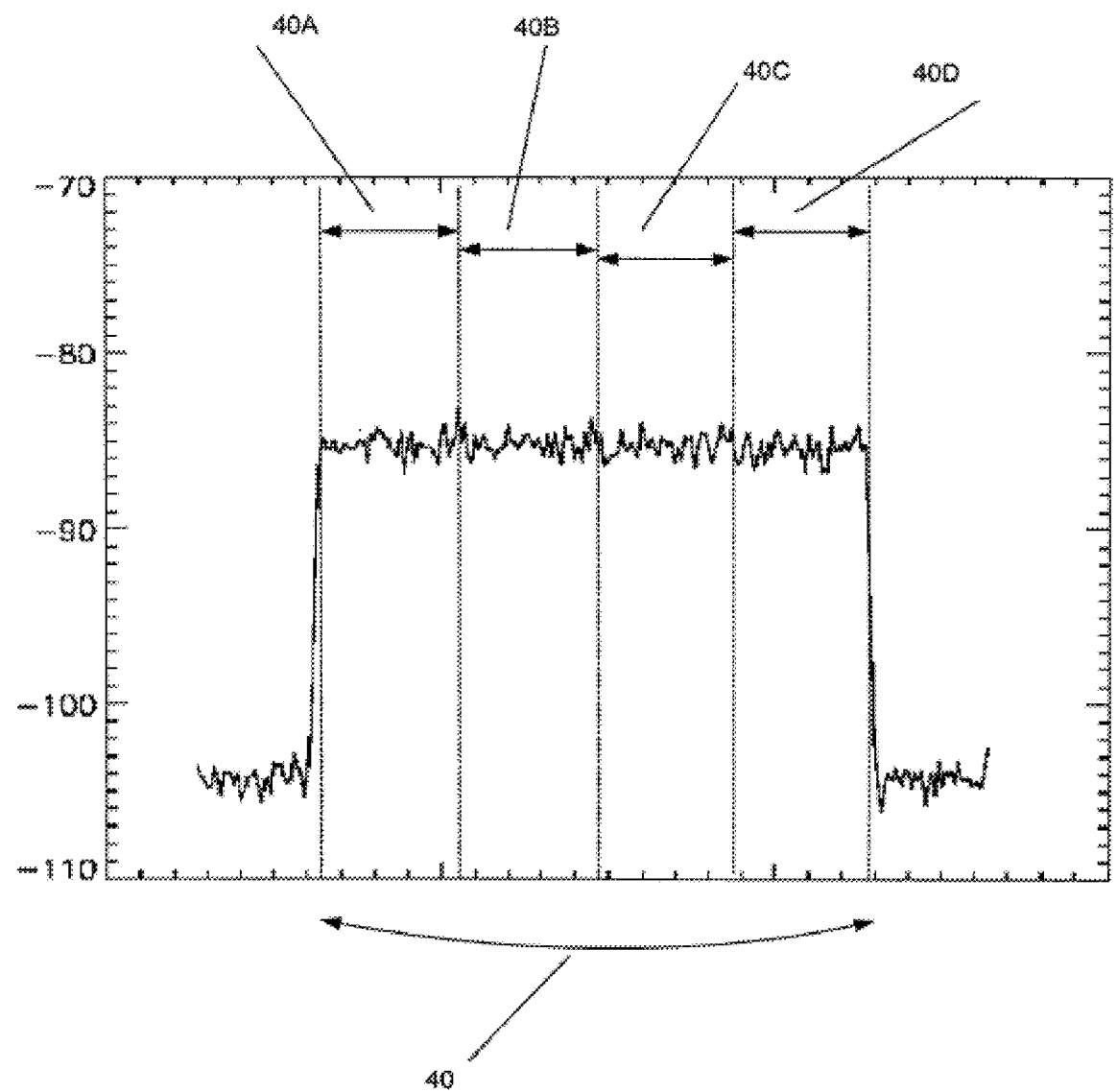
FIG. 2 depicts an illustrative embodiment of a frequency spectrum of a four carrier CDMA signal.
Figure 3:
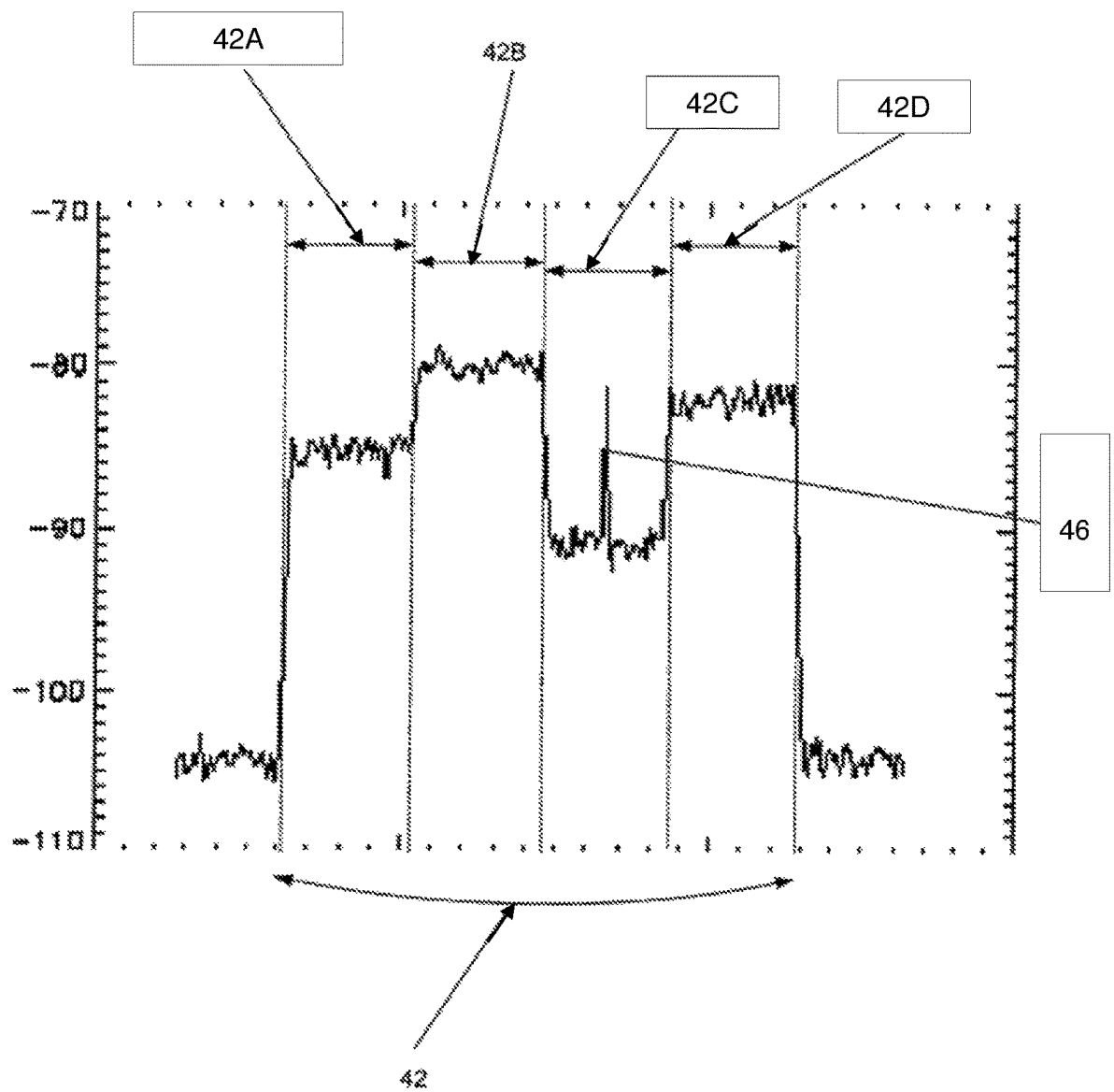
FIG. 3 depicts an illustrative embodiment of a frequency spectrum of a four carrier CDMA signal showing unequal power balancing between the four CDMA carriers and including an interferer.

As will be readily appreciated, the base station 16 may receive and process wideband digital signals from more than one of the digital mobile units 13A, 13B, 13C, and 13D. For example, the base station 16 may be adapted to receive and process four CDMA carriers 40A-40D that fall within a multi-carrier CDMA signal 40, as shown in FIG. 2. In such a situation, narrowband signals transmitted from more than one mobile units, such as, the mobile unit 12, may interfere with the ability of the base station 16 to properly receive wideband communication signals on any of the four CDMA carriers 40A-40D. For example, FIG. 3 shows a multi-carrier CDMA signal 42 containing four CDMA carriers 42A, 42B, 42C and 42D adjacent to each other wherein one of the CDMA carriers 42C has a narrowband interferer 46 therein. As shown in FIG. 3, it is quite often the case that the signal strengths of the CDMA carrier signals 42A-42D are not equal.

As disclosed in detail hereinafter, a system and/or a method for multiple channel adaptive filtering or interference suppression may be used in a communication system. In particular, such a system or method may be employed in a communication system to protect against, or to report the presence of, interference, which has deleterious effects on the performance of the communication system. Additionally, such a system and method may be operated to eliminate interference in CDMA carriers having other CDMA carriers adjacent thereto.

The foregoing system and methods can also be applied to other protocols such as AMPS, GSM, UMTS, LTE, VoLTE, 802.11xx, 5G, next generation wireless protocols, and so on. Additionally, the terms narrowband and wideband referred to above can be replaced with sub-bands, concatenated bands, bands between carrier frequencies (carrier aggregation), and so on, without departing from the scope of the subject disclosure. It is further noted that the term interference can represent emissions within band (narrowband or wideband), out-of-band interferers, interference sources outside cellular (e.g., TV stations, commercial radio or public safety radio), interference signals from other carriers (inter-carrier interference), interference signals from user equipments (UEs) operating in adjacent base stations, and so on. Interference can represent any foreign signal that can affect communications between communication devices (e.g., a UE served by a particular base station).

Figure 4:
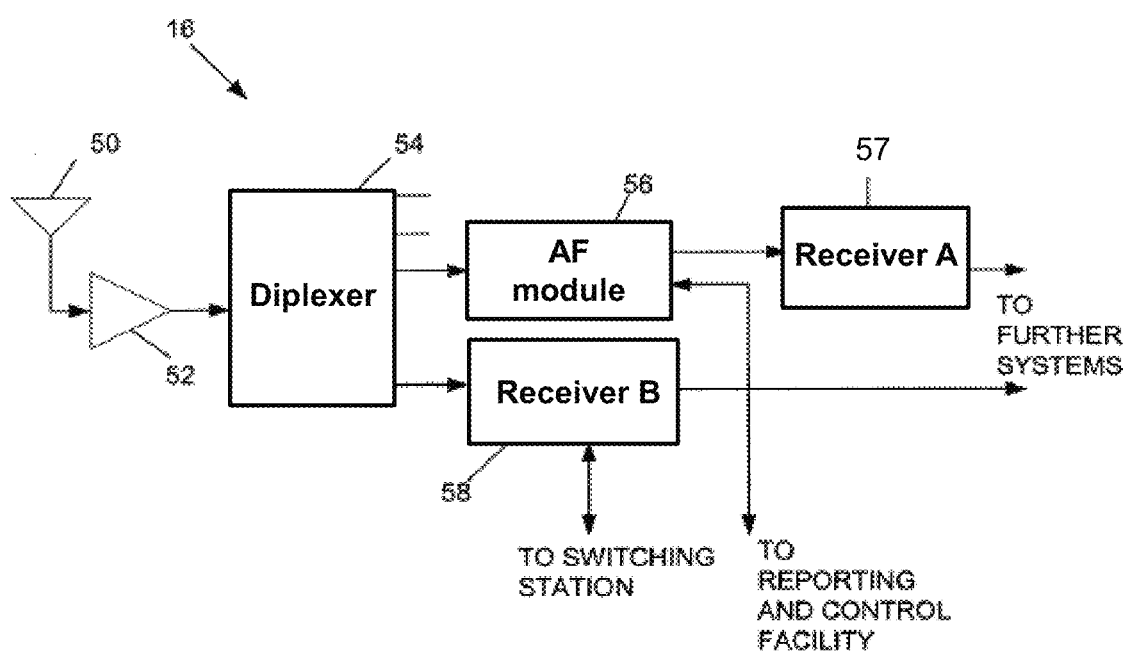
FIG. 4 depicts an illustrative embodiment of a base station of FIG. 1.

As shown in FIG. 4, the signal reception path of the base station 16, which was described as receiving interference from the mobile unit 12 in conjunction with FIG. 1, includes an antenna 50 that provides signals to an amplifier 52. The output of the amplifier 52 is coupled to a diplexer 54 that splits the signal from the amplifier 52 into a number of different paths, one of which may be coupled to an adaptive front end 56 and another of which may be coupled to a receiver A 57. The output of the adaptive front end 56 is coupled to a receiver B 58, which may, for example, be embodied in a CDMA receiver or any other suitable receiver B. Although only one signal path is shown in FIG. 4, it will be readily understood to those having ordinary skill in the art that such a signal path is merely exemplary and that, in reality, a base station may include two or more such signal paths that may be used to process main and diversity signals received by the base station 16.

It will be readily understood that the illustrations of FIG. 4 can also be used to describe the components and functions of other forms of communication devices such as a small cell base station, a microcell base station, a picocell base station, a femto cell, a WiFi router or access point, a cellular phone, a smartphone, a laptop computer, a tablet, or other forms of wireless communication devices suitable for applying the principles of the subject disclosure. Accordingly, such communication devices can include variants of the components shown in FIG. 4 and perform the functions that will be described below. For illustration purposes only, the descriptions below will address the base station 16 with an understanding that these embodiments are exemplary and non-limiting to the subject disclosure.

Referring back to FIG. 4, the outputs of the receiver A 57 and the receiver B 58 can be coupled to other systems within the base station 16. Such systems may perform voice and/or data processing, call processing or any other desired function. Additionally, the adaptive front end module 56 may also be communicatively coupled, via the Internet, telephone lines, cellular network, or any other suitable communication systems, to a reporting and control facility that is remote from the base station 16. In some networks, the reporting and control facility may be integrated with the switching station 18. The receiver A 57 may be communicatively coupled to the switching station 18 and may respond to commands that the switching station 18 issues.

Each of the components 50-58 of the base station 16 shown in FIG. 4, except for the adaptive front end module 56, may be found in a conventional cellular base station 16, the details of which are well known to those having ordinary skill in the art. It will also be appreciated by those having ordinary skill in the art that FIG. 4 does not disclose every system or subsystem of the base station 16 and, rather, focuses on the relevant systems and subsystems to the subject disclosure. In particular, it will be readily appreciated that, while not shown in FIG. 4, the base station 16 can include a transmission system or other subsystems. It is further appreciated that the adaptive front end module 56 can be an integral subsystem of a cellular base station 16, or can be a modular subsystem that can be physically placed in different locations of a receiver chain of the base station 16, such as at or near the antenna 50, at or near the amplifier 52, or at or near the receiver B 58.

During operation of the base station 16, the antenna 50 receives CDMA carrier signals that are broadcast from the mobile unit 13A, 13B, 13C and 13D and couples such signals to the amplifier 52, which amplifies the received signals and couples the amplified signals to the diplexer 54. The diplexer 54 splits the amplified signal from the amplifier 52 and essentially places copies of the amplified signal on each of its output lines. The adaptive front end module 56 receives the signal from the diplexer 54 and, if necessary, filters the CDMA carrier signal to remove any undesired interference and couples the filtered CDMA carrier signal to the receiver B 58.

As noted previously, FIG. 2 illustrates an ideal frequency spectrum 40 of a CDMA carrier signal that may be received at the antenna 50, amplified and split by the amplifier 52 and the diplexer 54 and coupled to the adaptive front end module 56. If the CDMA carrier signal received at the antenna 50 has a frequency spectrum 40 as shown in FIG. 2 without any interference, the adaptive front end will not filter the CDMA carrier signal and will simply couple the signal directly through the adaptive front end module 56 to the receiver B 58.

Figure 5:
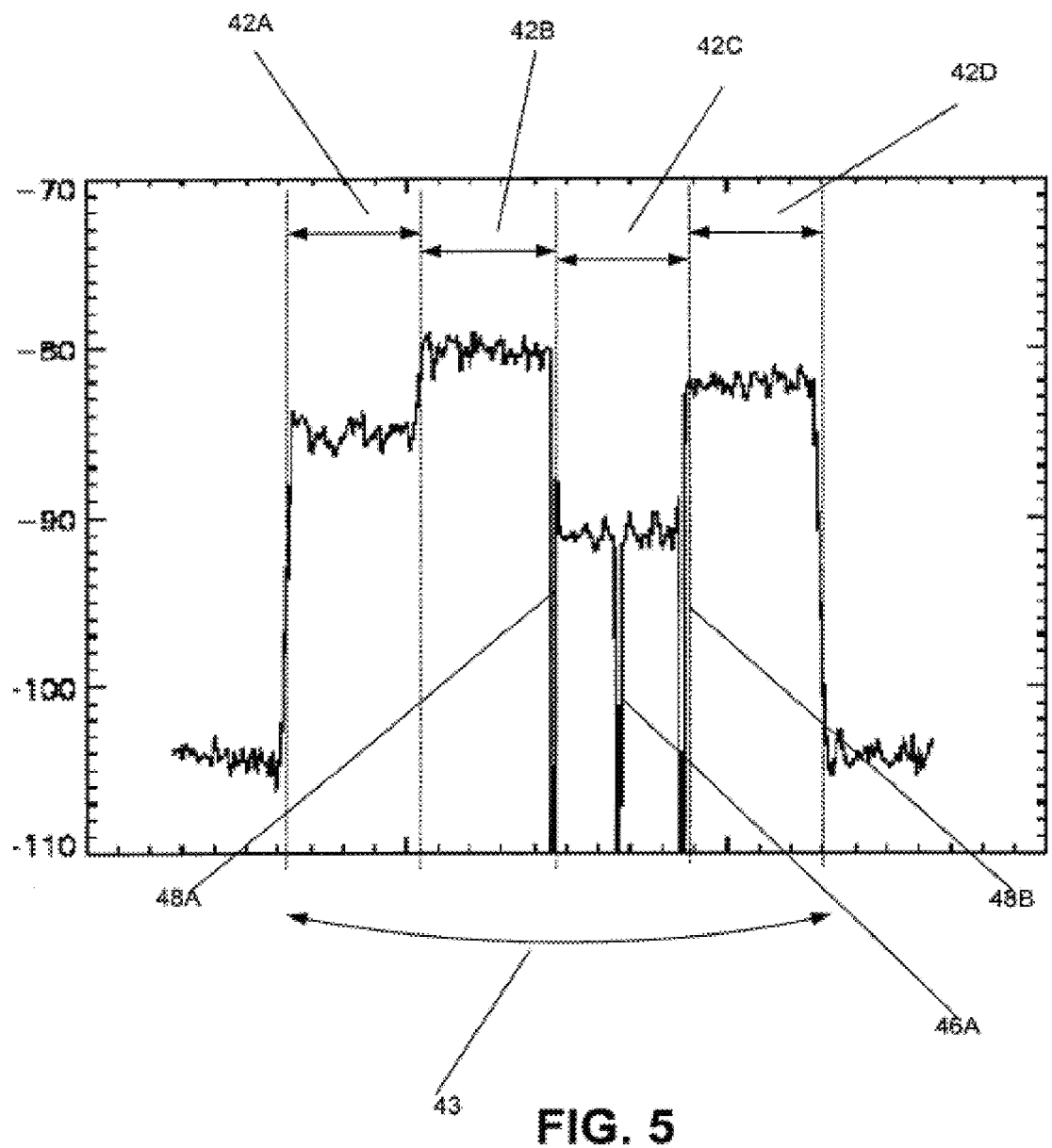
FIG. 5 depicts an illustrative embodiment of a frequency spectrum of a four carrier CDMA signal having four CDMA carriers with suppression of an interferer that results in falsing.

However, as noted previously, it is possible that the CDMA carrier signal transmitted by the mobile units 13A-13D and received by the antenna 50 has a frequency spectrum as shown in FIG. 3 which contains a multi-carrier CDMA signal 42 that includes not only the four CDMA carriers 42A, 42B, 42C and 42D from the mobile units 13A, 13B, 13C and 13D having unequal CDMA carrier strengths, but also includes interferer 46, as shown in FIG. 3, which in this illustration is caused by mobile unit 12. If a multi-carrier CDMA signal having a multi-carrier CDMA signal 42 including interferer 46 is received by the antenna 50 and amplified, split and presented to the adaptive front end module 56, it will filter the multi-carrier CDMA signal 42 to produce a filtered frequency spectrum 43 as shown in FIG. 5.

The filtered multi-carrier CDMA signal 43 has the interferer 46 removed, as shown by the notch 46A. The filtered multi-carrier CDMA signal 43 is then coupled from the adaptive front end module 56 to the receiver B 58, so that the filtered multi-carrier CDMA signal 43 may be demodulated. Although some of the multi-carrier CDMA signal 42 was removed during filtering by the adaptive front end module 56, sufficient multi-carrier CDMA signal 43 remains to enable the receiver B 58 to recover the information that was broadcast by mobile unit(s). Accordingly, in general terms, the adaptive front end module 56 selectively filters multi-carrier CDMA signals to remove interference therefrom. Further detail regarding the adaptive front end module 56 and its operation is provided below in conjunction with FIGS. 6-21.

Figure 6:
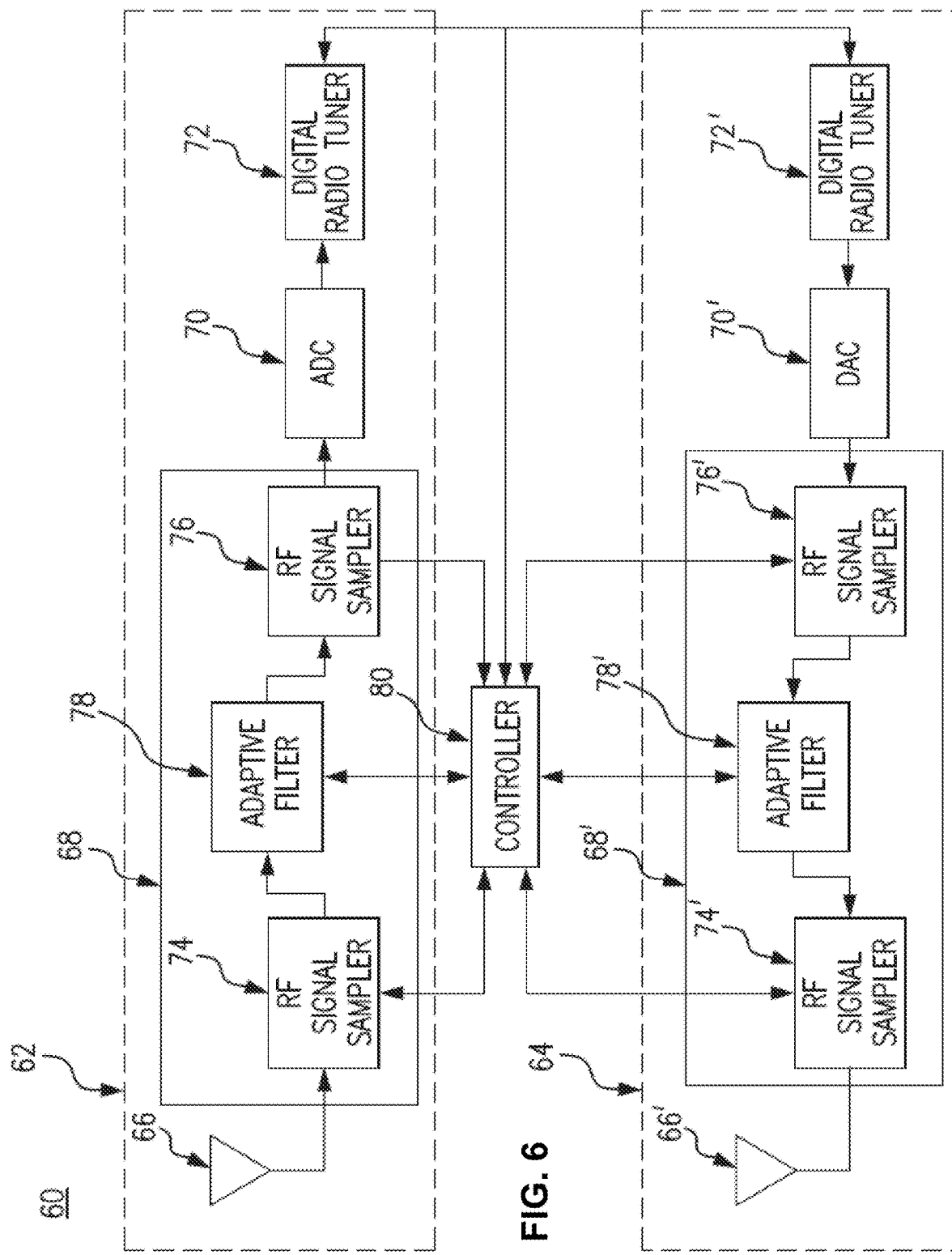
FIG. 6 depicts an illustrative embodiment of an interference detection and mitigation system.

FIG. 6 depicts another example embodiment of the adaptive front end module 56. As noted earlier, the adaptive front end module 56 can be utilized by any communication device including cellular phones, smartphones, tablets, small base stations, femto cells, WiFi access points, and so on. In the illustration of FIG. 6, the adaptive front end module 56 can include a radio 60 comprising two stages, a receiver stage 62 and a transmitter stage 64, each coupled to an antenna assembly 66, 66', which may comprise one of more antennas for the radio 60. The radio 60 has a first receiver stage coupled to the antenna assembly 66 and includes an adaptive front-end controller 68 that receives the input RF signal from the antenna and performs adaptive signal processing on that RF signal before providing the modified RF signal to an analog-to-digital converter 70, which then passes the adapted RF signal to a digital RF tuner 72.

As shown in FIG. 6, the adaptive front end controller 68 of the receiver stage 62 includes two RF signal samplers 74, 76 connected between an RF adaptive filter stage 78 that is controlled by controller 80. The adaptive filter stage 78 may have a plurality of tunable digital filters that can sample an incoming signal and selectively provide bandpass or bandstop signal shaping of an incoming RF signal, whether it is an entire communication signal or a sub-band signal or various combinations of both. A controller 80 is coupled to the samplers 74, 76 and filter stage 78 and serves as an RF link adapter that along with the sampler 74 monitors the input RF signal from the antenna 66 and determines various RF signal characteristics such as the interferences and noise within the RF signal. The controller 80 is configured to execute any number of a variety of signal processing algorithms to analyze the received RF signal, and determine a filter state for the filter stage 78.

By providing tuning coefficient data to the filter stage 78, the adaptive front end controller 68 acts to pre-filter the received RF signal before the signal is sent to the RF tuner 72, which analyzes the filtered RF signal for integrity and/or for other applications such as cognitive radio applications. After filtering, the radio tuner 72 may then perform channel demodulation, data analysis, and local broadcasting functions. The RF tuner 72 may be considered the receiver side of an overall radio tuner, while RF tuner 72' may be considered the transmitter side of the same radio tuner. Prior to sending the filtered RF signal, the sampler 76 may provide an indication of the filtered RF signal to the controller 80 in a feedback manner for further adjusting of the adaptive filter stage 78.

In some examples, the adaptive front-end controller 68 is synchronized with the RF tuner 72 by sharing a master clock signal communicated between the two. For example, cognitive radios operating on a 100 μs response time can be synchronized such that for every clock cycle the adaptive front end analyzes the input RF signal, determines an optimal configuration for the adaptive filter stage 78, filters that RF signal into the filtered RF signal and communicates the same to the radio tuner 72 for cognitive analysis at the radio. By way of example, cellular phones may be implemented with a 200 μs response time on filtering. By implementing the adaptive front end controller 68 using a field programmable gate array configuration for the filter stage, wireless devices may identify not only stationary interference, but also non-stationary interference, of arbitrary bandwidths on that moving interferer.

In some implementations, the adaptive front-end controller 68 may filter interference or noise from the received incoming RF signal and pass that filtered RF signal to the tuner 72. In other examples, such as cascaded configurations in which there are multiple adaptive filter stages, the adaptive front-end controller 68 may be configured to apply the filtered signal to an adaptive bandpass filter stage to create a passband portion of the filtered RF signal. For example, the radio tuner 72 may communicate information to the controller 68 to instruct the controller that the radio is only looking at a portion of an overall RF spectrum and thus cause the adaptive front-end controller 68 not to filter certain portions of the RF spectrum and thereby bandpass only those portions. The integration between the radio tuner 72 and the adaptive front-end controller 68 may be particularly useful in dual-band and tri-band applications in which the radio tuner 72 is able to communicate over different wireless standards, such as GSM, UMTS, or LTE standards.

The algorithms that may be executed by the controller 80 are not limited to interference detection and filtering of interference signals. In some configurations the controller 80 may execute a spectral blind source separation algorithm that looks to isolate two sources from their convolved mixtures. The controller 80 may execute a signal to interference noise ratio (SINR) output estimator for all or portions of the RF signal. The controller 80 may perform bidirectional transceiver data link operations for collaborative retuning of the adaptive filter stage 78 in response to instructions from the radio tuner 72 or from data the transmitter stage 64. The controller 80 can determine filter tuning coefficient data for configuring the various adaptive filters of stage 78 to properly filter the RF signal. The controller 80 may also include a data interface communicating the tuning coefficient data to the radio tuner 72 to enable the radio tuner 72 to determine filtering characteristics of the adaptive filter 78.

In one embodiment the filtered RF signal may be converted from a digital signal to an analog signal within the adaptive front-end controller 68. This allows the controller 68 to integrate in a similar manner to conventional RF filters. In other examples, a digital interface may be used to connect the adaptive front-end controller 68 with the radio tuner 72, in which case the ADC 70 would not be necessary.

The above discussion is in the context of the receiver stage 62. Similar elements are shown in the transmitter stage 64, but bearing a prime. The elements in the transmitter stage 64 may be similar to those of the receiver 62, with the exception of the digital to analog converter (DAC) 70' and other adaptations to the other components shown with a prime in the reference numbers. Furthermore, some or all of these components may in fact be executed by the same corresponding structure in the receiver stage 62. For example, the RF receiver tuner 72 and the transmitter tuner 72' may be performed by a single tuner device. The same may be true for the other elements, such as the adaptive filter stages 78 and 78', which may both be implemented in a single FPGA, with different filter elements in parallel for full duplex (simultaneous) receive and transmit operation.

Figure 7:
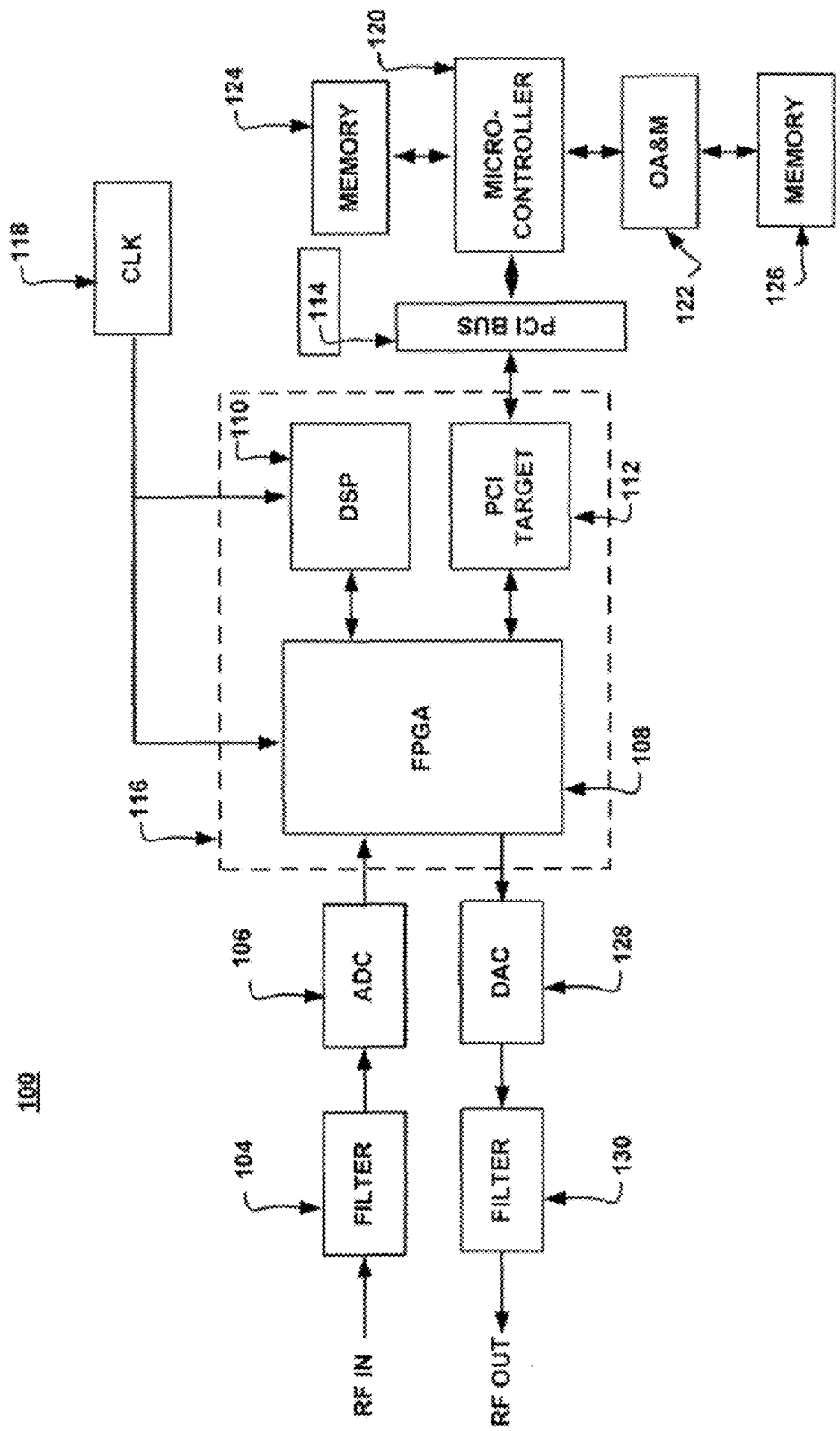
FIG. 7 depicts an illustrative embodiment of an interference detection and mitigation system.

FIG. 7 illustrates another example implementation of an adaptive front-end controller 100. Input RF signals are received at an antenna (not shown) and coupled to an initial analog filter 104, such as low noise amplifier (LNA) block, then digitally converted via an analog to digital converter (ADC) 106, prior to the digitized input RF signal being coupled to a field programmable gate array (FPGA) 108. The adaptive filter stage described above may be implemented within the FPGA 108, which has been programmed to contain a plurality of adaptive filter elements tunable to different operating frequencies and frequency bands, and at least some being adaptive from a bandpass to a bandstop configuration or vice versa, as desired. Although an FPGA is illustrated, it will be readily understood that other architectures such as an application specific integrated circuit (ASIC) or a digital signal processor (DSP) may also be used to implement a digital filter architecture described in greater detail below.

A DSP 110 is coupled to the FPGA 108 and executes signal processing algorithms that may include a spectral blind source separation algorithm, a signal to interference noise ratio (SINR) output estimator, bidirectional transceiver data line operation for collaborative retuning of the adaptive filter stage in response to instructions from the tuner, and/or an optimal filter tuning coefficients algorithm.

FPGA 108 is also coupled to a PCI target 112 that interfaces the FPGA 108 and a PCI bus 114 for communicating data externally. A system clock 118 provides a clock input to the FPGA 108 and DSP 110, thereby synchronizing the components. The system clock 118 may be locally set on the adaptive front-end controller, while in other examples the system claim 118 may reflect an external master clock, such as that of a radio tuner. The FPGA 108, DSP 110, and PCI target 112, designated collectively as signal processing module 116, will be described in greater detail below. In the illustrated example, the adaptive front-end controller 100 includes a microcontroller 120 coupled to the PCI bus 114 and an operations, alarms and metrics (OA&M) processor 122. Although they are shown and described herein as separate devices that execute separate software instructions, those having ordinary skill in the art will readily appreciate that the functionality of the microcontroller 120 and the OA&M processor 122 may be merged into a single processing device. The microcontroller 120 and the OA&M processor 122 are coupled to external memories 124 and 126, respectively. The microcontroller 120 may include the ability to communicate with peripheral devices, and, as such, the microcontroller 120 may be coupled to a USB port, an Ethernet port, or an RS232 port, among others (though none shown). In operation, the microcontroller 120 may locally store lists of channels having interferers or a list of known typically available frequency spectrum bands, as well as various other parameters. Such a list may be transferred to a reporting and control facility or a base station, via the OA&M processor 122, and may be used for system diagnostic purposes.

The aforementioned diagnostic purposes may include, but are not limited to, controlling the adaptive front-end controller 100 to obtain particular information relating to an interferer and retasking the interferer. For example, the reporting and control facility may use the adaptive front-end controller 100 to determine the identity of an interferer, such as a mobile unit, by intercepting the electronic serial number (ESN) of the mobile unit, which is sent when the mobile unit transmits information on the channel. Knowing the identity of the interferer, the reporting and control facility may contact infrastructure that is communicating with the mobile unit (e.g., the base station) and may request the infrastructure to change the transmit frequency for the mobile unit (i.e., the frequency of the channel on which the mobile unit is transmitting) or may request the infrastructure to drop communications with the interfering mobile unit altogether.

Additionally, in a cellular configuration (e.g., a system based on a configuration like that of FIG. 1) diagnostic purposes may include using the adaptive front-end controller 100 to determine a telephone number that the mobile unit is attempting to contact and, optionally handling the call. For example, the reporting and control facility may use the adaptive front-end controller 100 to determine that the user of the mobile unit was dialing 911, or any other emergency number, and may, therefore, decide that the adaptive front-end controller 100 should be used to handle the emergency call by routing the output of the adaptive front-end controller 100 to a telephone network.

The FPGA 108 can provide a digital output coupled to a digital to analog converter (DAC) 128 that converts the digital signal to an analog signal which may be provided to a filter 130 to generate a filtered RF output to be broadcast from the base station or mobile station. The digital output at the FPGA 108, as described, may be one of many possible outputs. For example, the FPGA 108 may be configured to output signals based on a predefined protocol such as a Gigabit Ethernet output, an open base station architecture initiative (OBSAI) protocol, or a common public radio interface (CPRI) protocol, among others.

It is further noted that the aforementioned diagnostic purposes may also include creating a database of known interferers, the time of occurrence of the interferers, the frequency of occurrence of the interferers, spectral information relating to the interferers, a severity analysis of the interferers, and so on. The identity of the interferers may be based solely on spectral profiles of each interferer that can be used for identification purposes. Although the aforementioned illustrations describe a mobile unit 12 as an interferer, other sources of interference are possible. Any electronic appliance that generates electromagnetic waves such as, for example, a computer, a set-top box, a child monitor, a wireless access point (e.g., WiFi, ZigBee, Bluetooth, etc.) can be a source of interference. In one embodiment, a database of electronic appliances can be analyzed in a laboratory setting or other suitable testing environment to determine an interference profile for each appliance. The interference profiles can be stored in a database according to an appliance type, manufacturer, model number, and other parameters that may be useful in identifying an interferer. Spectral profiles provided by, for example, the OA&M processor 108 to a diagnostic system can be compared to a database of previously characterized interferers to determine the identity of the interference when a match is detected.

A diagnostic system, whether operating locally at the adaptive front end controller, or remotely at a base station, switching station, or server system, can determine the location of the interferer near the base station (or mobile unit) making the detection, or if a more precise location is required, the diagnostic system can instruct several base stations (or mobile units) to perform triangulation analysis to more precisely locate the source of the interference if the interference is frequent and measureable from several vantage points. With location data, interference identity, timing and frequency of occurrence, the diagnostic system can generate temporal and geographic reports showing interferers providing field personnel a means to assess the volume of interference, its impact on network performance, and it may provide sufficient information to mitigate interference by means other than filtering, such as, for example, interference avoidance by way of antenna steering at the base station, beam steering, retasking an interferer when possible, and so on.

Figure 8:
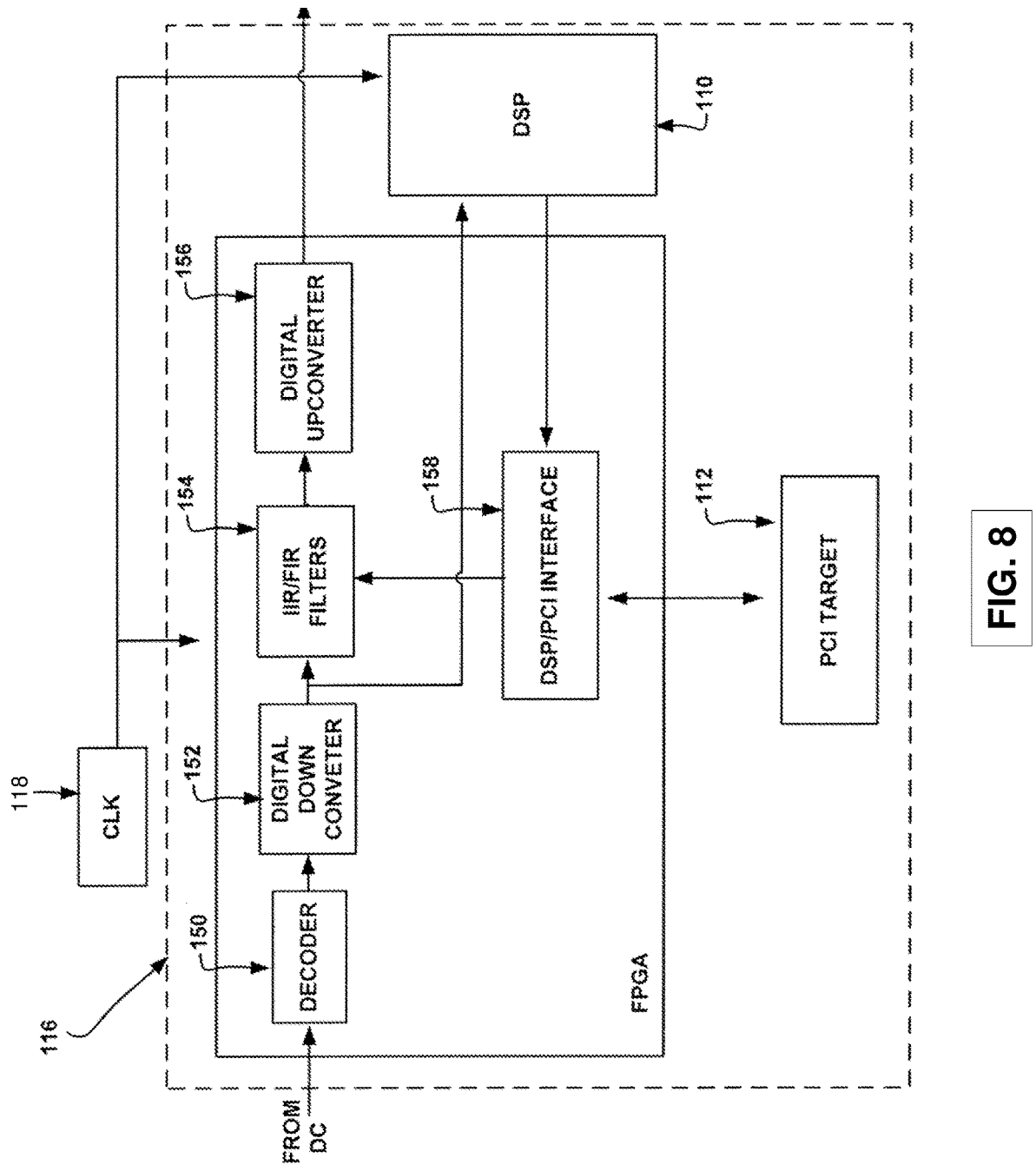
FIG. 8 depicts an illustrative embodiment of signal processing module of FIG. 7.

FIG. 8 illustrates further details of an example implementation of a signal processing module 116 that may serve as another embodiment of an adaptive front end controller, it being understood that other architectures may be used to implement a signal detection algorithm. A decoder 150 receives an input from the ADC 106 and decodes the incoming data into a format suitable to be processed by the signal processing module 116. A digital down converter 152, such as a polyphase decimator, down converts the decoded signal from the decoder 150. The decoded signal is separated during the digital down conversion stage into a complex representation of the input signal, that is, into In-Phase (I) and Quadrature-Phase (Q) components which are then fed into a tunable infinite impulse response (IIR)/finite impulse response (FIR) filter 154. The IIR/FIR filter 154 may be implemented as multiple cascaded or parallel IIR and FIR filters. For example, the IIR/FIR filter 154 may be used with multiple filters in series, such as initial adaptive bandpass filter followed by adaptive bandstop filter. For example, the bandpass filters may be implemented as FIR filters, while the bandstop filters may be implemented as IIR filters. In an embodiment, fifteen cascaded tunable IIR/FIR filters are used to optimize the bit width of each filter. Of course other digital down converters and filters such as cascaded integrator-comb (CIC) filters may be used, to name a few. By using complex filtering techniques, such as the technique described herein, the sampling rate is lowered thereby increasing (e.g., doubling) the bandwidth that the filter 154 can handle. In addition, using complex arithmetic also provides the signal processing module 116 the ability to perform higher orders of filtering with greater accuracy.

The I and Q components from the digital down converter 152 are provided to the DSP 110 which implements a detection algorithm and in response provides the tunable IIR/FIR filter 154 with tuning coefficient data that tunes the IIR and/or FIR filters 154 to specific notch (or bandstop) and/or bandpass frequencies, respectively, and specific bandwidths. The tuning coefficient data, for example, may include a frequency and a bandwidth coefficient pair for each of the adaptive filters, which enables the filter to tune to a frequency for bandpass or bandstop operation and the bandwidth to be applied for that operation. The tuning coefficient data corresponding to a bandpass center frequency and bandwidth may be generated by the detection algorithm and passed to a tunable FIR filter within the IIR/FIR filter 154. The filter 154 may then pass all signals located within a passband of the given transmission frequency. Tuning coefficient data corresponding to a notch (or bandstop) filter may be generated by the detection algorithm and then applied to an IIR filter within the IIR/FIR filter 154 to remove any interference located within the passband of the bandpass filter. The tuning coefficient data generated by the detection algorithm are implemented by the tunable IIR/FIR filters 154 using mathematical techniques known in the art. In the case of a cognitive radio, upon implementation of the detection algorithm, the DSP 110 may determine and return coefficients corresponding to a specific frequency and bandwidth to be implemented by the tunable IIR/FIR filter 154 through a DSP/PCI interface 158. Similarly, the transfer function of a notch (or bandstop) filter may also be implemented by the tunable IIR/FIR filter 154. Of course other mathematical equations may be used to tune the IIR/FIR filters 154 to specific notch, bandstop, or bandpass frequencies and to a specific bandwidth.

After the I and Q components are filtered to the appropriate notch (or bandstop) or bandpass frequency at a given bandwidth, a digital upconverter 156, such as a polyphase interpolator, converts the signal back to the original data rate, and the output of the digital upconverter is provided to the DAC 128.

A wireless communication device capable to be operated as a dual- or tri-band device communicating over multiple standards, such as over UMTS and LTE may use the adaptive digital filter architecture embodiments as described above. For example, a dual-band device (using both LTE and UMTS) may be preprogrammed within the DSP 110 to transmit first on LTE, if available, and on UMTS only when outside of a LTE network. In such a case, the IIR/FIR filter 154 may receive tuning coefficient data from the DSP 110 to pass all signals within a LTE range. That is, the tuning coefficient data may correspond to a bandpass center frequency and bandwidth adapted to pass only signals within the LTE range. The signals corresponding to a UMTS signal may be filtered, and any interference caused by the UMTS signal may be filtered using tuning coefficients, received from the DSP 110, corresponding to a notch (or band stop) frequency and bandwidth associated with the UMTS interference signal.

Alternatively, in some cases it may be desirable to keep the UMTS signal in case the LTE signal fades quickly and the wireless communication device may need to switch communication standards rapidly. In such a case, the UMTS signal may be separated from the LTE signal, and both passed by the adaptive front-end controller. Using the adaptive digital filter, two outputs may be realized, one output corresponding to the LTE signal and one output corresponding to a UMTS signal. The DSP 110 may be programmed to again recognize the multiple standard service and may generate tuning coefficients corresponding to realize a filter, such as a notch (or bandstop) filter, to separate the LTE signal from the UMTS signal. In such examples, an FPGA may be programmed to have parallel adaptive filter stages, one for each communication band.

To implement the adaptive filter stages, in some examples, the signal processing module 116 is pre-programmed with general filter architecture code at the time of production, for example, with parameters defining various filter types and operation. The adaptive filter stages may then be programmed, through a user interface or other means, by the service providers, device manufactures, etc., to form the actual filter architecture (parallel filter stages, cascaded filter stages, etc.) for the particular device and for the particular network(s) under which the device is to be used. Dynamic flexibility can be achieved during runtime, where the filters may be programmed to different frequencies and bandwidths, each cycle, as discussed herein.

One method of detecting a signal having interference is by exploiting the noise like characteristics of a signal. Due to such noise like characteristics of the signal, a particular measurement of a channel power gives no predictive power as to what the next measurement of the same measurement channel may be. In other words, consecutive observations of power in a given channel are un-correlated. As a result, if a given measurement of power in a channel provides predictive power over subsequent measurements of power in that particular channel, thus indicating a departure from statistics expected of a channel without interference, such a channel may be determined to contain interference.

Figure 9:
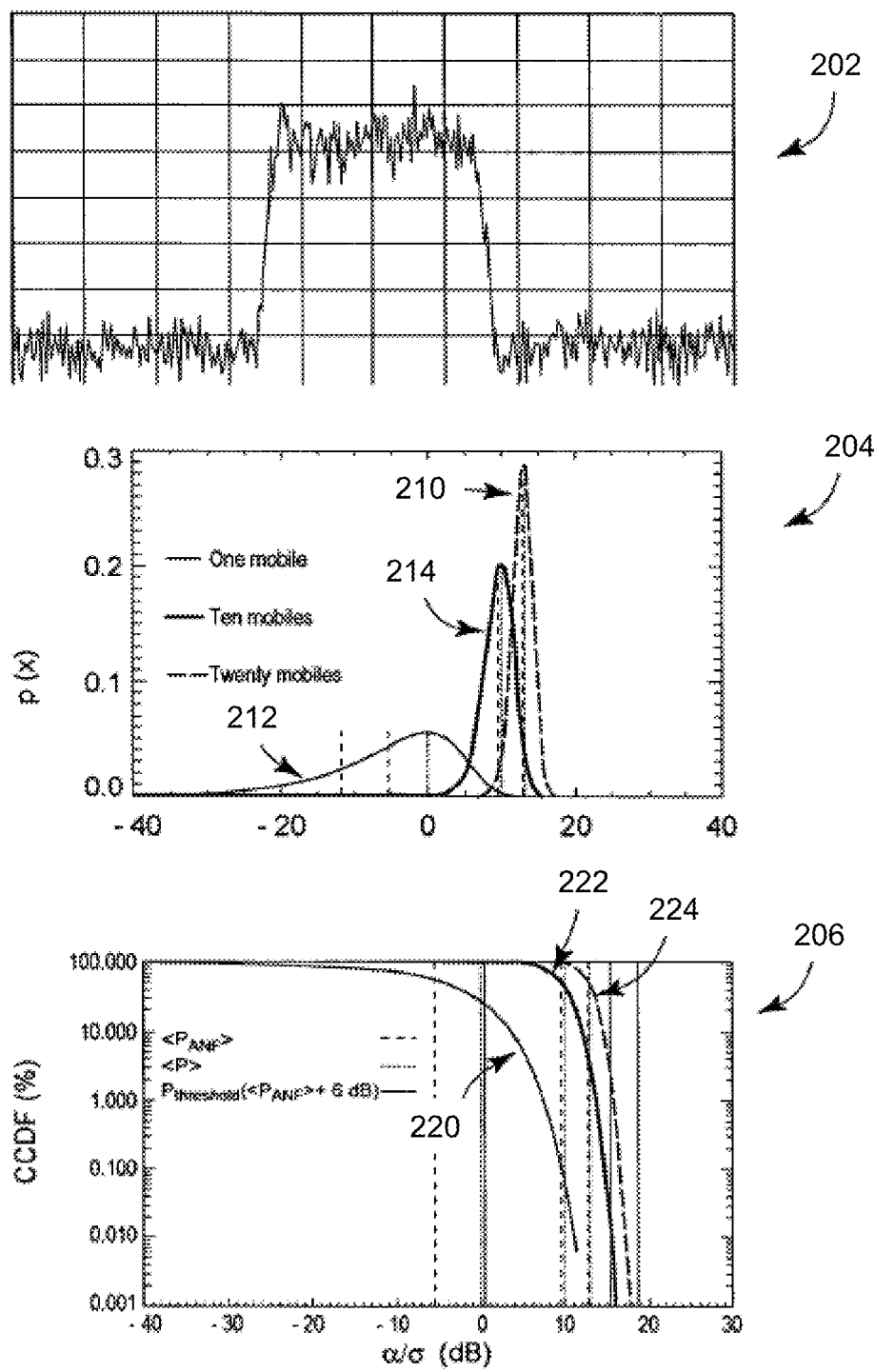
FIG. 9 depicts an illustrative embodiment of plots of a spread spectrum signal.

FIG. 9 illustrates an IS-95 CDMA signal 202, which is a generic Direct Sequence Spread Spectrum (DSSS) signal. The CDMA signal 202 may have a bandwidth of 1.2288 MHz and it may be used to carry up to 41 channels, each of which has a bandwidth of 30 kHz. One way to identify interference affecting the CDMA signal 202 may be to identify any of such 41 channels having excess power above an expected power of the CDMA signal 202. FIG. 9 also illustrates the probability distribution functions (PDFs) 204 of a typical DSSS signal and a complementary cumulative distribution functions (CCDFs) 206 of a typical DSSS signal, which may be used to establish a criteria used to determine channels disposed within a signal and having excess power.

Specifically, the PDFs 204 include probability distribution of power in a given channel, which is the likelihood p(x) of measuring a power x in a given channel, for a DSSS signal carrying one mobile unit (212), for a DSSS signal carrying ten mobile units (214), and for a DSSS signal carrying twenty mobile units (210). For example, for the PDF 212, representing a DSSS signal carrying one mobile unit, the distribution p(x) is observed to be asymmetric, with an abbreviated high power tail. In this case, any channel having power higher than the high power tail of the PDF 212 may be considered to have an interference signal.

The CCDFs 206 denote the likelihood that a power measurement in a channel will exceed a given mean power α, by some value α/σ wherein σ is standard deviation of the power distribution. Specifically, the CCDFs 206 include an instance of CCDF for a DSSS signal carrying one mobile unit (220), an instance of CCDF for a DSSS signal carrying ten mobile units (222), and an instance of CCDF for a DSSS signal carrying twenty mobile units (224). Thus, for example, for a DSSS signal carrying one mobile unit, the likelihood of any channel having the ratio α/σ of 10 dB or more is 0.01%. Therefore, an optimal filter can be tuned to such a channel having excess power.

One method of detecting such a channel having interference is by exploiting the noise like characteristic of a DSSS signal. Due to such noise like characteristic of DSSS signal, a particular measurement of a channel power gives no predictive power as to what the next measurement of the same measurement channel may be. In other words, consecutive observations of power in a given channels are un-correlated. As a result, if a given measurement of power in a channel provides predictive power over subsequent measurements of power in that particular channel, thus indicating a departure from statistics expected of a channel without interference, such a channel may be determined to contain interference.

Figure 10:
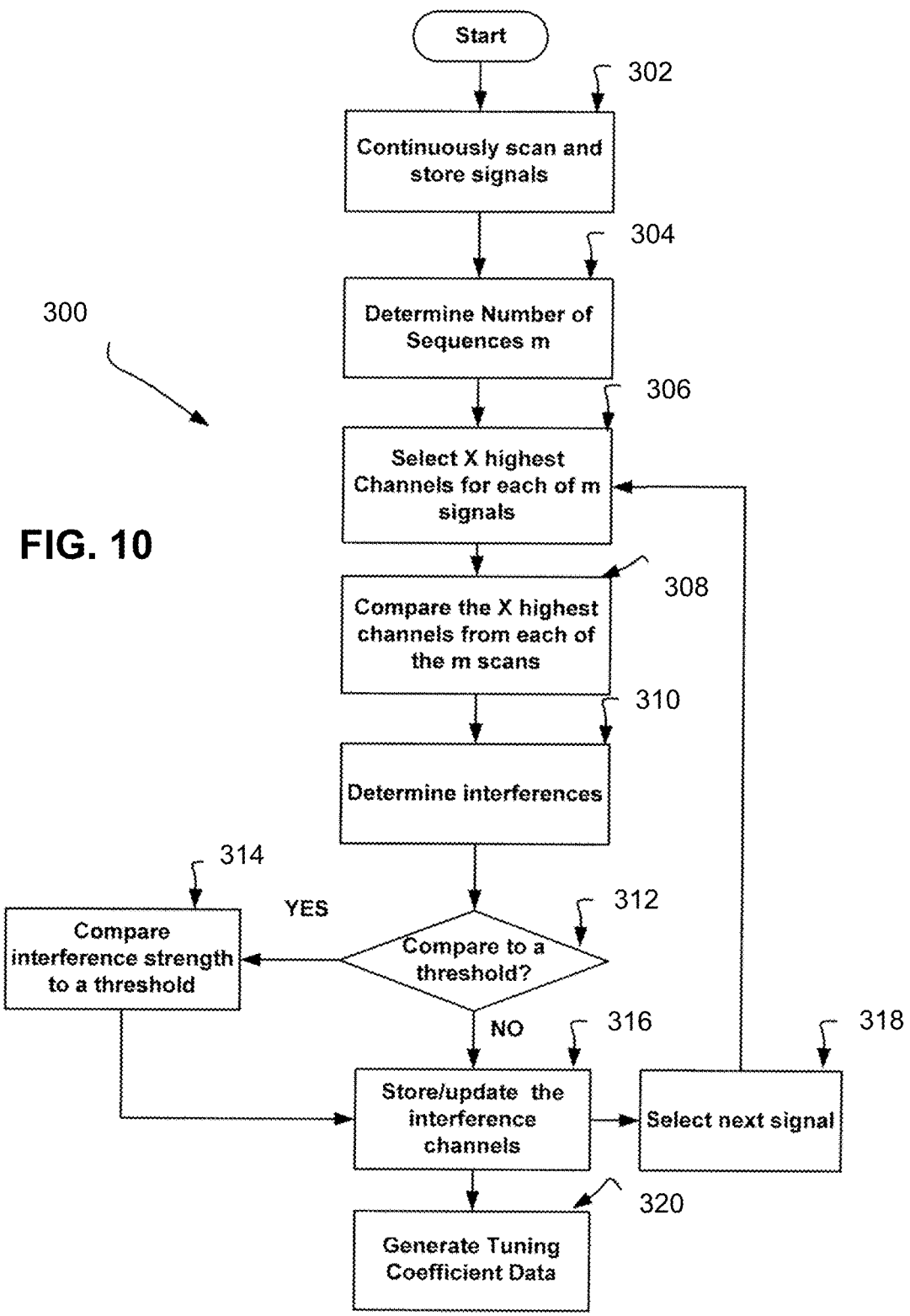
FIG. 10 depicts an illustrative embodiment of a method for interference detection.

FIG. 10 illustrates a flowchart of an interference detection program 300 that may be used to determine location of interference in a DSSS signal. At block 302 a series of DSSS signals can be scanned by the adaptive front end controller described above and the observed values of the signal strengths can be stored for each of various channels located in the DSSS signal. For example, at block 302 the adaptive front end controller may continuously scan the 1.2288 MHz DSSS signal for each of the 41 channels dispersed within it. The adaptive front end controller may be implemented by any well-known analog scanner or digital signal processor (DSP) used to scan and store signal strengths in a DSSS signal. The scanned values of signal strengths may be stored in a memory of such DSP or in any other computer readable memory. The adaptive front end controller may store the signal strength of a particular channel along with any information, such as a numeric identifier, identifying the location of that particular channel within the DSSS signal.

At block 304 the adaptive front end controller can determine the number of sequences m of a DSSS signal that may be required to be analyzed to determine channels having interference. A user may provide such a number m based on any predetermined criteria. For example, a user may provide m to be equal to four, meaning that four consecutive DSSS signals need to be analyzed to determine if any of the channels within that DSSS signal spectrum includes an interference signal. As one of ordinary skill in the art would appreciate, the higher is the selected value of m, the more accurate will be the interference detection. However, the higher the number m is, the higher is the delay in determining whether a particular DSSS signal had an interference present in it, subsequently, resulting in a longer delay before a filter is applied to the DSSS signal to remove the interference signal.

Generally, detection of an interference signal may be performed on a rolling basis. That is, at any point in time, m previous DSSS signals may be used to analyze presence of an interference signal. The earliest of such m interference signals may be removed from the set of DSSS signals used to determine the presence of an interference signal on a first-in-first-out basis. However, in an alternate embodiment, an alternate sampling method for the set of DSSS signals may also be used.

At block 306 the adaptive front end controller can select x channels having the highest signal strength from each of the m most recent DSSS signals scanned at the block 302. The number x may be determined by a user. For example, if x is selected to be equal to three, the block 306 may select three highest channels from each of the m most recent DSSS signals. The methodology for selecting x channels having highest signal strength from a DSSS signal is described in further detail in FIG. 11 below. For example, the adaptive front end controller at block 306 may determine that the first of the m DSSS signals has channels 10, 15 and 27 having the highest signal strengths, the second of the m DSSS channels has channels 15 and 27 and 35 having the highest signal strengths, and the third of the m DSSS channels has the channels 15, 27 and 35 having the highest signal strength.

After having determined the x channels having the highest signal strengths in each of the m DSSS signals, at block 308 the adaptive front end controller can compare these x channels to determine if any of these highest strength channels appear more than once in the m DSSS signals. In case of the example above, the adaptive front end controller at block 308 may determine that the channels 15 and 27 are present among the highest strength channels for each of the last three DSSS signals, while channel 35 is present among the highest strength channels for at least two of the last three DSSS signals.

Such consistent appearance of channels having highest signal strength over subsequent DSSS signals indicate that channels 15 and 27, and probably the channel 35, may have an interference signal super-imposed on them. At block 310 the adaptive front end controller may use such information to determine which channels may have interference. For example, based on the number of times a given channel appears in the selected highest signal strength channels, the adaptive front end controller at block 310 may determine the confidence level that may be assigned to a conclusion that a given channel contains an interference signal.

Alternatively, at block 310 the adaptive front end controller may determine a correlation factor for each of the various channels appearing in the x selected highest signal strength channels and compare the calculated correlation factors with a threshold correlation factor to determine whether any of the x selected channels has correlated signal strengths. Calculating a correlation factor based on a series of observations is well known to those of ordinary skill in the art and therefore is not illustrated in further detail herein. The threshold correlation factor may be given by the user of the interference detection program 300.

Note that while in the above illustrated embodiment, the correlation factors of only the selected highest signal strength channels are calculated, in an alternate embodiment, correlation factors of all the channels within the DSSS signals may be calculated and compared to the threshold correlation factor.

Empirically, it may be shown that when m is selected to be equal to three, for a clean DSSS signal, the likelihood of having at least one match among the higher signal strength channels is 0.198, the likelihood of having at least two matches among the higher signal strength channels is 0.0106, and the likelihood of having at least three matches among the higher signal strength channels is $9.38 \times 10^{-5}$. Thus, the higher the number of matches, the lesser is the likelihood of having a determination that one of the x channels contains an interference signal (i.e., a false positive interference detection). It may be shown that if the number of scans m is increased to, say four DSSS scans, the likelihood of having such matches in m consecutive scans is even smaller, thus providing higher confidence that if such matches are found to be present, they indicate presence of interference signal in those channels.

To identify the presence of interference signals with even higher level of confidence, at block 312 the adaptive front end controller may decide whether to compare the signal strengths of the channels determined to have an interference signal with a threshold. If at block 312 the adaptive front end controller decides to perform such a comparison, at block 314 the adaptive front end controller may compare the signal strength of each of the channels determined to have an interference with a threshold level. Such comparing of the channel signal strengths with a threshold may provide added confidence regarding the channel having an interference signal so that when a filter is configured according to the channel, the probability of removing a non-interfering signal is reduced. However, a user may determine that such added confidence level is not necessary and thus no such comparison to a threshold needs to be performed. In which case, at block 316 the adaptive front end controller stores the interference signals in a memory.

After storing the information about the channels having interference signals, at block 318 the adaptive front end controller selects the next DSSS signal from the signals scanned and stored at block 302. At block 318 the adaptive front end controller may cause the first of the m DSSS signals to be dropped and the newly added DSSS signal is added to the set of m DSSS signals that will be used to determine presence of an interference signal (first-in-first-out). Subsequently, at block 306 the process of determining channels having interference signals is repeated by the adaptive front end controller. Finally, at block 320 the adaptive front end controller may select and activate one or more filters that are located in the path of the DSSS signal to filter out any channel identified as having interference in it.

Figure 11:
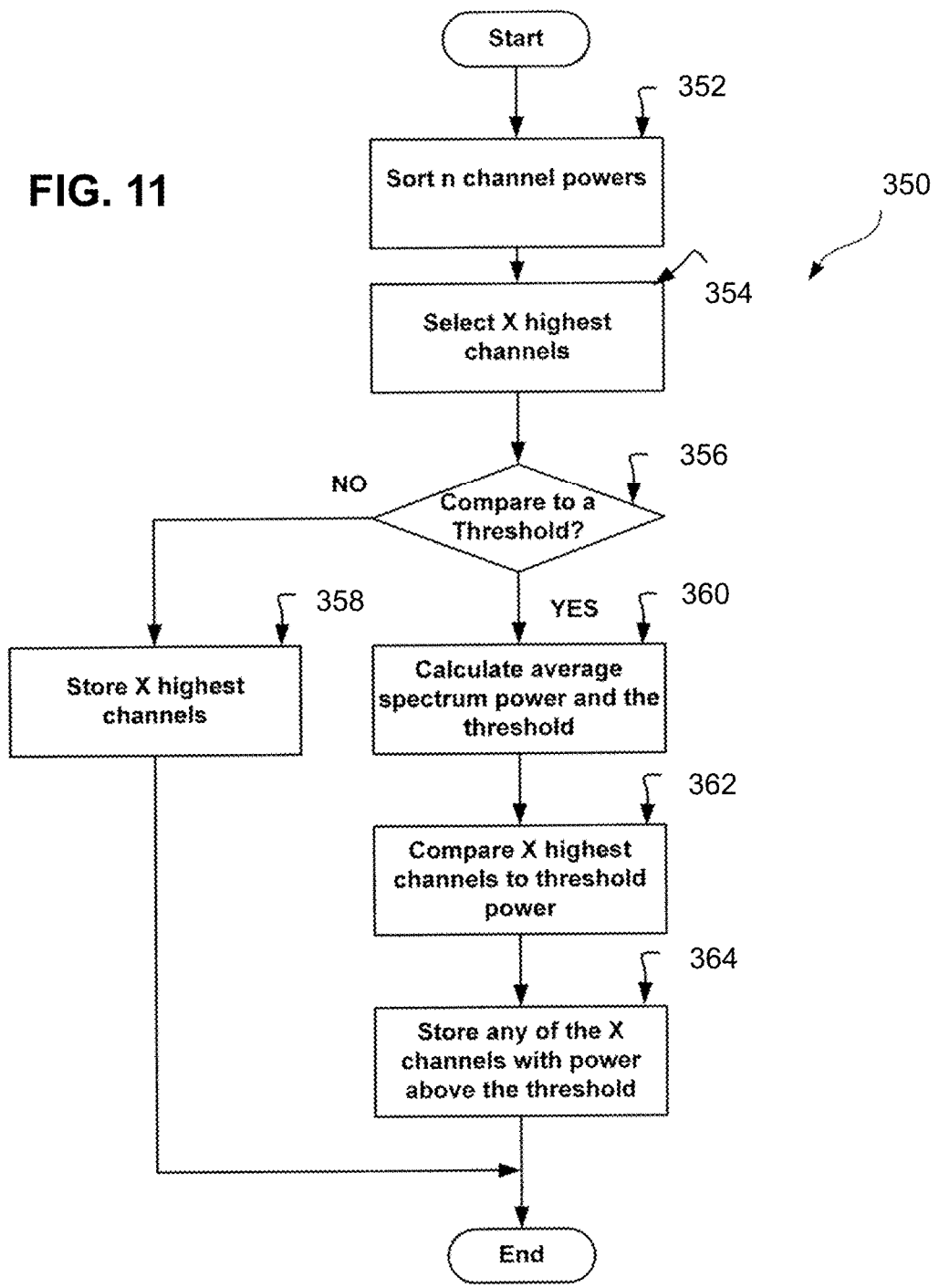
FIG. 11 depicts illustrative embodiments of the method of FIG. 10.

Now referring to FIG. 11, a flowchart illustrates a high strength channels detection program 350 that may be used to identify various channels within a given scan of the DSSS signal that may contain an interference signal. The high strength channels detection program 350 may be used to implement the functions performed at block 306 of the interference detection program 300. In a manner similar to the interference detection program 300, the high strength channels detection program 350 may also be implemented using software, hardware, firmware or any combination thereof.

At block 352 the adaptive front end controller may sort signal strengths of each of the n channels within a given DSSS signal. For example, if a DSSS signal has 41 channels, at block 352 the adaptive front end controller may sort each of the 41 channels according to its signal strengths. Subsequently, at block 354 the adaptive front end controller may select the x highest strength channels from the sorted channels and store information identifying the selected x highest strength channels for further processing. An embodiment of the high strength channels detection program 350 may simply use the selected x highest strength channels from each scan of the DSSS signals to determine any presence of interference in the DSSS signals. However, in an alternate embodiment, additional selected criteria may be used.

Subsequently, at block 356 the adaptive front end controller can determine if it is necessary to compare the signal strengths of the x highest strength channels to any other signal strength value, such as a threshold signal strength, etc., where such a threshold may be determined using the average signal strength across the DSSS signal. For example, at block 356 the adaptive front end controller may use a criterion such as, for example: "when x is selected to be four, if at least three out of four of the selected channels have also appeared in previous DSSS signals, no further comparison in necessary." Another criterion may be, for example: "if any of the selected channels is located at the fringe of the DSSS signal, the signal strengths of such channels should be compared to a threshold signal strength." Other alternate criteria may also be provided.

If at block 356 the adaptive front end controller determines that no further comparison of the signal strengths of the selected x channels is necessary, at block 358 the adaptive front end controller stores information about the selected x channels in a memory for further processing. If at block 356 the adaptive front end controller determines that it is necessary to apply further selection criteria to the selected x channels, the adaptive front end controller returns to block 360. At block 360 the adaptive front end controller may determine a threshold value against which the signal strengths of each of the x channels are compared based on a predetermined methodology.

For example, in an embodiment, at block 360 the adaptive front end controller may determine the threshold based on the average signal strength of the DSSS signal. The threshold signal strength may be the average signal strength of the DSSS signal or a predetermined value may be added to such average DSSS signal to derive the threshold signal strength.

Subsequently, at block 362 the adaptive front end controller may compare the signal strengths of the selected x channels to the threshold value determined at block 360. Only the channels having signal strengths higher than the selected threshold are used in determining presence of interference in the DSSS signal. Finally, at block 364 the adaptive front end controller may store information about the selected x channels having signal strengths higher than the selected threshold in a memory. As discussed above, the interference detection program 300 may use such information about the selected channels to determine the presence of interference signal in the DSSS signal.

The interference detection program 300 and the high strength channel detection program 350 may be implemented by using software, hardware, firmware or any combination thereof. For example, such programs may be stored on a memory of a computer that is used to control activation and deactivation of one or more notch filters. Alternatively, such programs may be implemented using a digital signal processor (DSP) which determines the presence and location of interference channels in a dynamic fashion and activates/de-activates one or more filters.

Figure 12:
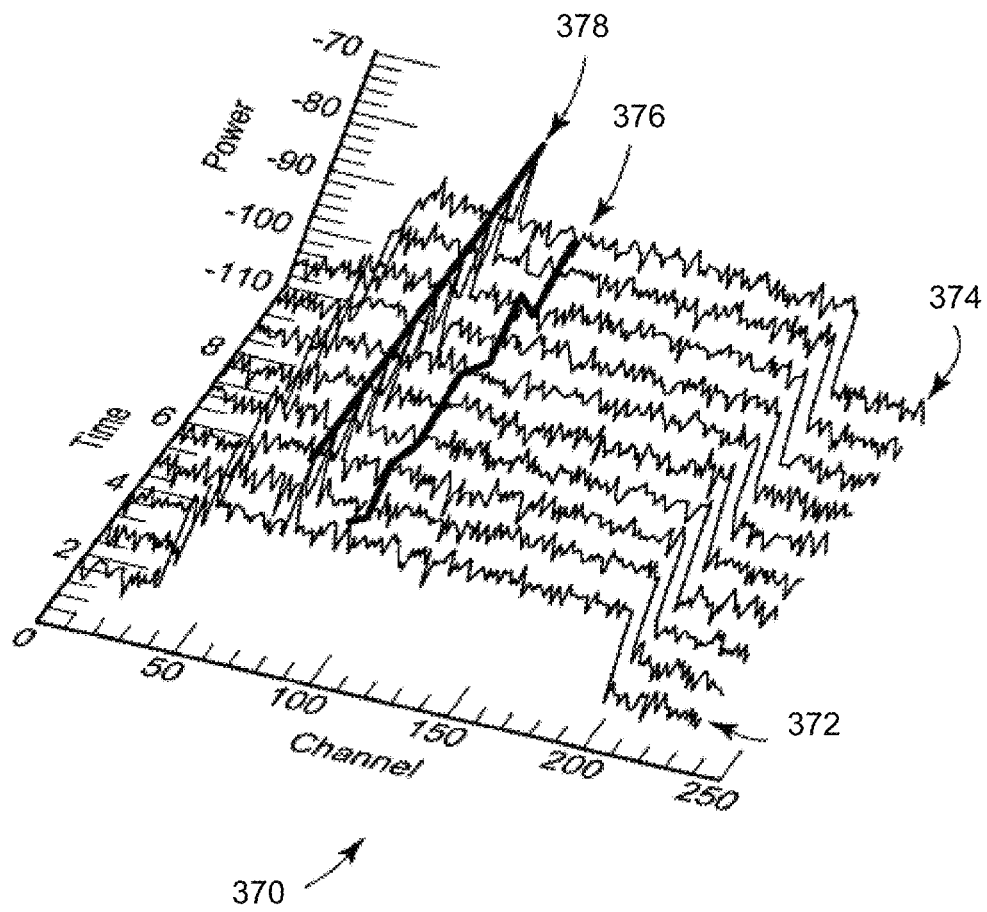
FIG. 12 depicts illustrative embodiments of a series of spread spectrum signals intermixed with an interference signal.

FIG. 12 illustrates a three dimensional graph 370 depicting several DSSS signals 372-374 over a time period. A first axis of the graph 370 illustrates the number of channels of the DSSS signals 372-374, a second axis illustrates time over which a number of DSSS signals 372-374 are scanned, and a third axis illustrates the power of each of the channels. The DSSS signals 372-374 are shown to be affected by an interference signal 378.

The interference detection program 370 may start scanning various DSSS signals 372-374 starting from the first DSSS signal 372. As discussed above at block 304 the adaptive front end controller determines the number m of the DSSS signals 372-374 that are to be scanned. Because the interference signal 378 causes the signal strength of a particular channel to be consistently higher than the other channels for a number of consecutive scans of the DSSS signals 372-374 at block 210 the adaptive front end controller identifies a particular channel having an interference signal present. Subsequently, at block 320 the adaptive front end controller will select and activate a filter that applies the filter function as described above, to the channel having interference.

The graph 370 also illustrates the average signal strengths of each of the DSSS signals 372-374 by a line 376. As discussed above, at block 362 the adaptive front end controller may compare the signal strengths of each of the x selected channels from the DSSS signals 372-374 with the average signal strength, as denoted by line 376, in that particular DSSS signal.

Figure 13:
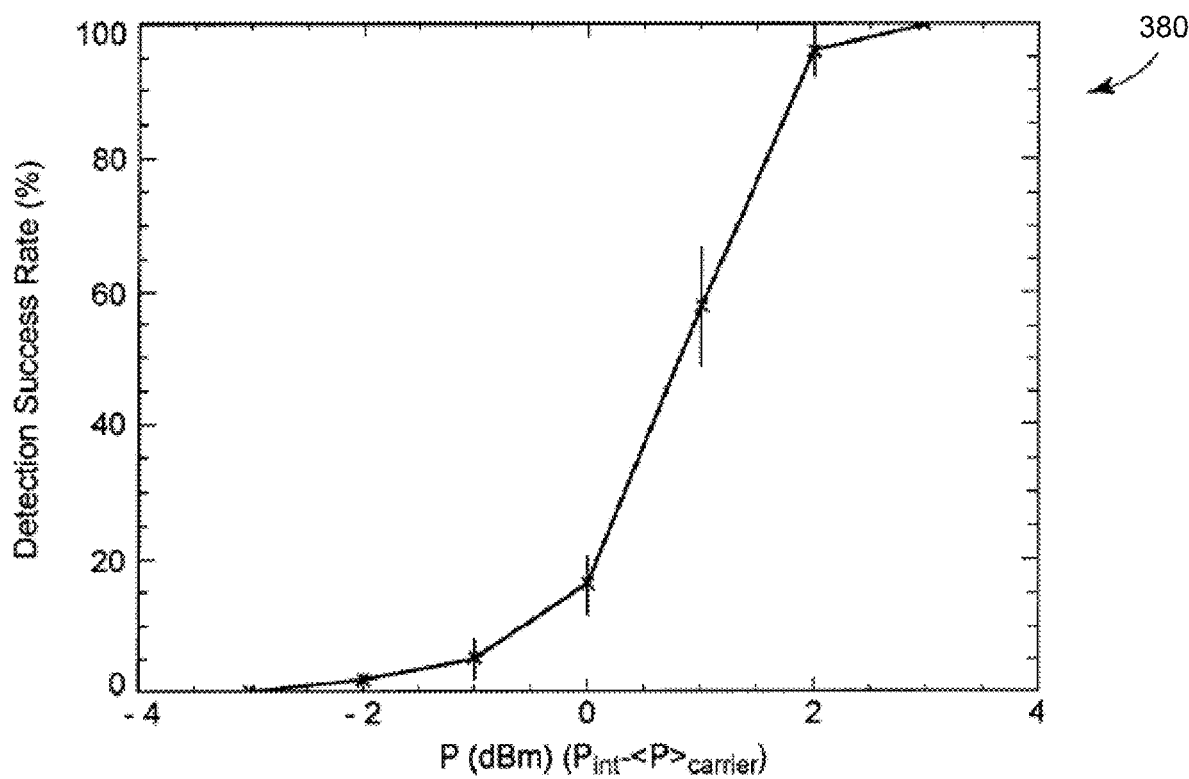
FIG. 13 depicts an illustrative embodiment of a graph depicting interference detection efficiency of a system of the subject disclosure.

Now referring to FIG. 13, a graph 380 illustrates interference detection success rate of using the interference detection program 370, as a function of strength of an interference signal affecting a DSSS signal. The x-axis of the graph 380 depicts the strength of interference signal relative to the strength of the DSSS signal, while the y-axis depicts the detection success rate in percentages. As illustrated, when an interference signal has a strength of at least 2 dB higher than the strength of the DSSS signal, such an interference signal is detected with at least ninety five percent success rate.

The foregoing interference detection and mitigation embodiments can further be adapted for detecting and mitigating interference in long-term evolution (LTE) communication systems.

Figure 14:
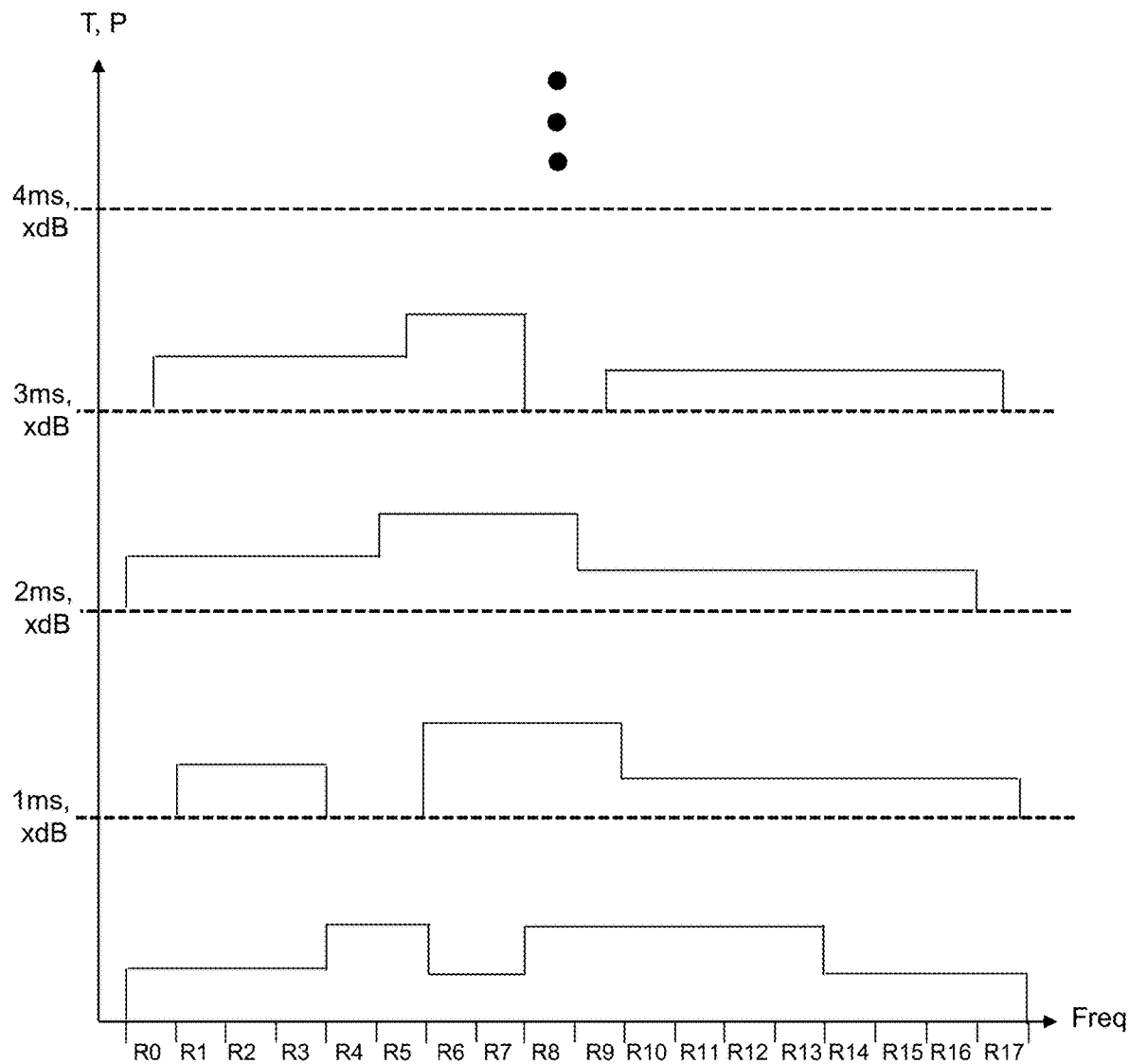
FIG. 14 depicts illustrative embodiments of Long Term Evolution (LTE) time and frequency signal plots.

LTE transmission consists of a combination of Resource Blocks (RBs) which have variable characteristics in frequency and time. A single RB can be assigned to a user equipment, specifically, a 180 KHz continuous spectrum utilized for 0.5-1 msec. An LTE band can be partitioned into a number of RBs which could be allocated to individual communication devices for specified periods of time for LTE transmission. Consequently, an LTE spectrum has an RF environment dynamically variable in frequency utilization over time. FIG. 14 depicts an illustrative LTE transmission.

LTE utilizes different media access methods for downlink (orthogonal frequency-division multiple access; generally, referred to as OFDMA) and uplink (single carrier frequency-division multiple access; generally, referred to as SC-FDMA). For downlink communications, each RB contains 12 sub-carriers with 15 KHz spacing. Each sub-carrier can be used to transmit individual bit information according to the OFDMA protocol. For uplink communications, LTE utilizes a similar RB structure with 12 sub-carriers, but in contrast to downlink, uplink data is pre-coded for spreading across 12 sub-carriers and is transmitted concurrently on all 12 sub-carriers.

The effect of data spreading across multiple sub-carriers yields a transmission with spectral characteristics similar to a CDMA/UMTS signal. Hence, similar principles of interference detection can be applied within an instance of SC-FDMA transmission from an individual communication device—described herein as user equipment (UE). However, since each transmission consists of unknown RB allocations with unknown durations, such a detection principle can only be applied separately for each individual RB within a frequency and specific time domain. If a particular RB is not used for LTE transmission at the time of detection, the RF spectrum will present a thermal noise which adheres to the characteristics of a spread spectrum signal, similar to a CDMA/UMTS signal.

Figure 15:
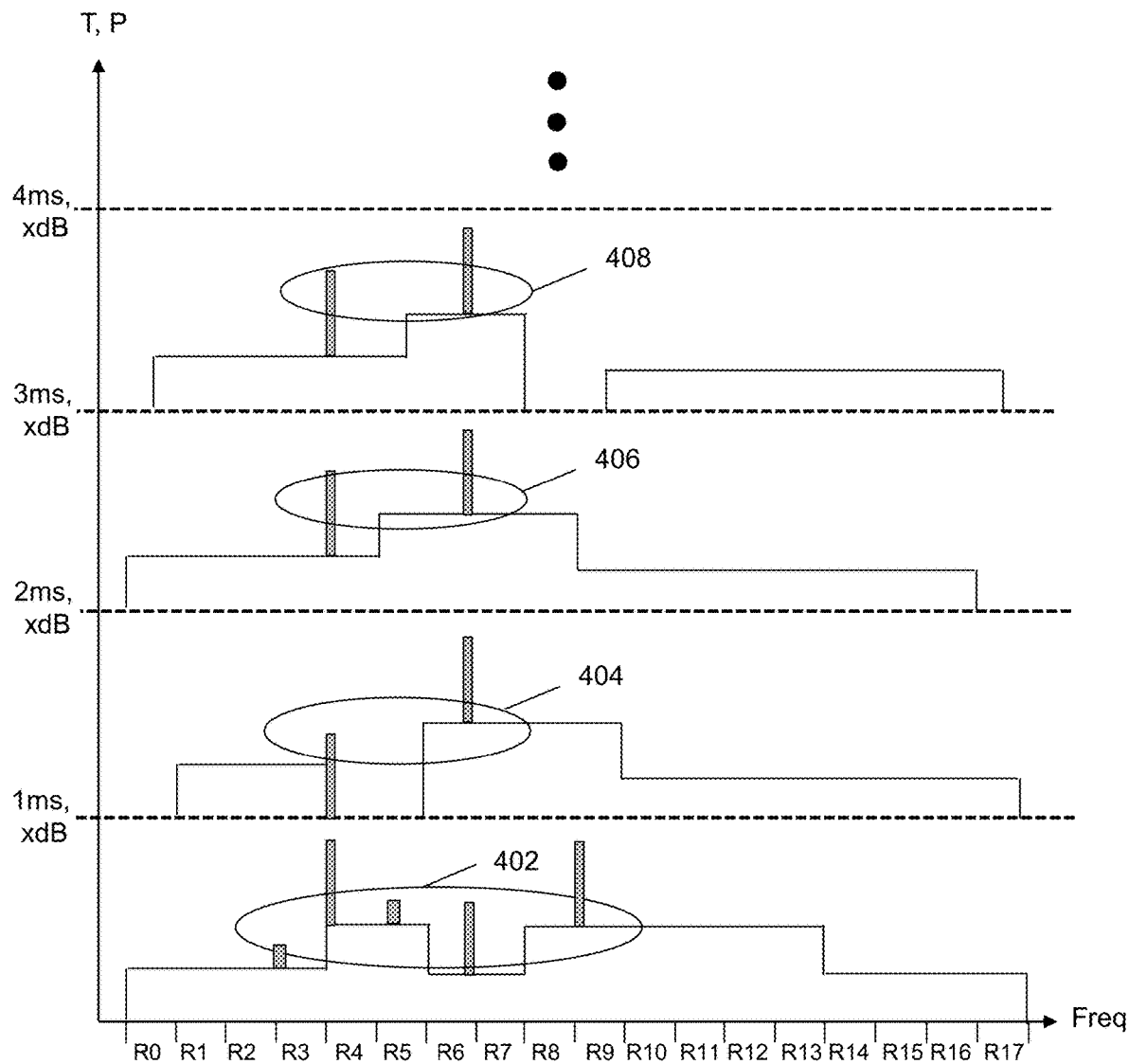
FIG. 15 depicts illustrative embodiments of LIE time and frequency signal plots intermixed with interference signals.

Co-channel, as well as other forms of interference, can cause performance degradation to SC-FDMA and OFDMA signals when present. FIG. 15 depicts an illustration of an LTE transmission affected by interferers 402, 404, 406 and 408 occurring at different points in time. Since such LTE transmissions do not typically have flat power spectral densities (see FIG. 14), identification of interference as shown in FIG. 15 can be a difficult technical problem. The subject disclosure, presents a method to improve the detection of interference in SC-FDMA/OFDM channels through a time-averaging algorithm that isolates interference components in the channel and ignores the underlying signal.

Time averaging system (TAS) can be achieved with a boxcar (rolling) average, in which the TAS is obtained as a linear average of a Q of previous spectrum samples, with Q being a user-settable parameter. The Q value determines the "strength" of the averaging, with higher Q value resulting in a TAS that is more strongly smoothed in time and less dependent on short duration transient signals. Due to the frequency-hopped characteristic of SC-FDMA/OFDMA signals, which are composed of short duration transients, the TAS of such signals is approximately flat. It will be appreciated that TAS can also be accomplished by other methods such as a forgetting factor filter.

Figure 16:
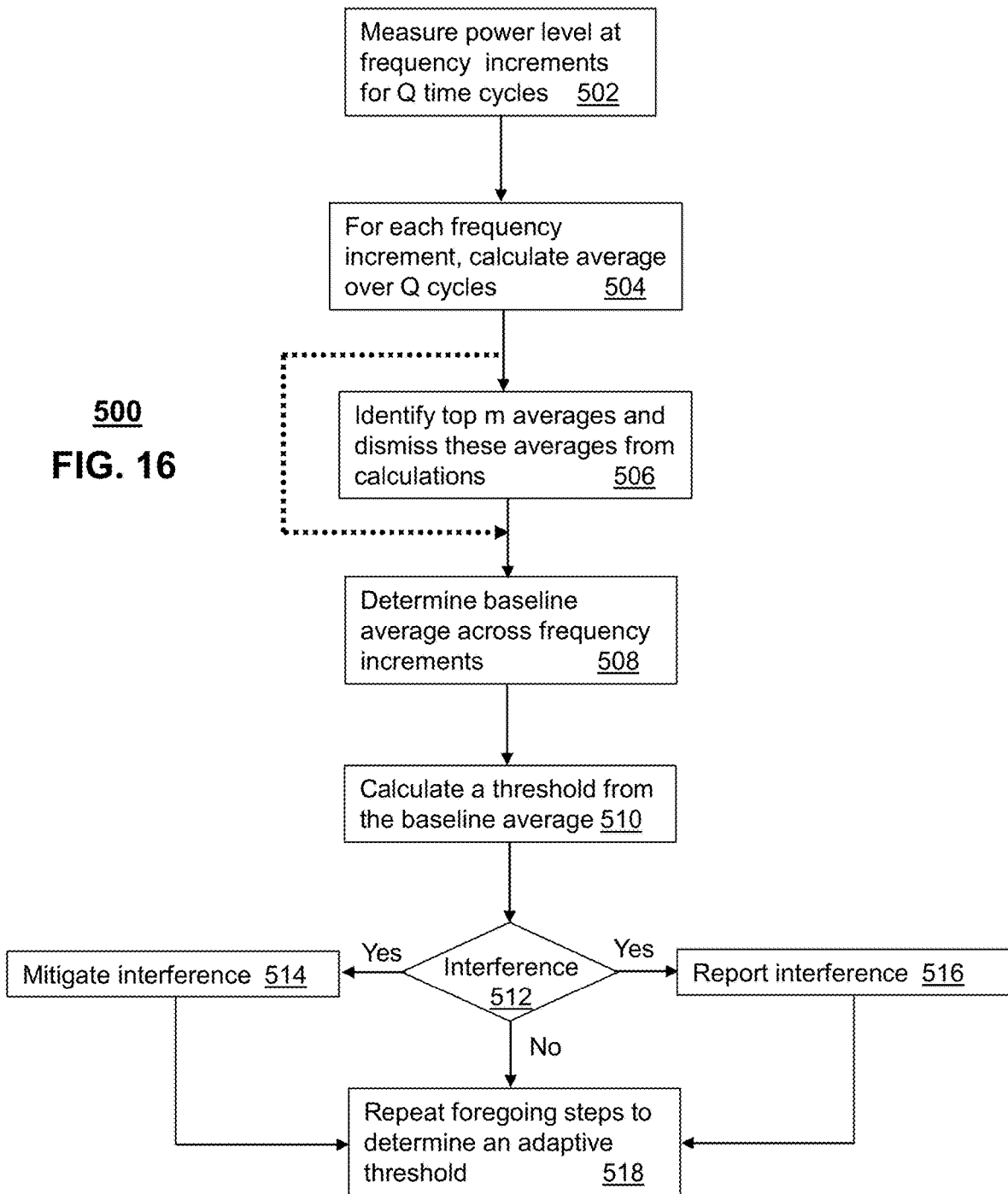
FIG. 16 depicts an illustrative embodiment of a method for detecting and mitigating interference signals shown in FIG. 15.

In one embodiment, an adaptive threshold can be determined by a method 500 as depicted in FIG. 16. Q defines how many cycles of $t_i$ to use (e.g., 100 cycles can be represented by $t_1$ thru t100). The adaptive front end module 56 of FIG. 6 can be configured to measure power in 30 KHz increments starting from a particular RB and over multiple time cycles. For illustration purposes, the adaptive front end module 56 is assumed to measure power across a 5 MHz spectrum. It will be appreciated that the adaptive front end module 56 can be configured for other increments (e.g., 15 KHz or 60 KHz), and a different RF spectrum bandwidth. With this in mind, the adaptive front end module 56 can be configured at frequency increment f1 to measure power at t1, t2, thru tq (q representing the number of time cycles, i.e., Q). At f1+30 kHz, the adaptive front end module 56 measures power at t1, t2, thru tn. The frequency increment can be defined by $f0+(z-1)*30$ KHz=fz, where f0 is a starting frequency, where $z=1\ldots x$, and z defines increments of 30 KHz increment, e.g., f1=f(z=1) first 30 KHz increment, f2=f(z=2) second 30 KHz increment, etc.

The adaptive front end module 56 repeats these steps until the spectrum of interest has been fully scanned for Q cycles, thereby producing the following power level sample sets:

$S_{f1(t1\ thru\ tq)}: s_{1,t1,f1}, s_{2,t2,f1}, \ldots, s_{q,tq,f1}$
$S_{f2(t1\ thru\ tq)}: s_{1,t1,f2}, s_{2,t2,f2}, \ldots, s_{q,tq,f2}$
$\ldots$
$S_{fx(t1\ thru\ tq)}: s_{1,t1,fx}, s_{2,t2,fx}, \ldots, s_{q,tq,fx}$ The adaptive front end module 56 in step 504, calculates averages for each of the power level sample sets as provided below:

$a1(f1)=(s_{1,t1,f1}+s_{2,t2,f1},\ldots,+s_{q,tq,f1})/q$
$a2(f2)=(s_{1,t1,f2}+s_{2,t2,f2},\ldots,+s_{q,tq,f2})/q$
$\ldots$
$ax(fx)=(s_{1,t1,fx}+s_{2,t2,fx},\ldots,+s_{q,tq,fx})/q$ In one embodiment, the adaptive front end module 56 can be configured to determine at step 506 the top "m" averages (e.g., the top 3 averages) and dismiss these averages from the calculations. The variable "m" can be user-supplied or can be empirically determined from field measurements collected by one or more base stations utilizing an adaptive front end module 56. This step can be used to avoid skewing a baseline average across all frequency increments from being too high, resulting in a threshold calculation that may be too conservative. If step 506 is invoked, a baseline average can be determined in step 508 according to the equation: Baseline Avg=(a1+a2+ . . . +az–averages that have been dismissed)/(x−m). If step 506 is skipped, the baseline average can be determined from the equation: Baseline Avg=(a1+a2+ . . . +az)/x. Once the baseline average is determined in step 508, the adaptive front end module 56 can proceed to step 510 where it calculates a threshold according to the equation: Threshold=y dB offset+Baseline Avg. The y dB offset can be user defined or empirically determined from field measurements collected by one or more base stations utilizing an adaptive front end module 56.

Figure 17:
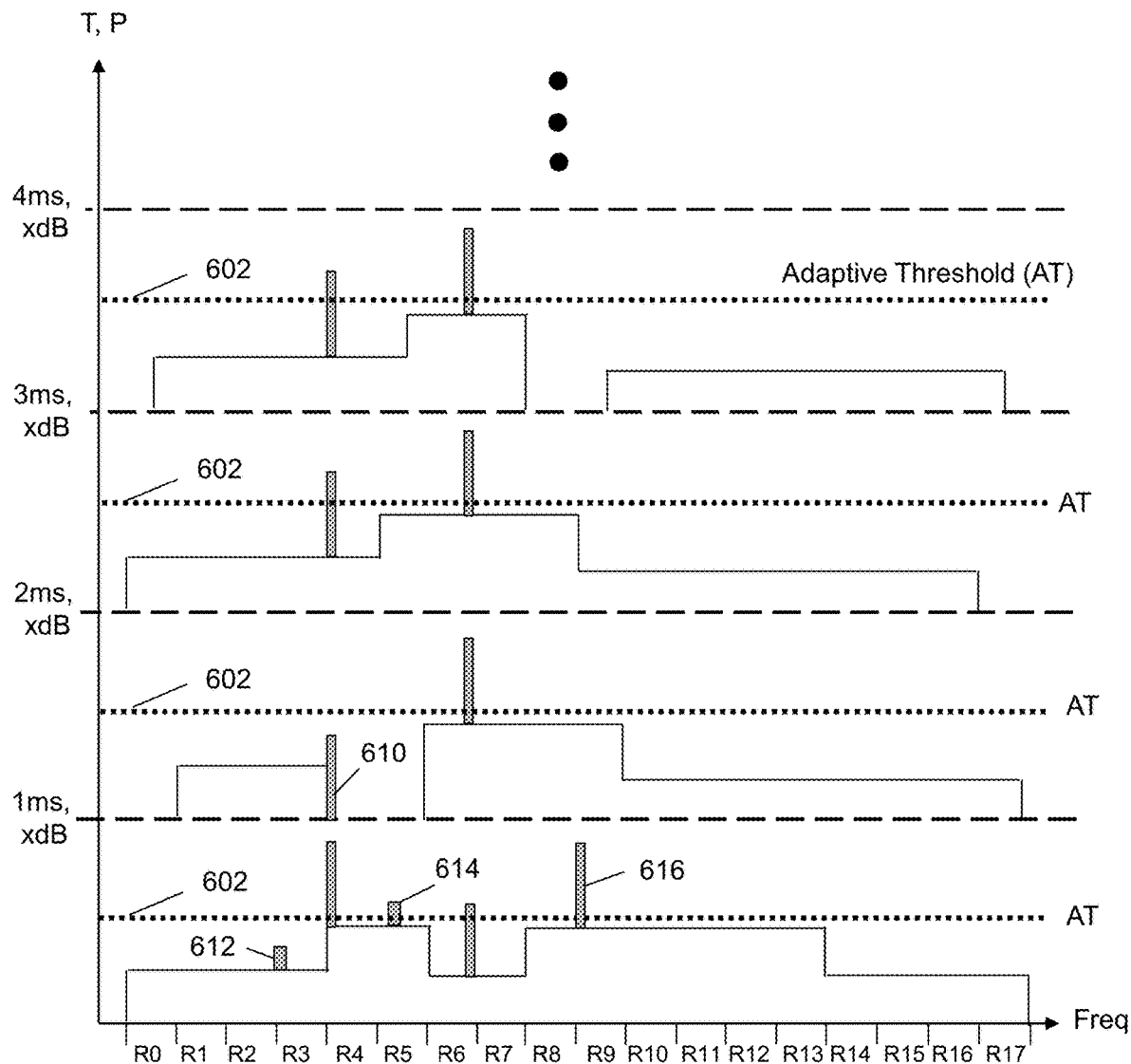
FIG. 17 depicts an illustrative embodiment of adaptive thresholds used for detecting and mitigating interference signals shown in FIG. 15.

Once a cycle of steps 502 through 510 have been completed, the adaptive front end module 56 can monitor at step 512 interference per frequency increment of the spectrum being scanned based on any power levels measured above the threshold 602 calculated in step 510 as shown in FIG. 17. Not all interferers illustrated in FIG. 17 exceed the threshold, such as the interferer with reference 610. Although this interferer has a high power signature, it was not detected because it occurred during a resource block (R4) that was not in use. As such, the interferer 510 fell below the threshold 602. In another illustration, interferer s 612 also fell below the threshold 602. This interferer was missed because of its low power signature even though the RB from which it occurred (R3) was active.

Method 500 can utilize any of the embodiments in the illustrated flowcharts described above to further enhance the interference determination process. For example, method 500 of FIG. 16 can be adapted to apply weights to the power levels, and/or perform correlation analysis to achieve a desired confidence level that the proper interferers are addressed. For example, with correlation analysis, the adaptive front end module 56 can be configured to ignore interferers 614 and 616 of FIG. 17 because their frequency of occurrence is low. Method 500 can also be adapted to prioritize interference mitigation. Prioritization can be based on frequency of occurrence of the interferers, time of day of the interference, the affect the interference has on network traffic, and/or other suitable factors for prioritizing interference to reduce its impact on the network. Prioritization schemes can be especially useful when the filtering resources of the adaptive front end module 56 can only support a limited number of filtering events.

Figure 18:
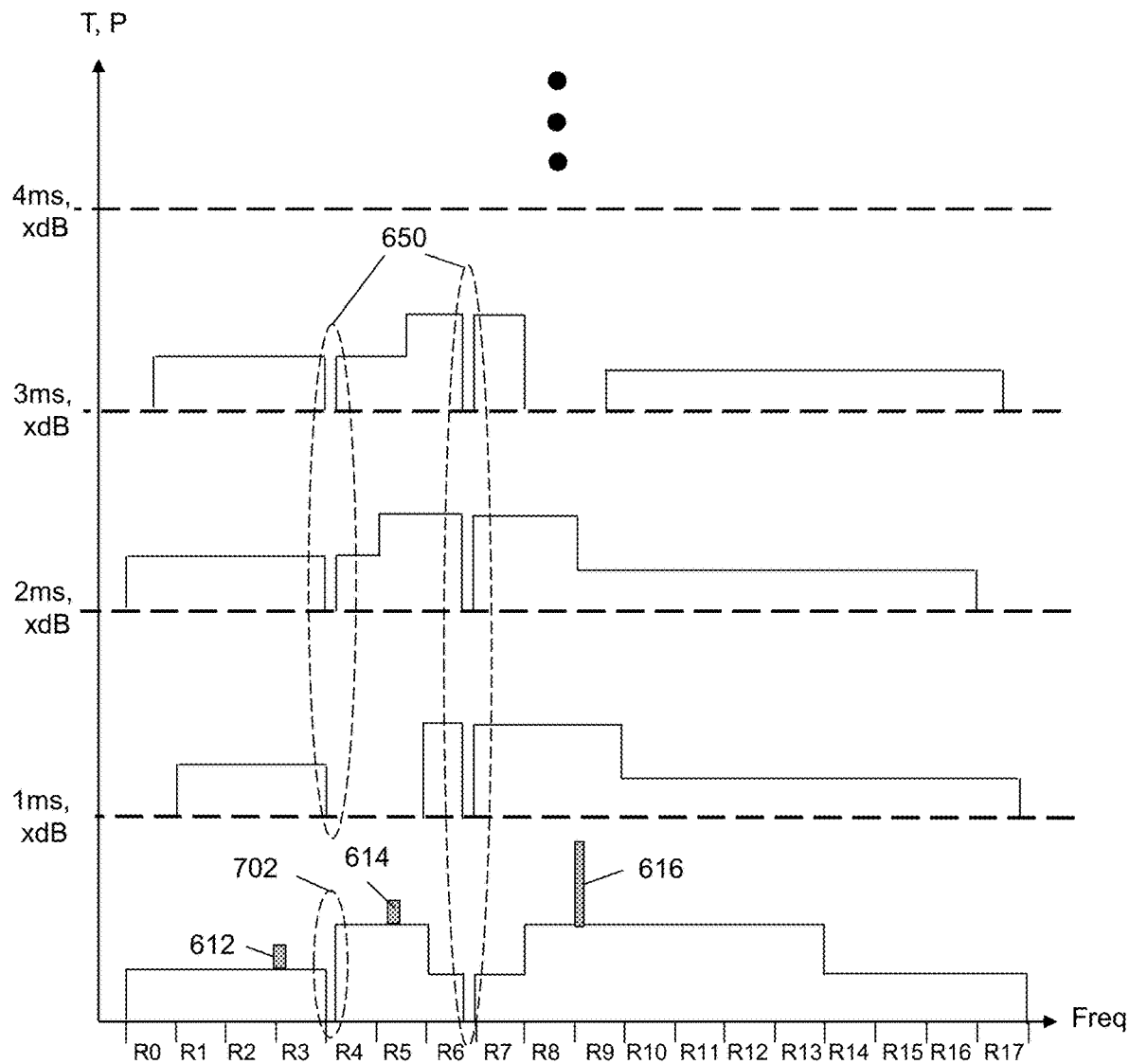
FIG. 18 depicts an illustrative embodiment of resulting LTE signals after mitigating interference according to the method of FIG. 16.

When one or more interferers are detected in step 512, the adaptive front end module 56 can mitigate the interference at step 514 by configuring one or more filters to suppress the one or more interferers as described above. When there are limited resources to suppress all interferers, the adaptive front end module 56 can use a prioritization scheme to address the most harmful interference as discussed above. FIG. 18 provides an illustration of how the adaptive front end module 56 can be suppress interferers based on the aforementioned algorithms of the subject disclosure. For example, interferers 612, 614 and 616 can be ignored by the adaptive front end module 56 because their correlation may be low, while interference suppression is applied for all other interferers as shown by reference 650.

In one embodiment, the adaptive front end module 56 can submit a report to a diagnostic system that includes information relating to the interferers detected. The report can including among other things, a frequency of occurrence of the interferer, spectral data relating to the interferer, an identification of the base station from which the interferer was detected, a severity analysis of the interferer (e.g., bit error rate, packet loss rate, or other traffic information detected during the interferer), and so on. The diagnostic system can communicate with other base stations with other operable adaptive front end module 56 to perform macro analysis of interferers such as triangulation to locate interferers, identity analysis of interferers based on a comparison of spectral data and spectral profiles of known interferers, and so on.

In one embodiment, the reports provided by the adaptive front end module 56 can be used by the diagnostic system to in some instance perform avoidance mitigation. For example, if the interferer is known to be a communication device in the network, the diagnostic system can direct a base station in communication with the communication device to direct the communication device to another channel so as to remove the interference experienced by a neighboring base station. Alternatively, the diagnostic system can direct an affected base station to utilize beam steering and or mechanical steering of antennas to avoid an interferer. When avoidance is performed, the mitigation step 514 can be skipped or may be invoked less as a result of the avoidance steps taken by the diagnostic system.

Once mitigation and/or an interference report has been processed in steps 514 and 516, respectively, the adaptive front end module 56 can proceed to step 518. In this step, the adaptive front end module 56 can repeat steps 502 thru 510 to calculate a new baseline average and corresponding threshold based on Q cycles of the resource blocks. Each cycle creates a new adaptive threshold that is used for interference detection. It should be noted that when Q is high, changes to the baseline average are smaller, and consequently the adaptive threshold varies less over Q cycles. In contrast, when Q is low, changes to the baseline average are higher, which results in a more rapidly changing adaptive threshold.

Generally speaking, one can expect that there will be more noise-free resource blocks than resource blocks with substantive noise. Accordingly, if an interferer is present (constant or ad hoc), one can expect the aforementioned algorithm described by method 500 will produce an adaptive threshold (i.e., baseline average+offset) that will be lower than interferer's power level due to mostly noise-free resource blocks driving down baseline average. Although certain communication devices will have a high initial power level when initiating communications with a base station, it can be further assumed that over time the power levels will be lowered to a nominal operating condition. A reasonably high Q would likely also dampen disparities between RBs based on the above described embodiments.

It is further noted that the aforementioned algorithms can be modified while maintaining an objective of mitigating detected interference. For instance, instead of calculating a baseline average from a combination of averages a1(f1) through ax(fx) or subsets thereof, the adaptive front end controller 56 can be configured to calculate a base line average for each resource block according to a known average of adjacent resource blocks, an average calculated for the resource block itself, or other information that may be provided by, for example, a resource block scheduler that may be helpful in calculating a desired baseline average for each resource block or groups of resource blocks. For instance, the resource block schedule can inform the adaptive front end module 56 as to which resource blocks are active and at what time periods. This information can be used by the adaptive front end module 56 determine individualized baseline averages for each of the resource blocks or groups thereof. Since baseline averages can be individualized, each resource block can also have its own threshold applied to the baseline average of the resource block. Accordingly, thresholds can vary between resource blocks for detecting interferers.

It is further noted that the aforementioned mitigation and detection algorithms can be implemented by any communication device including cellular phones, smartphones, tablets, small base stations, macro base stations, femto cells, WiFi access points, and so on. Small base stations (commonly referred to as small cells) can represent low-powered radio access nodes that can operate in licensed and/or unlicensed spectrum that have a range of 10 meters to 1 or 2 kilometers, compared to a macrocell (or macro base station) which might have a range of a few tens of kilometers. Small base stations can be used for mobile data offloading as a more efficient use of radio spectrum.

Figure 19:
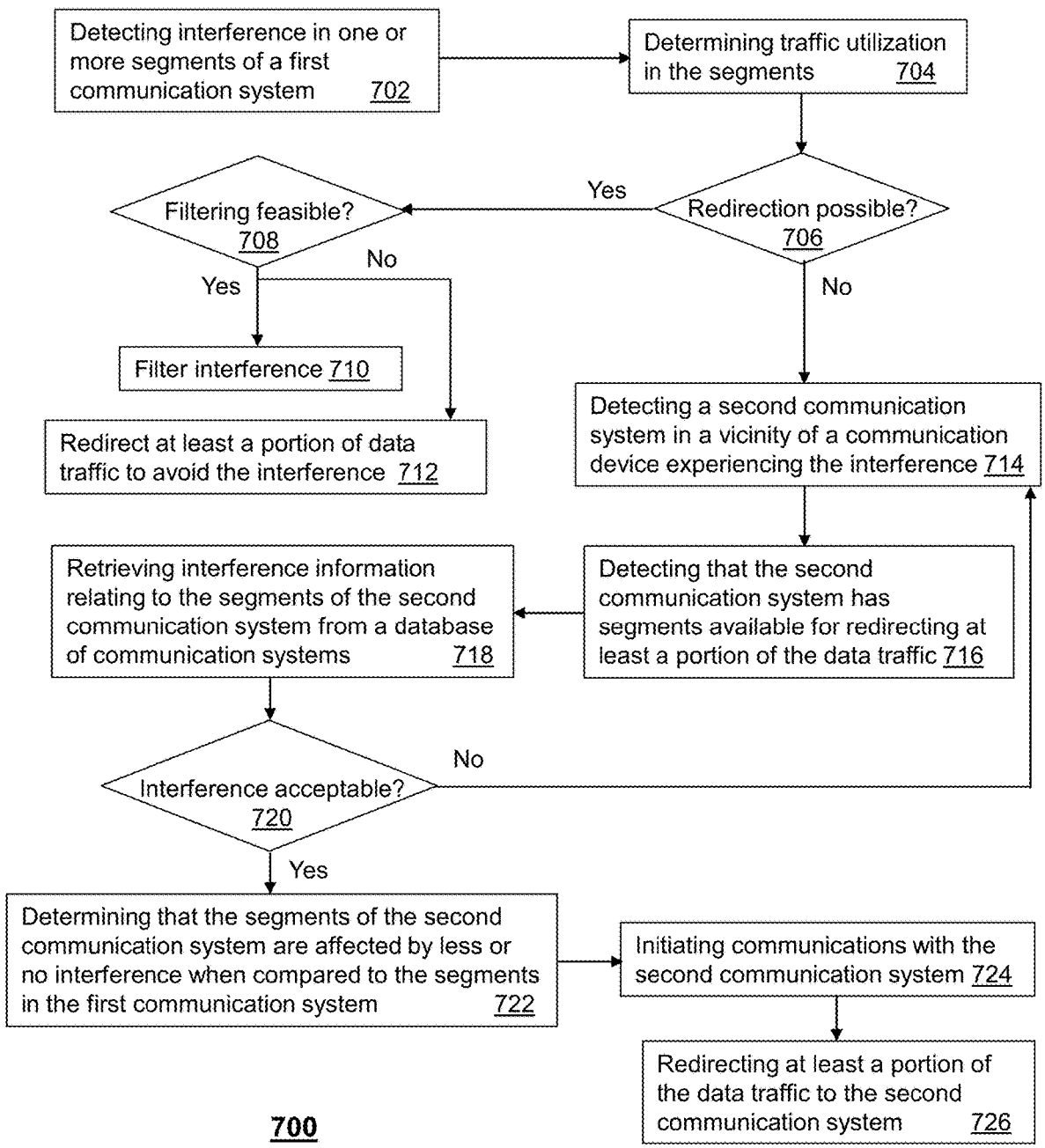
FIG. 19 depicts an illustrative embodiment of a method for mitigating interference.
Figure 20:
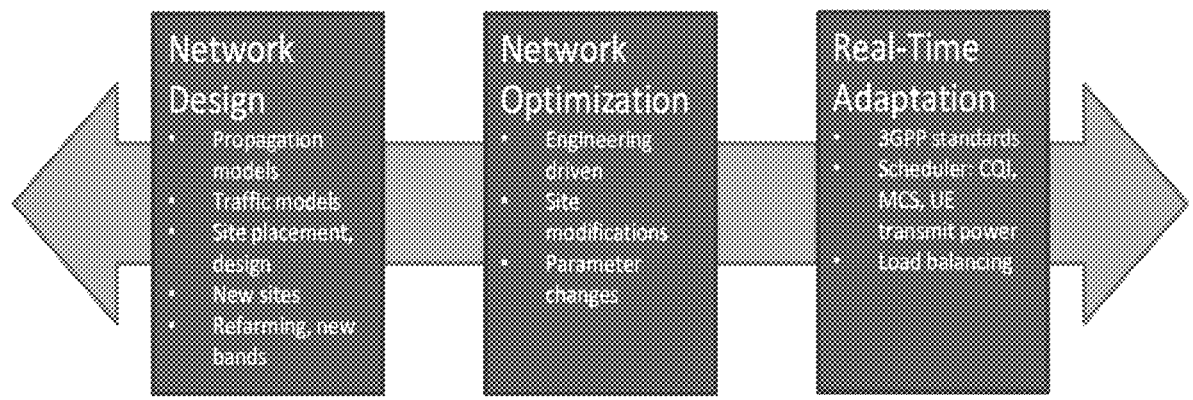
FIG. 20 depicts an illustrative embodiment of a network design.
Figure 21:
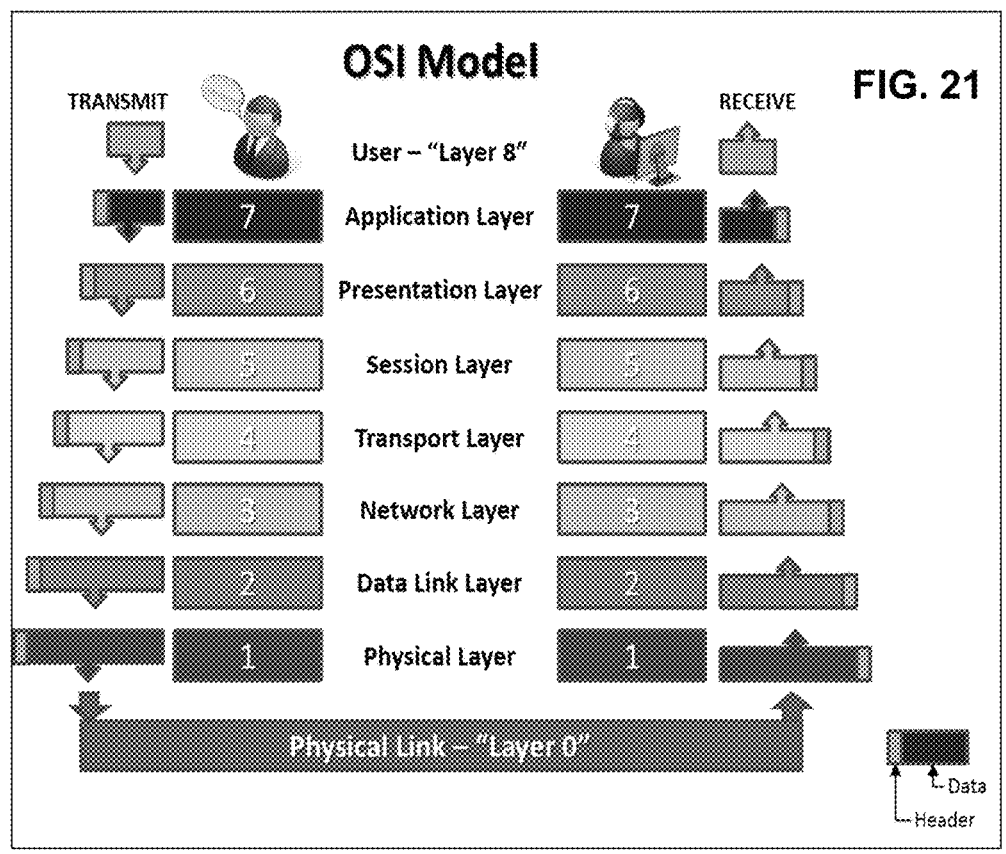
FIG. 21 depicts an illustrative embodiment of an Open Systems Interconnect (OSI) model.

FIG. 19 depicts an illustrative embodiment of a method 700 for mitigating interference such as shown in FIG. 15. Method 700 can be performed singly or in combination by a mobile communication device, a stationary communication device, base stations, and/or a system or systems in communication with the base stations and/or mobile communication devices. Method 700 can begin with step 702, where interference is detected in one or more segments of a first communication system. A communication system in the present context can represent a base station, such as a cellular base station, a small cell (which can represent a femto cell, or a smaller more portable version of a cellular base station), a WiFi router, a cordless phone base station, or any other form of a communication system that can provide communication services (voice, data or both) to fixed or mobile communication devices. The terms communication system and base station may be used interchangeably below. In either instance, such terms are to be given a broad interpretation such as described above. A segment can represent a resource block or other subsets of communication spectrum of any suitable bandwidth. For illustration purposes only, segments will be referred to henceforth as resource blocks. In addition, reference will be made by a mobile communication device affected by the interference. It is to be understood that method 700 can also be applied to stationary communication devices.

Referring back to step 702, the interference occurring in the resource block(s) can be detected by a mobile communication device utilizing the adaptive thresholds described in the subject disclosure. The mobile communication device can inform the first communication system (herein referred to as first base station) that it has detected such interference. The interference can also be detected by a base station that is in communication with the mobile communication device. The base station can collect interference information in a database for future reference. The base station can also transmit the interference information to a centralized system that monitors interference at multiple base stations. The interference can be stored and organized in a system-wide database (along with the individual databases of each base station) according to time stamps when the interference occurred, resource blocks affected by the interference, an identity of the base station collecting the interference information, an identity of the mobile communication device affected by the interference, frequency of occurrence of the interference, spectral information descriptive of the interference, an identity of the interferer if it can be synthesized from the spectral information, and so on.

At step 704, a determination can be made as to the traffic utilization of resource blocks affected by the interference and other resource blocks of the first base station that may be unaffected by interference or experiencing interference less impactful to communications. In this step a determination can be made as to the availability of unused bandwidth for redirecting data traffic of the mobile communication device affected by the interference to other resource blocks. Data traffic can represent voice only communications, data only communications, or a combination thereof. If other resource blocks are identified that can be used to redirect all or a portion of the data traffic with less interference or no interference at all, then a redirection of at least a portion of the data traffic is possible at step 706.

At step 708 a further determination can be made whether interference suppression by filtering techniques described in the subject disclosure can be used to avoid redirection and continued use of the resource blocks currently assigned to the mobile communication device. Quality of Service (QoS), data throughput, and other factors as defined by the service provider or as defined in a service agreement between a subscriber of the mobile communication device and the service provider can be used to determine whether noise suppression is feasible. If noise suppression is feasible, then one or more embodiments described in the subject disclosure can be used in step 710 to improve communications in the existing resource blocks without redirecting data traffic of the mobile communication device.

If, however, noise suppression is not feasible, then the mobile communication device can be instructed to redirect at least a portion of data traffic to the available resource blocks of the first base station identified in step 706. The first base station providing services to the mobile communication device can provide these instructions to the mobile communication device. However, prior to instructing the mobile communication device to redirect traffic, the base station can retrieve interference information from its database to assess the quality of the available resource blocks identified in step 706. If the available resource blocks have less interference or no interference at all, then the base station can proceed to step 712. If, however, there are no available resource blocks at step 706, or the available resource blocks are affected by equal or worse noise, then method 700 continues at step 714.

In one embodiment, steps 702, 704, 706, 708, 710, and 712 can be performed by a base station. Other embodiments are contemplated.

In step 714, a second communication system (referred to herein as second base station) in a vicinity of the mobile communication device can be detected. Step 714 can represent the base station that detected the interference in step 702 informing a central system overlooking a plurality of base stations that filtering or redirection of traffic of the affected mobile communication device is not possible. The detection of the second communication system can be made by the mobile communication device, or a determination can be made by the central system monitoring the location of the affected mobile communication device as well as other mobile communication devices according to coordinate information provided by a GPS receiver of the mobile communication devices, and knowledge of a communication range of other base stations. At step 716, resource blocks of the second base station can be determined to be available for redirecting at least a portion of the data traffic of the mobile communication device. At step 718, interference information can be retrieved from a system-wide database that stores interference information provided by base stations, or the interference information can be retrieved from or by the second base station from its own database. At step 720 a determination can be made from the interference information whether the resource blocks of the second base station are less affected by interference than the interference occurring in the resource blocks of the first base station. This step can be performed by a central system that tracks all base stations, or by the affected mobile communication device which can request the interference information from the central system, access the system-wide database, or access the database of the second base station.

If the interference information indicates the interference in the resource blocks of the second base station tend to be more affected by interference than the resource blocks of the first base station, then method 700 can proceed to step 714 and repeat the process of searching for an alternate base station in a vicinity of the mobile communication device, determining availability of resource blocks for transporting at least a portion of the data traffic of the mobile communication device, and determining whether noise in these resource blocks is acceptable for redirecting the traffic. It should be noted that the mobile communication device can perform noise suppression as described in step 710 on the resource blocks of the second base station. Accordingly, in step 720 a determination of whether the interference is acceptable in the resource blocks of the second base station can include noise suppression analysis based on the embodiments described in the subject disclosure. If an alternate base station is not found, the mobile communication device can revert to step 710 and perform noise suppression on the resource blocks of the first base station to reduce packet losses and/or other adverse effects, and if necessary increase error correction bits to further improve communications.

If, on the other hand, at step 722 the interference in the resource blocks of the second base station is acceptable, then the mobile communication device can proceed to step 724 where it initiates communication with the second base station and redirects at least a portion (all or some) of the data traffic to the resource blocks of the second base station at step 726. In the case of a partial redirection, the mobile communication device may be allocating a portion of the data traffic to some resource blocks of the first base station and the rest to the resource blocks of the second base station. The resource blocks of the first base station may or may not be affected by the interference detected in step 702. If the resource blocks of the first base station being used by the mobile communication device are affected by the interference, such a situation may be acceptable if throughput is nonetheless increased by allocating a portion of the data traffic to the resource blocks of the second base station.

It should be further noted that a determination in step 720 of an acceptable interference level can be the result of no interference occurring in the resource blocks of the second base station, or interference being present in the resource blocks of the second base station but having a less detrimental effect than the interference experienced in the resource blocks of the first base station. It should be also noted that the resource blocks of the second base station may experience interference that is noticeably periodic and not present in all time slots. Under such circumstances, the periodicity of the interference may be less harmful than the interference occurring in the resource blocks of the first base station if such interference is more frequent or constant in time. It is further noted, that a resource block scheduler of the second base station may assign the resource blocks to the mobile communication device according to a time slot scheme that avoids the periodicity of the known interference.

It is contemplated that the steps of method 700 can be rearranged and/or individually modified without departing from the scope of the claims of the subject disclosure. Consequently, the steps of method 700 can be performed by a mobile communication device, a base station, a central system, or any combination thereof.

Operating a wireless network can require a significant amount of effort to deploy and maintain it successfully. An additional complication involves the addition of new cell sites, sector splits, new frequency bands, technology evolving to new generations, user traffic patterns evolving and growing, and customer expectations for coverage and accessibility increasing. Such complexities in network design, optimization and adaptation are illustrated by way of example in FIG. 20. The underlying physical link that supports such networks is negatively impacted by changing weather, construction of new buildings, and an increase in operators offering services and devices using the wireless spectrum.

All of these challenges which can impact the operations of a network combine to make it harder for users to make calls, transfer data, and enjoy wireless applications. Wireless customers do not necessarily understand the complexity that makes a communication network work properly. They just expect it to always work. The service provider is left having to design the best network it can, dealing with all of the complexity described above. Tools have been developed to manage in part this complexity, but the wireless physical link requires special expertise. The underlying foundation of the performance of the wireless network is the physical link, the foundation that services rely upon. Typically, networks are designed to use the OSI seven layer model (shown in FIG. 21), which itself requires a reliable physical layer (referred to herein as the RF link) as a necessary element to achieve a desirable performance design. Without the RF link network communications would not be possible.

The RF link is characterized at a cell site deployment stage when cell sites are selected and antenna heights and azimuths are determined. Dimensioning and propagation along with user traffic distribution are a starting point for the RF link. Once a cell site is built and configured, further optimization falls into two major categories: RF optimization/site modifications (e.g., involving adjusting azimuth or tilting antennas, adding low noise amplifiers or LNAs, etc.), and real-time link adaptation (the way an eNodeB and user equipment (UE) are constantly informing each other about link conditions and adjusting power levels, modulation schemes, etc.).

The network design along with RF optimization/site modifications are only altered occasionally and most changes are expensive. Real-time link adaptation, on the other hand, has low ongoing costs and to the extent possible can be used to respond in real-time to changes experienced by an RF link (referred to herein as the "link condition"). The aspects of designing, optimizing and running a network are vital and a priority for network operators and wireless network equipment makers. Between network design and real-time adaptation a wide variety of manual and autonomous changes take place as part of network optimization and self-organizing networks.

In addition to the issues described above, there is an unsolved problem impacting the RF link that is not being addressed well with today's solutions, which in turn impacts network performance and the resulting customer experience. The subject disclosure addresses this problem by describing embodiments for improving the RF physical layer autonomously without relying on traditional cell site modifications. The subject disclosure also describes embodiments for monitoring link conditions more fully and over greater time windows than is currently performed. Currently, Service Overlay Networks (SON) focus only on downlink conditioning. The systems and methods of the subject disclosure can be adapted to both uplink and the downlink conditioning. Improvements made to an uplink by a base station, for example, can be shared with the SON network to perform downlink conditioning and thereby improve downlink performance. For example, if the performance of an uplink is improved, the SON can be notified of such improvements and can be provided uplink performance data. The SON network can use this information to, for example, direct the base station to increase coverage by adjusting a physical position of an antenna (e.g., adjust tilt of the antenna).

Additionally, the systems and methods of the subject disclosure can be adapted to demodulate a transmit link (downlink) to obtain parametric information relating to the downlink (e.g., a resource block or RB schedule, gain being used on the downlink, tilt position of the antenna, etc.). In an embodiment, the systems and methods of the subject disclosure can be adapted to obtain the downlink parametric information without demodulation (e.g., from a functional module of the base station). The systems and methods of the subject disclosure can in turn use the downlink parametric information to improve uplink conditioning. In an embodiment, systems and methods of the subject disclosure can use gain data associated with a downlink, a tilt position or adjustments of the downlink antenna, to improve uplink conditioning. In an embodiment, the systems and methods of the subject disclosure can be adapted to use the RB schedule to determine which RBs are to be observed/measured (e.g., RBs in use by UEs) and which RBs are to be ignored (e.g., RBs not in use by UEs) when performing uplink conditioning.

Additionally, in a closed-loop system, the embodiments of the subject disclosure can be adapted to balance performance between an uplink and downlink contemporaneously or sequentially. For example, when an antenna is physically adjusted (e.g., tilted) the embodiments of the subject disclosure can be adapted to determine how such an adjustment affects the uplink. If the adjustment is detrimental to the uplink, it can be reversed in whole or in part. If the adjustment has a nominal adverse impact on the uplink, the adjustment can be preserved or minimally adjusted. If the adjustment has an adverse impact on the uplink that is not detrimental but significant, changes to the uplink (e.g., increasing gain, filter scheme on uplink, requesting UEs to change MCS, etc.) can be identified and initiated to determine if the adjustment to the antenna can be preserved or should be reversed in whole or in part. In an embodiment, a combination of a partial reversal to the adjustment of the antenna and adjustments to the uplink can be initiated to balance a performance of both the uplink and downlink. Closed-loop concepts such as these can also be applied to the uplink. In an embodiment, for example, the downlink can be analyzed in response to changes to the uplink, and adjustments can be performed to the downlink and/or the uplink if the effects are undesirable.

In an embodiment, closed-loop system(s) and method(s) that perform link conditioning on both the uplink and downlink can be adapted to identify a balanced ("sweet spot") performance between the uplink and the downlink such that neither the uplink nor the downlink is at optimal (or maximum) performance. In an embodiment, a closed-loop system and method can be performed by the SON network by receiving conditioning information relating to an uplink and/or a downlink from cell sites and by directing a number of such cell sites to perform corrective actions on the uplink, the downlink, or both to balance performance therebetween. In an embodiment, a closed-loop system and method for balancing performance between uplinks and downlinks can be performed by cell sites independently, UEs independently, cell sites cooperating with UEs, cell sites cooperating among each other, UEs cooperating among each other, or combinations thereof with or without assistance of a SON network by analyzing link conditioning performed on the uplinks and/or downlinks.

In one embodiment, the subject disclosure describes embodiments for improving network performance by analyzing information collected across several RF links to holistically improve communications between eNodeBs and UEs. In one embodiment, the subject disclosure describes embodiments for obtaining a suite of spectral KPIs (key performance indicators) which better capture the conditions of an RF environment. Such data can be used in self-optimizing networks to tune the RF link that supports the UE/eNodeB relationship. In addition, measurements and adjustments can be used to provide self-healing capabilities that enable the RF link of a UE/eNodeB RF to be adapted in real-time.

In one embodiment, signal to interference plus noise ratio (SINR) is an indicator that can be used to measure a quality of wireless communications between mobile and stationary communication devices such as base station(s). A base station as described in the subject disclosure can represent a communication device that provides wireless communication services to mobile communication devices. A base station can include without limitation a macro cellular base station, a small cell base station, a micro cell base station, a femtocell, a wireless access point (e.g., WiFi, Bluetooth), a Digital Enhanced Cordless Telecommunications (DECT) base station, and other stationary or non-portable communication services devices. The term "cell site" and base station may be used interchangeably. A mobile or portable communication device can represent any computing device utilizing a wireless transceiver for communicating with a base station such as a cellular telephone, a tablet, a laptop computer, a desktop computer, and so on.

For illustration purposes only, the embodiments that follow will be described in relation to cellular base stations and mobile cellular telephones. It is submitted, however, that the embodiments of the subject disclosure can be adapted for use by communication protocols and communication devices that differ from cellular protocols and cellular communication devices.

Figure 22:
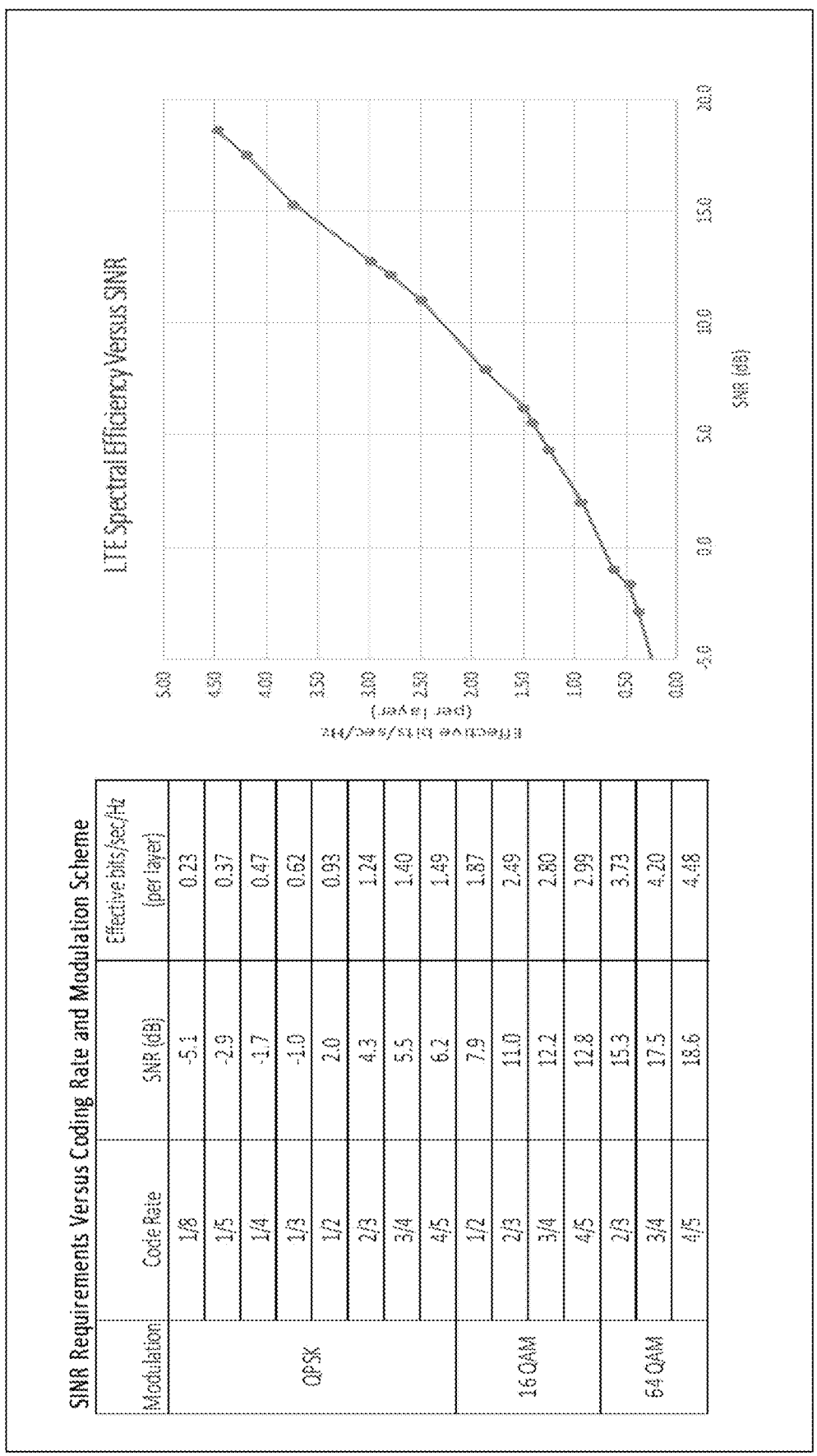
FIG. 22 depicts an illustrative embodiment of a relationship between SINR and data throughput and performance.

In communication systems such as LTE networks, achieving a target SINR may enable the coverage area of a cell site to achieve its design goals and allow the cell site to utilize higher modulation and coding schemes (MCS), which can result in higher spectral density—a desirable goal for LTE networks. Delivering desirable throughput rates in LTE systems can require higher SINR than in 3G systems. Performance of LTE systems can suffer as SINR falls, whether due to lower signal and/or higher interference and noise. FIG. 22 depicts the impact of SINR on throughput and therefore capacity.

In one embodiment, SINR can be improved by collecting information from each cell site (e.g., on a sector and/or resource block basis), compiling an estimated SINR from such information, and adjusting RF parameters of the RF link to improve an overall network performance of the cell site. In one embodiment, SINR can be described according to the following equation:

$$SINR = \frac{Signal}{Interference + Noise} = \frac{S}{N + N_c + N_{adj} + N_{comp} + N_{out} + \sum I} \quad (EQ\ 1)$$

where S is the received signal level, N is the thermal noise, and $N_c$ is in-band co-channel interference, $N_{adj}$ is the adjacent band noise in guard bands or the operator's other carriers, $N_{comp}$ is interference in the same overall frequency band from other operators, $N_{out}$ is the out-of-band noise, and $\sum I$ is the summation of the inter-cell interference contributed from surrounding cell sites. Some prior art systems consider in-band co-channel interference $N_c$, the adjacent interference noise $N_{adj}$, the competitors' transmissions $N_{comp}$, and the out of band noise $N_{out}$ to be very small. This assumption is generally not accurate, particularly for cell sites where performance is a challenge. In practice, I is proportional to the quality and strength of the signal (S) from neighboring sites; particularly, in dense networks or near cell edges, where one site's signal is another site's interference.

By describing SINR in its constituent parts as depicted in the above equation, specific actions can be taken to improve SINR and consequently performance of one or more RF links, which in turn improves performance of the network. An RF signal received by a cell site can be improved in a number of ways such as by selective filtering, adding gain or amplification, increasing attenuation, tilting antennas, and adjusting other RE parameters. RF parameters of an RE link can be modified in ways that improves overall network performance within a specific cell site and in some cases across multiple inter-related cell sites.

To achieve improvements in one or more cell sites, a matrix of SINRs can be created that includes an estimate for SINR at a path level for each node (cell site) or sector in the network. Optimization scenarios can be achieved by analyzing a network of cell sites collectively using linear programming for matrix optimization. By making adjustments to an uplink, one can create a weighted maximization of the SINR matrix with element δ added to each SINR element. Each point in the matrix with index i and j can consist of $SINR_{i,j} + \delta_{i,j}$ for a particular node. In one embodiment, SINR can be optimized for each cell site, within an acceptable range of $SINR_{i,j} \pm \delta_{i,j}$, where $\delta_{i,j}$ is lower than some specified Δ. The term $\delta_{i,j}$ can represent a threshold range of performance acceptable to a service provider. A SINR outside of the threshold range can be identified or flagged as an undesirable SINR. The threshold range $\delta_{i,j}$ can be the same for all base stations, paths, sectors, or clusters thereof, or can be individualized per base station, path, sector, or clusters thereof. The term Δ can represent a maximum threshold range which the threshold range $\delta_{i,j}$ cannot exceed. This maximum threshold range Δ can be applied the same to all base stations, sectors, paths, or clusters thereof. Alternatively, the term Δ can differ per base station, sector, path, or cluster thereof. In one embodiment, the objective may not necessarily be to optimize SINR of a particular cell site. Rather the objective can be to optimize SINR of multiple nodes (cell sites and/or sectors) in a network. Below is an equation illustrating a matrix for optimizing SINR of one or more nodes (cell sites).

$$\begin{bmatrix} SINR_{1,1} \pm \delta_{1,1} & \cdots & SINR_{1,i} \pm \delta_{1,i} \\ \vdots & \ddots & \vdots \\ SINR_{i,1} \pm \delta_{i,1} & \cdots & SINR_{i,j} \pm \delta_{i,j} \end{bmatrix} \times \begin{bmatrix} \text{Transformation} \\ \text{matrix} \end{bmatrix} = \begin{bmatrix} \text{Optimized} \\ SINR + \delta \end{bmatrix} \quad (EQ\ 2)$$

In one embodiment, for a particular cell site and sector i,j. SINR can be estimated on a resource-block level basis as $SINR_{i,j,k}$ (where i, and j are the site and sector indices that refer to the site location with respect to the surrounding sites and k is the index that refers to a particular resource block within the LTE system). The overall channel $SINR_{i,j}$ can be calculated by averaging the $SINR_{i,j,k}$ over all the resource blocks, e.g., $SINR_{i,j} = \sum_{k=1}^{N} SINR_{i,j,k}$, where N can be, for example, 50.

Improving SINR of one or more the nodes in a network using the above analysis, can in turn improve the throughput and capacity of the network, thereby enabling higher modulation and coding schemes (MCS) as shown in FIG. 22. The improved link performance of cell site(s) can help achieve design goals set by service providers for coverage area and capacity of the cell site(s). Achieving these design goals results in improved (and at times optimal) throughput and cell coverage as measured by data rate, accessibility/retainability, and reduction of time UEs are not on LTE commonly referred to as measure of TNOL (or similarly increase time UEs are on LTE).

Figure 23:
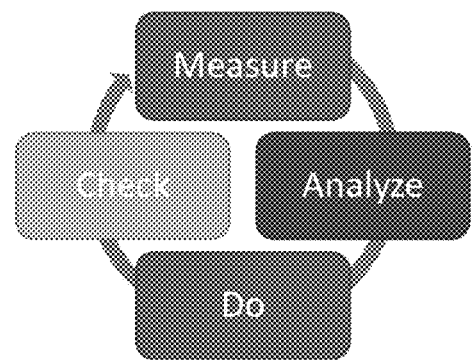
FIG. 23 depicts an illustrative embodiment of a closed loop process.

In one embodiment, a closed loop process can be used for adjusting the condition of an RF link of a node (or cell site)

to improve performance of one or more other nodes in a network. Such a process is depicted in FIG. 23. This process can be described as follows.

Measure: collect a set of RF KPIs (Key Performance Indicators) across multiple categories to more fully reflect the frequently changing conditions of the underlying RF physical link of one or more nodes.

Analyze: compare current RF link conditions and trends against network KPIs and the SINR matrix to determine changes that can be implemented to improve the conditions of the RF physical link.

Do: perform changes to adjust the RF link conditions of one or more nodes.

Check: confirm that the changes that were made have had the desired effect.

To achieve a closed loop process, the results derived from the "Check" step can be provided to the "Measure" step in subsequent iterations to drive continuous improvement.

Together the steps of FIG. 23 provide a useful approach for analyzing an RF link and for taking appropriate steps to improve its condition. The steps of FIG. 23 are discussed in greater detail below.

Measurement.

Understanding the current conditions of an RF link is an important step to improving network performance. Today's networks make available a variety of KPIs that reflect network performance, many focused on specific layer(s) of the OSI model shown in FIG. 21. To better improve link conditioning, the subject disclosure introduces a new set of KPIs that can provide a more complete "spectral portrait" that describes the RF environment that the RF link depends upon.

Figure 24:
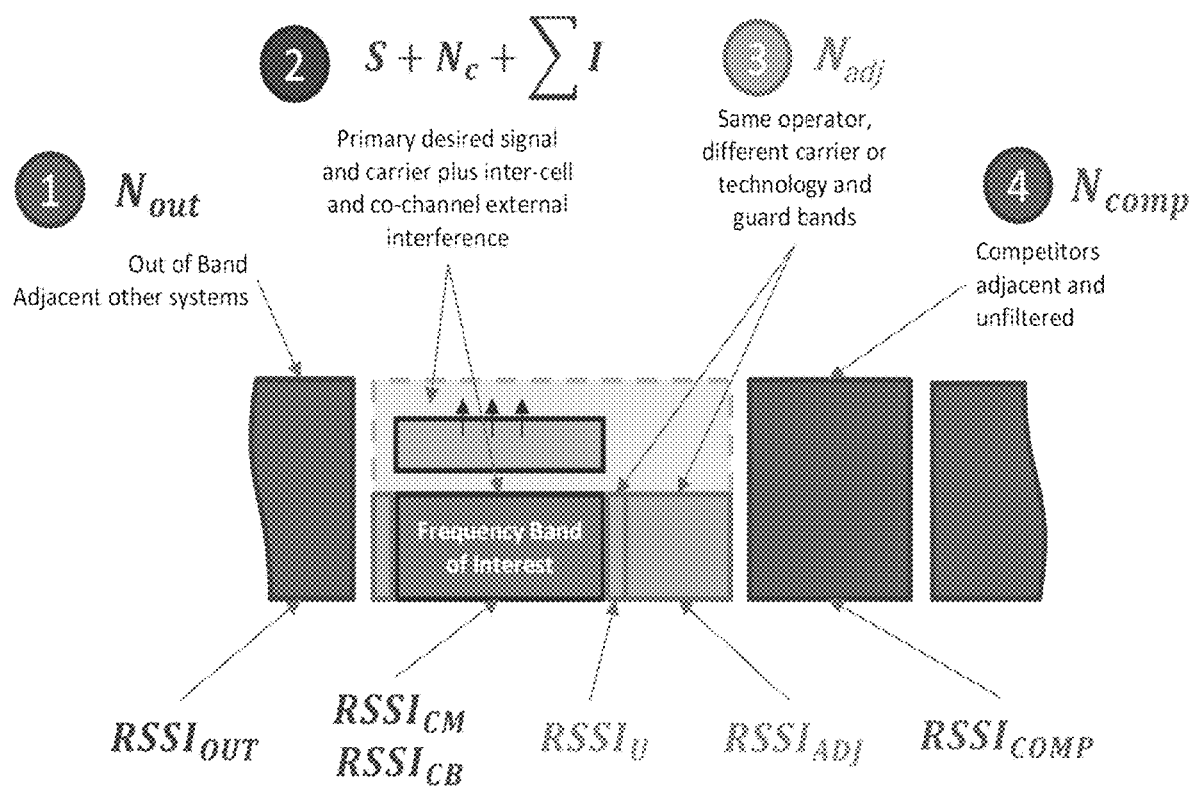
FIG. 24 depicts an illustrative embodiment of a spectral environment of a wireless channel.

There can be several aspects of the RF spectrum that can impact an RF link, as shown in FIG. 24. For example, one aspect of the RF spectrum that can impact the RF link involves the condition of a particular frequency band used for a desired signal. Other co-channel signals in the same frequency band can have an impact on the RF link, whether due to inter-cell interference from neighboring cell sites or external foreign interference from faulty systems and unintentional radiators. Each desired frequency band also has neighbors ranging from guard bands left open to provide isolation, additional carriers used by the same wireless operator (e.g., multiple UMTS bands or LTE neighboring CDMA), competing carriers operating in near adjacent bands, other systems operating in adjacent bands, and so on.

Each of four different RF categories measured during link conditioning (enumerated as 1-4 in FIG. 24) can provide important RF information that can directly impact a condition of the RF link and ultimately the UE-eNB relationship. Link conditioning as described by the subject disclosure provides a holistic spectral portrait enabling more insight than what is provided by OEM (Original Equipment Manufacturer) equipment which collects RSSI information and carrier power information in band (e.g., only 1 of the 4 groups), but doesn't give an operator visibility into what is happening in adjacent bands, out of band, or unused spectrum. Prior art OEM equipment also does not provide a comparison between expected, averages and daily measurements, which if available would provide a service provider a way to measure network performance.

Figure 25:
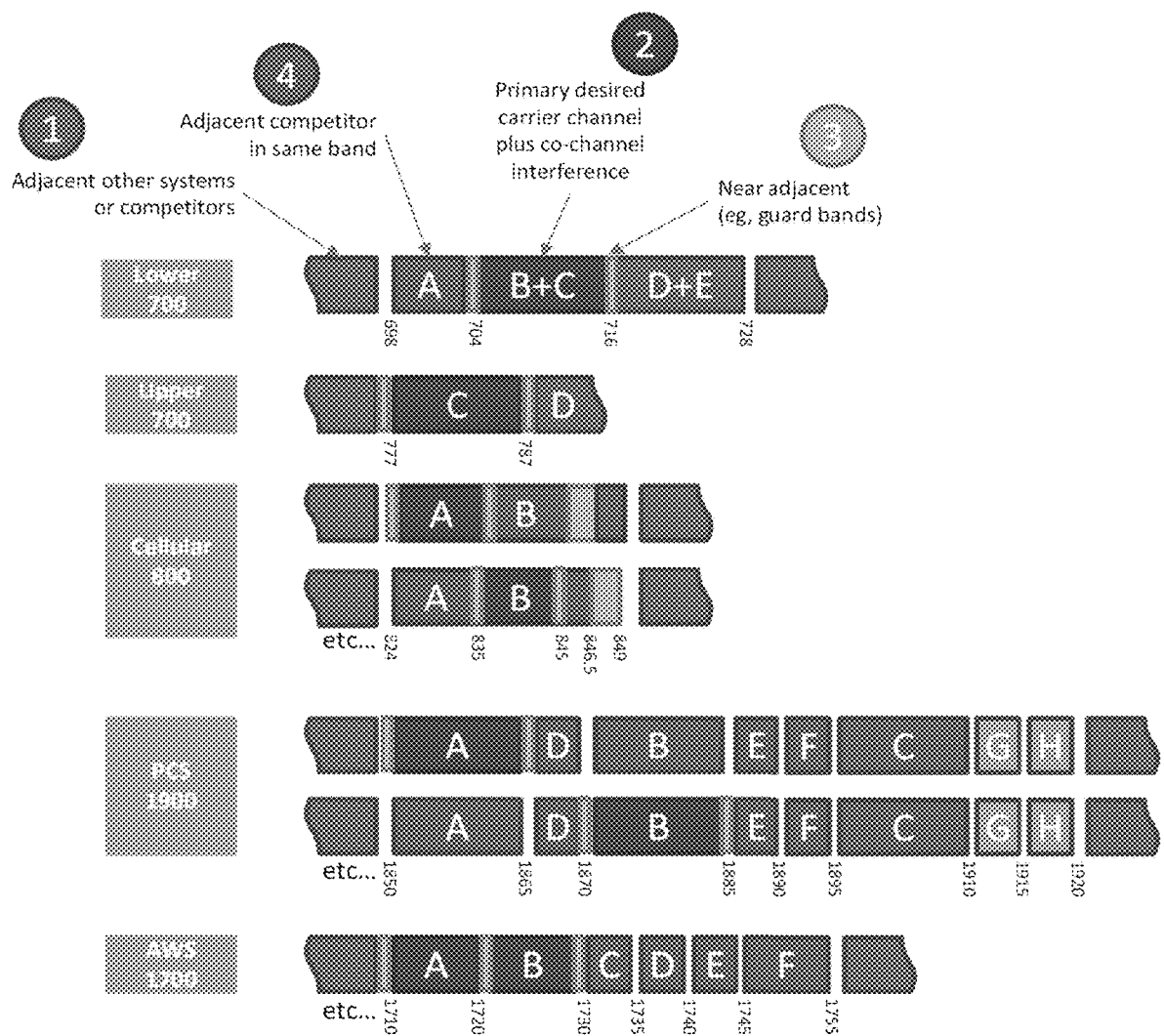
FIG. 25 depicts an illustrative embodiment of examples of spectral environments for various frequency bands.

Co-channel signals in an operating band can be filtered using the filtering techniques described earlier in the subject disclosure. FIG. 25 describes the four categories of bands in each of current US spectrums. In some instances these classes of RF segments are presently impacting the performance of the underlying RF link and therefore the overall network performance. To support active conditioning of an RF link, the new KPIs introduced above along with SINR monitoring can provide visibility to parameters not currently available, and can be used to mitigate spectrum and link conditions that may be undesirable. Such parameters can include absolute nominal values for each RF technology such as, for example, SINR targets based on nominal values and site-specific values based on particular conditions of a cell site. For example, some sites can have a target SINR higher than others due to the nature of traffic the sites support and/or because of network design considerations.

A network is a dynamic entity that changes continuously due to software upgrades, traffic volumes and pattern changes, seasonality and environmental conditions, just to name a few. Monitoring these variations and then adjusting the RF link to accurately compensate for such variations enables cell sites to consistently operate with a desired performance. In addition to monitoring and adjusting variations in an RF link, in one embodiment, nominal spectral values and RF statistics can be recorded in an ongoing basis (daily, hourly, according to moving averages, etc.).

Occasionally there can be significant differences between real-time, short-term averages and longer-term design parameters that can cause degradation of cell site metrics, which may negatively impact customer experience, and which can result in lost revenue for a service provider if not counteracted. When such issues are identified a next step can be to understand why the issues arose by analyzing spectral insights gained through the analysis of signals impacting SINR.

In one embodiment, link conditioning can be performed based on a number of metrics that can include without limitation:

$RSSI_{OUT}$—RSSI in the neighboring frequency bands (out of band). For example, TV channel 51 adjacent to the lower 700 MHz LTE bands or SMR and public safety bands adjacent to the 800 MHz cellular bands. This metric is proportional to $N_{OUT}$. ❶

$RSSI_{CB}$ and $RSSI_{CM}$—RSSI per carrier during busy hour and during maintenance window which can be used to help estimate S. ❷

$RSSI_c$—RSSI in carrier's used spectrum. This metric is proportional to $S+N_c$. ❷

$RSSI_{ADJ}$—RSSI in band in the carrier's unused spectrum. This metric is proportional to $N_{adj}$. ❸

$RSSI_{COMP}$—RSSI of competing wireless carriers occupying adjacent spectrum, not filtered by front end. This metric is proportional to $N_{comp}$. ❹

SINR—the signal to noise plus interference ratio of the resource blocks.

To gain a better understanding of the above metrics, the reference numbers 1-4 used in the above listing can be cross-referenced with the reference numbers 1-4 in FIGS. 24-25. These metrics can be measured on a path-by-path basis and can be used to drive optimization of one or more cell sites. As the environment changes, so can the performance of a network which can be reflected in these metrics. Using these metrics and correlating them against spectral KPIs can reveal vital information that can be used to improve an RF link's performance.

Analysis. As variations of RSSI and SINR data are collected RF statistics relating to these metrics can be generated and used to mine a data set for trends, outliers, and abnormalities across cell sites and frequency bands. By analyzing such information, a network and its corresponding cell sites can be monitored for changes over time, and corresponding mitigation steps can be taken when necessary.

Recall equation EQ1 above, $$SINR = \frac{\text{Signal}}{\text{Interference} + \text{Noise}} = \frac{S}{N + N_c + N_{adj} + N_{comp} + N_{out} + \sum I}$$

where S is the received signal level, N is the thermal noise, and $N_c$ is in-band co-channel interference, $N_{adj}$ is the adjacent band noise, $N_{comp}$ is interference from other operators, $N_{out}$ is the out-of-band noise, and $\sum I$ is the summation of the inter-cell interference contributed from all the surrounding cells. If SINR of a given sector or node is lower than expected a number of causes and solutions can be applied, based on a deeper understanding of the RF environment and its contribution to SINR. Below are non-limiting illustrations and corresponding recommended solutions to improve SINR.

1. $N_{out}$ is high, the solution may be to provide better filtering or diversity optimization
2. $N_{comp}$ is high, the solution may be to incorporate dynamic filtering to eliminate those sources
3. $N_{adj}$ is high, the solution may be to incorporate dynamic filtering to eliminate those sources or 3G service optimization (e.g., pilot power reduction or antenna tilt)
4. $N_c$ is high, the solution may in band mitigation using filtering techniques described in the subject disclosure
5. $\sum I$ is high, the solution may involve reducing overall gain to minimize intra-cell site noise
6. S is low, the solution may be to increase uplink gain to improve the RF link of the UE The above listing provides illustrations for initiating mitigating actions based on spectral analysis, which can be implemented with closed loop control so that ongoing performance improvements can be maintained.

Mitigation (Do).

RF link mitigation can be initiated from an analysis of spectral data that leads to a set of specific recommended actions. There are many aspects of the RF link that can be modified as part of a link mitigation strategy, including without limitation:

Filtering adjacent signals: If adjacent signals are detected at the eNodeB at higher levels than expected, antennas can be tilted away from adjacent systems and/or digital filtering can be applied to the uplink to provide additional adjacent channel selectivity.

Adding gain: Based on traffic conditions or trends. For example, cell sites can be directed to increase uplink gain, effectively improving SINR for received signals or expanding coverage of a cell site.

Attenuating high signal power: In situations involving high traffic or locations of certain types of traffic leading to high signal power in-band, base station transceivers (BTS) can be instructed to reduce uplink signal power, which can improve an eNodeBs operating performance Interference suppression: in-band uplink filtering techniques described in the subject disclosure can be used to remove external interference within the carrier's active channel.

Diversity optimization: picking the better signal of a main and diversity receive antennas.

3G service optimization: Adjusting 3G pilot power or 3G antennas to minimize interference.

Adjusting mobile transmit parameters: Working with SON interfaces and eNodeB to adjust target power levels to modify cell coverage or reduce inter-cell interference.

Tilting antennas to reshape coverage: As traffic moves and capacity demand shifts, providing control of antenna tilt or input to antenna SON algorithms can enable the network to adjust coverage to address traffic demands. Coordinating across multiple sites, link conditioning algorithms can adjust positions of antennas (e.g., tilt down) on one site to reduce coverage and focus capacity while simultaneously up-tilting antennas of neighboring sites to fill in coverage gaps. This can shift traffic reducing the interference from UEs serviced by neighboring sites.

Check and Reporting.

As changes are made to the network parameters based on any of the mitigation actions described above, the changes can be verified to determine whether such mitigation actions in fact improved network performance. Additionally, the SON network can be informed of these changes on the uplink for possible use in downlink conditioning as previously described. In addition, relevant data can be logged to guide future enhancement cycles.

As noted earlier, verification of the changes to the RF link can be implemented by way of a closed loop confirmation process which can provide input to the SON network to ensure that the network as a whole is operating according to up-to-date settings and the same or similar RF data. Reports generated in the verification step may include information relating to external interference that was detected, resource block utilization, multiple channel power measurements, etc.

As part of the ongoing adaptation of the link conditioning cycle, all changes can be logged, statistics can be updated and metadata can be generated and/or assigned to logged changes to ensure all changes can be understood and analyzed by personnel of a service provider. Such reports can also be used by future applications which can be adapted to "learn" from historical data generated from many cycles of the process described above. Implementing a link conditioning process based on real-world conditions as described above provides an enhanced and optimized RF physical layer performance. Ongoing link conditioning also enables operators to rely less on designing cell sites to worst-case conditions or anticipated network coverage.

The embodiments of the subject disclosure provide a unique focus on the RF physical layer according to a collective analysis of RF links across multiple cell sites. These embodiments enable systems to extract insight from spectral information, historical trends and network loading, while simultaneously optimizing RF parameters of multiple sites with live network traffic, thereby improving communications between eNodeBs and the UEs.

Figure 26A:
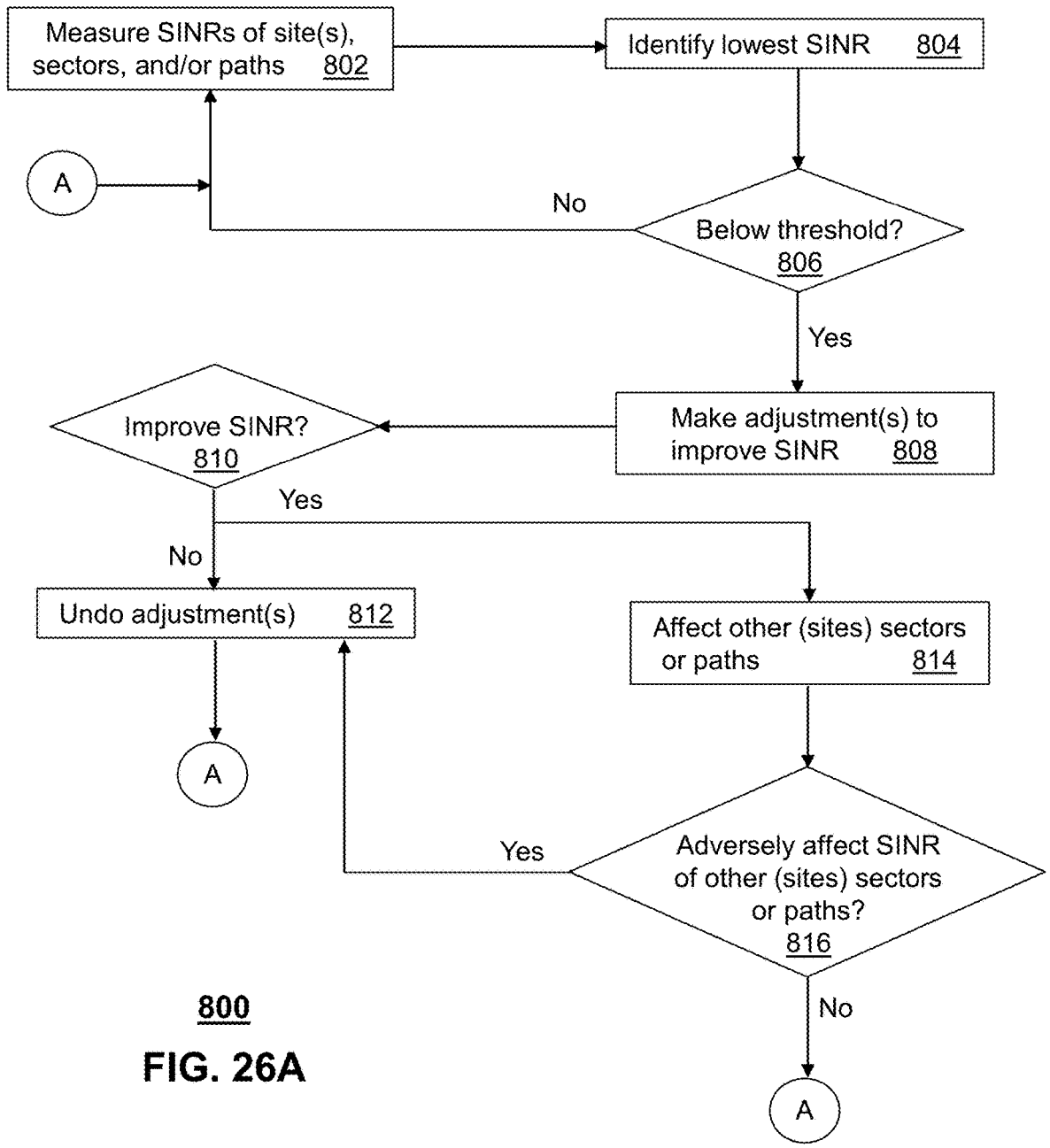
FIG. 26A depicts an illustrative embodiment of a method for link management in a communication system.
Figure 26B:
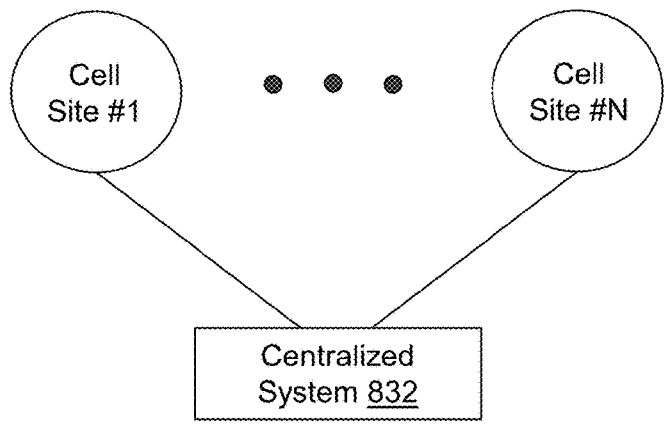
FIG. 26B depicts an illustrative embodiment of a centralized system managing cell sites according to aspects of the subject disclosure.
Figure 26C:
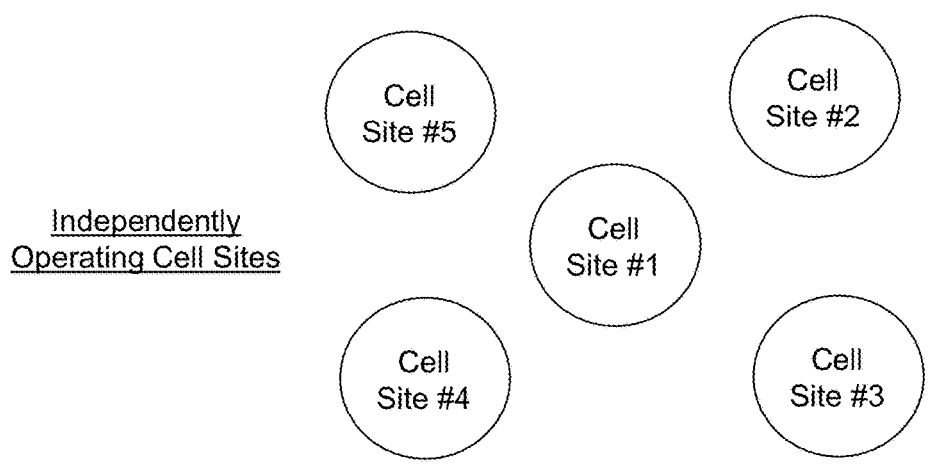
FIG. 26C depicts an illustrative embodiment of independently operating cell sites according to aspects of the subject disclosure.
Figure 26D:
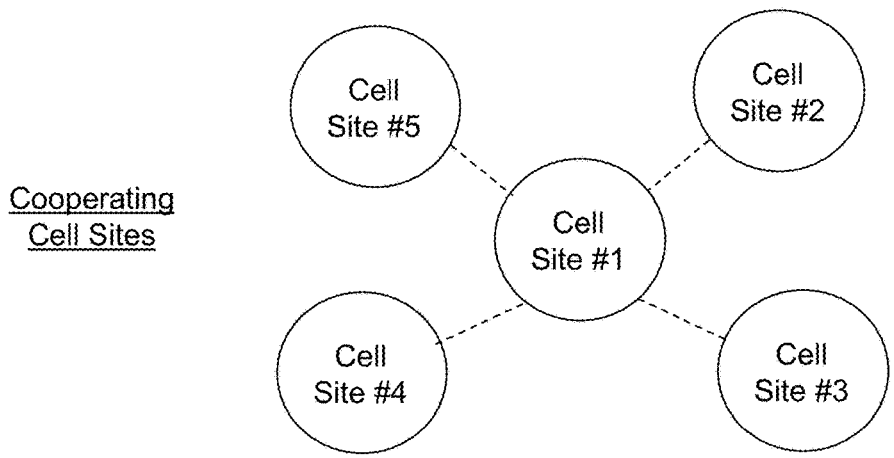
FIG. 26D depicts an illustrative embodiment of cell sites cooperating with each other according to aspects of the subject disclosure.

FIG. 26A depicts non-limiting illustrative embodiments of a method 800 for implementing link management in a communication system. In one embodiment, method 800 can be performed by a centralized system 832 that coordinates SINR measurements and corrective actions between cell sites as depicted in FIG. 26B. In an alternate embodiment, method 800 can be performed independently by each cell site without regard to adverse effects that may be caused by a particular cell site on neighboring cell site(s) as depicted in FIG. 26C. In another alternate embodiment, method 800 can be performed by each cell site, each communicating with one or more neighboring cell sites to reduce adverse effects caused by a particular cell site on neighboring cell site(s) as depicted in FIG. 26D. The embodiments of FIGS. 26B-26D can be combined in any fashion in relation to applications of method 800. For example, suppose method 800 is implemented independently by cell sites depicted in FIG. 26C. Further suppose the centralized system 832 of FIG. 26B receives SINR results from each of the cell sites performing method 800. In this illustration, the centralized system 832 can be configured to reverse or modify some (or all) of the independent actions of the cell sites of FIG. 26C depending on SINR measurements received by the centralized system 832 from the cell sites. Other combinations of FIGS. 26B-26D are possible and should be considered in relation to method 800.

For illustration purposes only, method 800 will now be described according to the centralized system 832 of FIG. 26B. Method 800 can begin at step 802 where a SINR measurement can be made by each cell site on a corresponding sector and/or path. Cell sites can be configured to perform SINR measurements over several iterations which can be averaged over time. Each cell site can share SINR measurements with the centralized system 832. The SINR measurements can include a SINR measurement for the cell site, a SINR measurement for each sector, a SINR measurement for each path, or combinations thereof. The SINR measurement for a sector can be an average of SINR measurements for the paths of the sector. The SINR measurement for the cell site can be an average of SINRs measurements of multiple sectors, or SINRs measurements of multiple paths. When SINR measurements have been shared by all cell sites, a determination can be made by the centralized system 832 at step 804 as to which of the cell sites, sectors, or paths has the lowest SINR measurement. The minimum SINR measurement can then be compared by the centralized system 832 in step 806 to one or more thresholds which may be established by a service provider as a minimum expected SINR performance for any particular cell site, sector, and/or path. If the minimum SINR measurement is not below the threshold, the centralized system 832 can proceed to step 802 and reinitiate measurements of SINR across multiple cell sites and corresponding sectors and/or paths.

If, however, the minimum SINR measurement of a particular cell site, sector or path is below the threshold, then corrective action can be taken by the centralized system 832 at step 808 to improve the SINR measurement of the cell site, sector or path in question. The corrective action can include, without limitation, filtering adjacent signals, adding gain, attenuating high signal power, filtering interference signals according to the embodiments of the subject disclosure, utilizing diversity optimization, utilizing 3G service optimization, adjusting mobile transmit parameters, tilting antennas to reshape cell site coverage, or any combination thereof.

Once corrective action has been executed by a cell site and/or UE, a determination can be made by the centralized system 832 at step 810 as to whether the SINR of the cell site, sector or path in question has improved. If there's no improvement, the corrective action can be reversed in whole or in part by the centralized system 832 at step 812, and measurements of SINR per cell site, sector and/or path can be repeated beginning from step 802. If, however, the corrective action did improve the SINR of the cell site, sector or path in question, then a determination can be made by the centralized system 832 at step 814 as to whether the corrective action implemented by the cell site and/or UE has had an adverse effect on other paths or sectors of the same cell site or neighboring cell sites.

In one embodiment, this determination can be made by the centralized system 832 by requesting SINR measurements from all cell sites, sectors, and/or paths after the corrective action has been completed. The centralized system 832 can then be configured to determine an average of the SINRs for all the cell sites, sectors, and/or paths for which the corrective action of step 808 was not applied. For ease of description, the cell site that initiated corrective action will be referred to as the "corrected" cell site, while cell sites not participating in the corrective action will be referred to as the "uncorrected" cell sites.

With this in mind, at step 816, the centralized system 832 can determine whether the SINR averages from the uncorrected cell sites, sectors or paths are the same or similar to the SINR averages of the uncorrected cell sites, sectors, and/or paths prior to the corrective action. If there's no adverse effect or a nominal adverse effect, then the centralized system 832 can be configured to maintain the corrective action initiated by the corrected cell site, sector and/or path and proceed to step 802 to repeat the process previously described. If, on the other hand, the average of the SINRs of the uncorrected cell sites, sectors or paths for which corrective action was not taken has been reduced below the SINR averages of these sites, sectors or paths prior to the corrective action (or below the threshold at step 806 or different threshold(s) established by the service provider), then the corrective action initiated by the corrective cell site, sector or path can be reversed in whole or in part by the centralized system 832 at step 812.

In another embodiment, step 816 can be implemented by establishing a minimum SINR values that are unique to each cell site, sector, and/or path. If after the corrective action the SINR measurements of the corrected cell site, sector and/or path has improved at step 810 and the SINR measurements of the uncorrected cell sites, sectors and/or paths are above the unique SINR values established therefor, then the corrective action can be maintained by the centralized system 832 and the process can be reinitiated at step 802. If, on the other hand, the SINR measurement of the corrected cell site, sector or path has not improved after the corrective action, or the SINR measurements of one or more uncorrected cell sites, sectors, and/or paths are below the unique SINR values established therefor, then the corrective action taken can be reversed in whole or in part by the centralized system 832 at step 812.

Method 800 can be adapted to use different sampling rates for SINR, and/or different thresholds. The sampling rates and/or thresholds can be temporally dependent (e.g., time of day profiles—morning, afternoon, evening, late evening, early morning, etc.). SINR profiles can be used to account for anomalous events (e.g., a sporting event, a convention, etc.) which may impact traffic conditions outside the norm of regular traffic periods. Thresholds used by method 800 can include without limitation: minimum thresholds used for analyzing SINRs of cell sites, sectors and/or paths prior to corrective action; corrective thresholds used for analyzing SINRs of corrected cell sites, sectors and/or paths, consistency thresholds used for analyzing SINRs from uncorrected cell sites, sectors and/or paths after corrective action, and so on. Method 800 can also be adapted to use other KPIs such as dropped calls, data throughput, data rate, accessibility and retainability, RSSI, density of user equipment (UEs), etc. Method 800 can also be adapted to ignore or exclude control channels when determining SINR measurements. That power levels from control channels can be excluded from SINR measurements. Method 800 can also be adapted to perform closed-loop methods for balancing uplink and downlink performance as described earlier for SON networks, cell sites, UEs, or combinations thereof. Method 800 can be adapted to obtain the noise components of SINR (EQ1) from power measurements described in the subject disclosure. Referring to FIG. 24, the RSSI measurements shown in FIG. 24 can be determined by measuring power levels at different spectral locations in the spectral components shown in FIG. 24.

As noted earlier, method 800 can also be adapted to the architectures of FIGS. 26C and 26D. For example, method 800 can be adapted for use by each cell site of FIG. 26C. In this embodiment, each cell site can independently perform SINR measurements per sector and/or path, perform analysis based on expected SINR threshold(s), mitigate below performance SINRs, verify corrective actions, and reverse when necessary corrective measures in whole or in part as described earlier. A distinct difference between this embodiment and that described for the centralized system 832 of FIG. 26B is that in this embodiment, each cell site can take corrective action without regard to adverse effects that may be caused to neighboring cell site(s) shown in FIG. 26C.

In the case of FIG. 26D, method 800 can adapted for use by each cell site with the additional feature that each cell site can be adapted to cooperate with its neighboring cell sites to avoid as much as possible adverse effects caused by corrective actions taken by any of the cell sites. In this embodiment, a corrected cell site can request SINR measurements of neighboring (uncorrected) cell sites, sectors or paths from the uncorrected cell sites themselves or a centralized system monitoring SINR measurements. Such requests can be made before or after correction action is performed by the corrected cell site. For example, before corrective action is taken, a cell site that needs correction can determine whether the SINR measurements of one or more neighboring cell sites, sectors or paths are marginal, average or above average when compared to expected SINR performance threshold(s). The cell site to be corrected can use this information to determine how aggressive it can be when initiating corrective action. After corrective action is taken, the corrected cell site can request updated SINR measurements from neighboring cell sites which it can then compare to threshold(s) established for the neighboring cell sites and determine therefrom whether to reverse the corrective action in whole or in part.

It is further noted that method 800 can be adapted to combine one or more of the foregoing embodiments for performing link conditioning in any one of the embodiments FIGS. 26B, 26C, and 26D such that combined implementations of method 800 are used to achieve a desirable RF link performance for clusters of cell sites in a network.

It is further noted that the methods and systems of the subject disclosure can be used in whole or in part by a cellular base station (e.g., macro cell site, micro cell site, pico cell site, a femto cell site), a wireless access point (e.g., a WiFi device), a mobile communication device (e.g., a cellular phone, a laptop, a tablet, etc.), a commercial or utility communication device such as a machine-to-machine communications device (e.g., a vending machine with a communication device integrated therein, an automobile with an integrated communication device), a meter for measuring power consumption having an integrated communication device, and so on. Additionally, such devices can be adapted according to the embodiments of the subject disclosure to communicate with each other and share parametric data with each other to perform in whole or in part any of embodiments of the subject disclosure.

It is further noted that the methods and systems of the subject disclosure can be adapted to receive, process, and/or deliver information between devices wirelessly or by a tethered interface. For example, SINR information can be provided by the cell sites to a system by way of a tethered interface such as an optical communication link conforming to a standard such as a common public radio interface (CPRI) referred to herein as a CPRI link. In another embodiment, a CPRI link can be used to receive digital signals from an antenna system of the base station for processing according to the embodiments of the subject disclosure. The processed digital signals can in turn be delivered to other devices of the subject disclosure over a CPRI link. Similar adaptations can be used by any of the embodiments of the subject disclosure.

Figure 27:
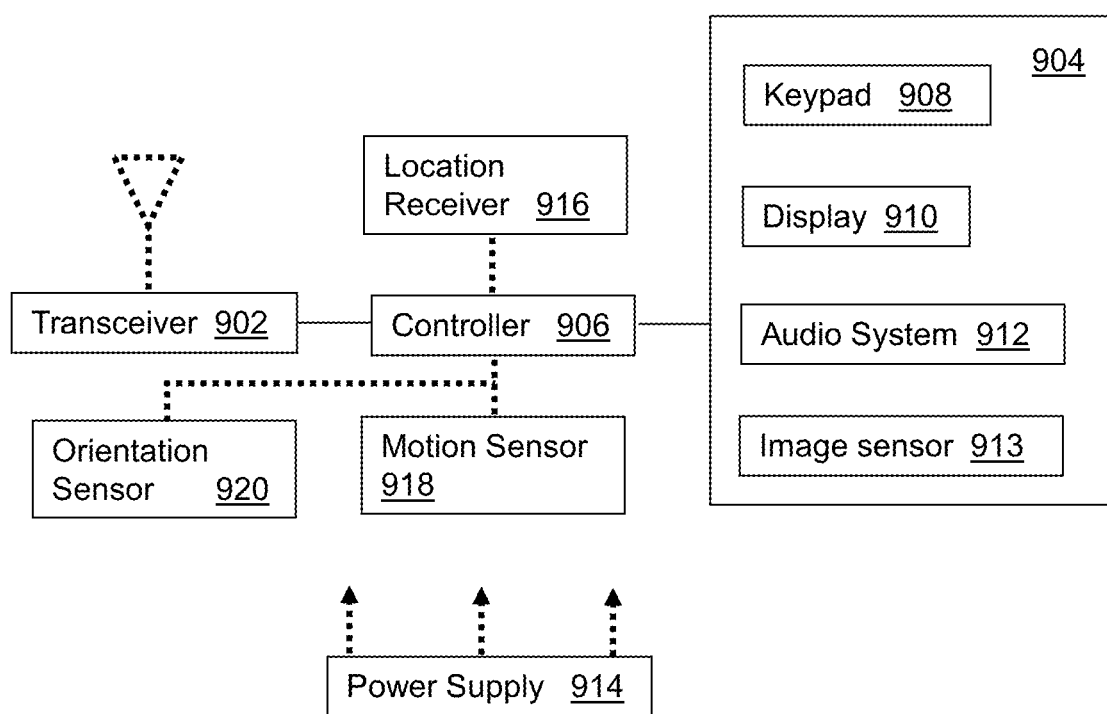
FIG. 27 depicts an illustrative embodiment of a communication device that can utilize in whole or in part embodiments of the subject disclosure for detecting and mitigating interference.

An illustrative embodiment of a communication device 900 is shown in FIG. 27. Communication device 900 can serve in whole or in part as an illustrative embodiment of the devices depicted in FIGS. 1, 4, and 6-8. In one embodiment, the communication device 900 can be configured, for example, to perform operations such as measuring a power level in at least a portion of a plurality of resource blocks occurring in a radio frequency spectrum, where the measuring occurs for a plurality of time cycles to generate a plurality of power level measurements, calculating a baseline power level according to at least a portion of the plurality of power levels, determining a threshold from the baseline power level, and monitoring at least a portion of the plurality of resource blocks for signal interference according to the threshold. Other embodiments described in the subject disclosure can be used by the communication device 900.

To enable these features, communication device 900 can comprise a wireline and/or wireless transceiver 902 (herein transceiver 902), a user interface (UI) 904, a power supply 914, a location receiver 916, a motion sensor 918, an orientation sensor 920, and a controller 906 for managing operations thereof. The transceiver 902 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 902 can also be adapted to support circuit-switched wireline access technologies (such as PSTN), packet-switched wireline access technologies (such as TCP/IP, VoIP, etc.), and combinations thereof.

The UI 904 can include a depressible or touch-sensitive keypad 908 with a navigation mechanism such as a roller ball, a joystick, a mouse, or a navigation disk for manipulating operations of the communication device 900. The keypad 908 can be an integral part of a housing assembly of the communication device 900 or an independent device operably coupled thereto by a tethered wireline interface (such as a USB cable) or a wireless interface supporting for example Bluetooth. The keypad 908 can represent a numeric keypad commonly used by phones, and/or a QWERTY keypad with alphanumeric keys. The UI 904 can further include a display 910 such as monochrome or color LCD (Liquid Crystal Display), OLED (Organic Light Emitting Diode) or other suitable display technology for conveying images to an end user of the communication device 900. In an embodiment where the display 910 is touch-sensitive, a portion or all of the keypad 908 can be presented by way of the display 910 with navigation features.

The display 910 can use touch screen technology to also serve as a user interface for detecting user input. As a touch screen display, the communication device 900 can be adapted to present a user interface with graphical user interface (GUI) elements that can be selected by a user with a touch of a finger. The touch screen display 910 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 910 can be an integral part of the housing assembly of the communication device 900 or an independent device communicatively coupled thereto by a tethered wireline interface (such as a cable) or a wireless interface.

The UI 904 can also include an audio system 912 that utilizes audio technology for conveying low volume audio (such as audio heard in proximity of a human ear) and high volume audio (such as speakerphone for hands free operation). The audio system 912 can further include a microphone for receiving audible signals of an end user. The audio system 912 can also be used for voice recognition applications. The UI 904 can further include an image sensor 913 such as a charged coupled device (CCD) camera for capturing still or moving images.

The power supply 914 can utilize common power management technologies such as replaceable and rechargeable batteries, supply regulation technologies, and/or charging system technologies for supplying energy to the components of the communication device 900 to facilitate long-range or short-range portable applications. Alternatively, or in combination, the charging system can utilize external power sources such as DC power supplied over a physical interface such as a USB port or other suitable tethering technologies.

The location receiver 916 can utilize location technology such as a global positioning system (GPS) receiver capable of assisted GPS for identifying a location of the communication device 900 based on signals generated by a constellation of GPS satellites, which can be used for facilitating location services such as navigation. The motion sensor 918 can utilize motion sensing technology such as an accelerometer, a gyroscope, or other suitable motion sensing technology to detect motion of the communication device 900 in three-dimensional space. The orientation sensor 920 can utilize orientation sensing technology such as a magnetometer to detect the orientation of the communication device 900 (north, south, west, and east, as well as combined orientations in degrees, minutes, or other suitable orientation metrics).

The communication device 900 can use the transceiver 902 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 906 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 27 can be used in one or more embodiments of the subject disclosure. For instance, the communication device 900 can include a reset button (not shown). The reset button can be used to reset the controller 906 of the communication device 900. In yet another embodiment, the communication device 900 can also include a factory default setting button positioned, for example, below a small hole in a housing assembly of the communication device 900 to force the communication device 900 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 900 as described herein can operate with more or less of the circuit components shown in FIG. 27. These variant embodiments can be used in one or more embodiments of the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 28:
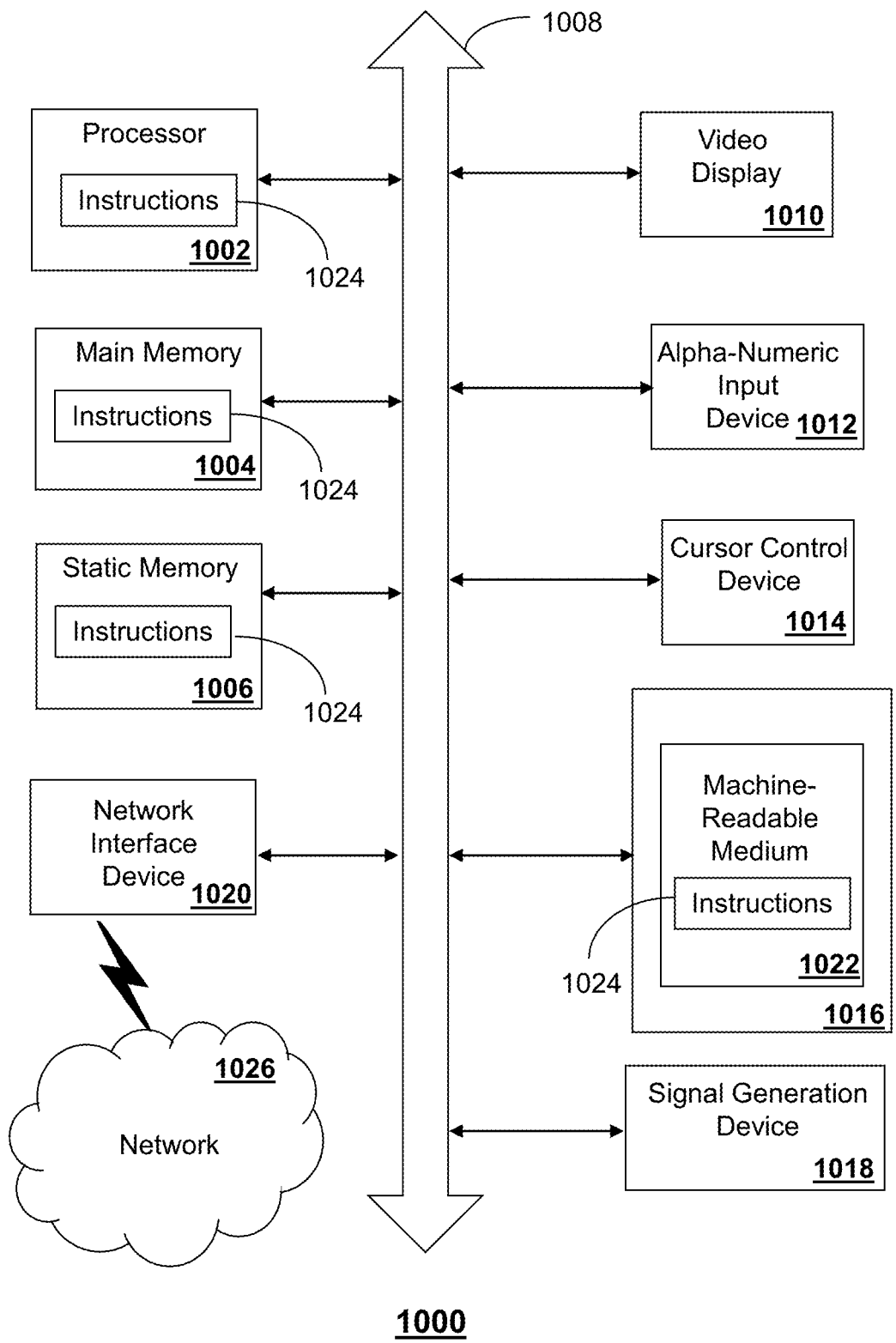
FIG. 28 is a diagrammatic representation of a machine in the form of a computer system within which a set of instructions, when executed, may cause the machine to perform any one or more of the methods described herein.

FIG. 28 depicts an exemplary diagrammatic representation of a machine in the form of a computer system 1000 within which a set of instructions, when executed, may cause the machine to perform any one or more of the methods described above. One or more instances of the machine can operate, for example, as the devices of FIGS. 1, 4, and 6-8. In some embodiments, the machine may be connected (e.g., using a network 1026) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1000 may include a processor (or controller) 1002 (e.g., a central processing unit (CPU), a graphics processing unit (GPU, or both), a main memory 1004 and a static memory 1006, which communicate with each other via a bus 1008. The computer system 1000 may further include a display unit 1010 (e.g., a liquid crystal display (LCD), a flat panel, or a solid state display. The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020. In distributed environments, the embodiments described in the subject disclosure can be adapted to utilize multiple display units 1010 controlled by two or more computer systems 1000. In this configuration, presentations described by the subject disclosure may in part be shown in a first of the display units 1010, while the remaining portion is presented in a second of the display units 1010.

The disk drive unit 1016 may include a tangible computer-readable storage medium 1022 on which is stored one or more sets of instructions (e.g., software 1024) embodying any one or more of the methods or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, ZigBee), and long-range communications (e.g., WiMAX, GSM, CDMA, LTE) can be used by computer system 1000.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
  obtaining, by a processing system including a processor, information to determine a Signal to Interference plus Noise Ratio (SINR) measurement of a sector of a plurality of sectors associated with a first cell site of a plurality of cell sites; and initiating, by the processing system, an action to adjust the SINR measurement, wherein the SINR measurement represents a ratio of a first power level of a signal to a second power level comprising a sum of an interference component and a noise component, the signal comprising a radio frequency (RF) signal in a frequency band, and the interference component comprising a signal in the frequency band from a source other than the plurality of cell sites.

2. The method of claim 1, wherein the action is initiated to adjust the SINR measurement of an affected sector of the plurality from falling below a first SINR threshold.

3. The method of claim 2, wherein the first SINR threshold is determined according to a time of day, an event affecting operations of the first cell site, a key performance indicator (KPI), or any combination thereof.

4. The method of claim 3, wherein the initiating of the action further comprises adjusting one or more KPIs of the affected sector.

5. The method of claim 2, further comprising reversing at least in part, by the processing system, the action, responsive to determining that the action has reduced one or more SINR measurements of a second cell site below a second SINR threshold.

6. The method of claim 1, further comprising transmitting, by the processing system, information to a second cell site, wherein the information enables the second cell site to counteract the action.

7. The method of claim 1, wherein the interference component of the SINR measurement is based on measurements of signals that exceed an inter-cell threshold.

8. A method, comprising:
obtaining, by a processing system including a processor, signal strength information to determine a plurality of signal strength indicator values including a first signal strength indicator value for signals in a carrier frequency band due to a first wireless carrier on a cellular network, a second signal strength indicator value for signals outside the carrier frequency band due to a second wireless carrier that is different from the first wireless carrier, a third signal strength indicator value for signals outside the carrier frequency band due to sources other than the second wireless carrier, and a fourth signal strength indicator value for signals in an unused portion of a frequency spectrum of the first wireless carrier;

determining, by the processing system, a plurality of signal to interference plus noise ratio (SINR) values from the plurality of signal strength indicator values for a plurality of nodes in the cellular network; and analyzing, by the processing system, a minimum SINR value of the plurality of SINR values to provide recommendations for actions to adjust a performance of a node of the plurality of nodes associated with the minimum SINR value.

9. The method of claim 8, wherein the analyzing comprises generating a matrix of a plurality of SINR values, and performing a matrix optimization procedure to obtain an optimized SINR value for the node.

10. The method of claim 9, wherein for each of a plurality of nodes an SINR value is optimized within a predetermined threshold range, and wherein the plurality of nodes include the node.

11. The method of claim 9, wherein each element of the matrix comprises a SINR value $SINR_{i,j}$, wherein indices i and j respectively correspond to a cell site and a sector of the cellular network.

12. The method of claim 11, wherein the SINR value $SINR_{i,j}$ is calculated by averaging SINR values for the cell site and sector over a plurality of resource blocks.

13. The method of claim 8, wherein the analyzing comprises generating a matrix of a plurality of SINR values, and performing a matrix optimization procedure to obtain an optimized SINR value for the cellular network.

14. The method of claim 8, wherein the analyzing and the actions are performed in a closed loop process to adjust an RF link of the node.

15. The method of claim 8, wherein the node comprises a cell site including an antenna, and wherein the actions comprise filtering adjacent signals, adjusting gain of an uplink, filtering interference signals, utilizing diversity signal paths, adjusting a pilot signal, adjusting transmit parameters, adjusting receive parameters, adjusting a modulation scheme, adjusting a coding scheme, adjusting a position of the antenna, or a combination thereof.

16. A device comprising:
a processing system including a processor; and
a memory that stores executable instructions that, when executed by the processing system, facilitate performance of operations comprising:
determining a plurality of signal to interference plus noise ratio (SINR) values for a plurality of nodes in a network from a plurality of signal strength indicator values including a first signal strength indicator value for signals in a frequency band due to a first carrier on the network, a second signal strength indicator value for signals outside the frequency band due to a second carrier that is different from the first carrier, a third signal strength indicator value for signals outside the frequency band due to sources other than the second carrier, and a fourth signal strength indicator value for signals in an unused portion of a frequency spectrum of the first carrier for the plurality of nodes; and
analyzing a minimum SINR value of the plurality of SINR values to provide recommendations for actions to adjust a link of a node of the plurality of nodes associated with the minimum SINR value.

17. The device of claim 16, wherein the analyzing and the actions are performed in a closed loop process.

18. The device of claim 16, wherein the node comprises a cell site including an antenna, and wherein the actions comprise filtering adjacent signals, adjusting gain of an uplink, filtering interference signals, utilizing diversity signal paths, adjusting a pilot signal, adjusting transmit parameters, adjusting receive parameters, adjusting a modulation scheme, adjusting a coding scheme, adjusting a position of the antenna, or a combination thereof.

19. The device of claim 16, wherein the analyzing comprises generating a matrix of the plurality of SINR values, and performing a matrix optimization procedure to obtain an optimized SINR value for the node.

20. The device of claim 19, wherein each SINR value of the plurality of SINR values is optimized within a predetermined threshold range.

* * * * *